(12) United States Patent
Besant et al.

(10) Patent No.: US 12,111,072 B2
(45) Date of Patent: Oct. 8, 2024

(54) LIQUID-TO-AIR MEMBRANE ENERGY EXCHANGER

(71) Applicants: University of Saskatchewan, Saskatoon (CA); Nortek Air Solutions Canada, Inc., Saskatoon (CA)

(72) Inventors: Robert Besant, Saskatoon (CA); Carey Simonson, Saskatoon (CA); Blake Norman Erb, Warman (CA); Howard Brian Hemingson, Saskatoon (CA)

(73) Assignee: Nortek Air Solutions Canada, Inc., Saskatoon (CA)

( * ) Notice: Subject to any disclaimer, the term of this patent is extended or adjusted under 35 U.S.C. 154(b) by 160 days.

(21) Appl. No.: 17/345,852

(22) Filed: Jun. 11, 2021

(65) Prior Publication Data
US 2022/0003436 A1 Jan. 6, 2022

Related U.S. Application Data

(63) Continuation of application No. 16/351,046, filed on Mar. 12, 2019, now abandoned, which is a
(Continued)

(51) Int. Cl.
*F24F 3/147* (2006.01)
*F24F 1/0007* (2019.01)
(Continued)

(52) U.S. Cl.
CPC ............ *F24F 3/147* (2013.01); *F24F 1/0007* (2013.01); *F24F 1/0071* (2019.02);
(Continued)

(58) Field of Classification Search
None
See application file for complete search history.

(56) References Cited

U.S. PATENT DOCUMENTS

| | | | |
|---|---|---|---|
| 1,015,831 A | 1/1912 | Pielock et al. | |
| 2,186,844 A | 1/1940 | Smith | |

(Continued)

FOREIGN PATENT DOCUMENTS

| | | |
|---|---|---|
| AU | 2011286700 A1 | 12/2012 |
| AU | 2011268661 A1 | 1/2013 |

(Continued)

OTHER PUBLICATIONS

US 10,739,032 B2, 08/2020, LePoudre et al. (withdrawn)
(Continued)

*Primary Examiner* — Jason M Greene
(74) *Attorney, Agent, or Firm* — Schwegman Lundberg & Woessner, P.A.

(57) ABSTRACT

An energy exchanger is provided. The exchanger includes a housing having a front and a back. A plurality of panels forming desiccant channels extend from the front to the back of the housing. Air channels are formed between adjacent panels. The air channels are configured to direct an air stream in a direction from the front of the housing to the back of the housing. A desiccant inlet is provided in flow communication with the desiccant channels. A desiccant outlet is provided in flow communication with the desiccant channels. The desiccant channels are configured to channel desiccant from the desiccant inlet to the desiccant outlet in at least one of a counter-flow or cross-flow direction with respect to the direction of the air stream.

16 Claims, 12 Drawing Sheets

Related U.S. Application Data continuation of application No. 14/957,795, filed on Dec. 3, 2015, now Pat. No. 10,302,317, which is a continuation of application No. 13/702,596, filed as application No. PCT/IB2011/002145 on Jun. 22, 2011, now Pat. No. 9,234,665.

(60) Provisional application No. 61/359,193, filed on Jun. 28, 2010, provisional application No. 61/358,321, filed on Jun. 24, 2010.

(51) Int. Cl.
*F24F 1/0071* (2019.01)
*F24F 3/14* (2006.01)
*F24F 12/00* (2006.01)
*F28D 15/00* (2006.01)
*F28D 21/00* (2006.01)

(52) U.S. Cl.
CPC .......... *F24F 3/1417* (2013.01); *F24F 12/001* (2013.01); *F24F 12/002* (2013.01); *F24F 12/006* (2013.01); *F28D 21/0015* (2013.01); *F24F 2003/1435* (2013.01); *F28D 15/00* (2013.01); *Y02B 30/54* (2013.01); *Y02B 30/56* (2013.01)

(56) References Cited

U.S. PATENT DOCUMENTS

| | | |
|---|---|---|
| 2,214,880 A | 9/1940 | Crawford |
| 2,290,465 A | 7/1942 | Crawford et al. |
| 2,562,811 A | 7/1951 | Muffly |
| 2,946,201 A | 7/1960 | Munters |
| 2,968,165 A | 1/1961 | Gunnar |
| 3,009,684 A | 11/1961 | Georg |
| 3,018,231 A | 1/1962 | Valentine et al. |
| 3,144,901 A | 8/1964 | Meek |
| 3,247,679 A | 4/1966 | Gershon |
| 3,291,206 A | 12/1966 | Peter |
| 3,401,530 A | 9/1968 | Gershon |
| 3,467,072 A | 9/1969 | Toesca |
| 3,735,559 A | 5/1973 | Salemme |
| 3,820,353 A | 6/1974 | Shiraishi et al. |
| 3,905,205 A | 9/1975 | Zusmanovich |
| 4,011,731 A | 3/1977 | Meckler |
| 4,113,004 A | 9/1978 | Rush et al. |
| 4,171,620 A | 10/1979 | Turner |
| 4,180,985 A | 1/1980 | Northrup, Jr. |
| 4,233,796 A | 11/1980 | Mazzoni et al. |
| 4,235,081 A | 11/1980 | Dowling |
| 4,257,169 A | 3/1981 | Pierce |
| 4,259,849 A | 4/1981 | Griffiths |
| 4,373,347 A | 2/1983 | Howell et al. |
| 4,380,910 A | 4/1983 | Hood et al. |
| 4,430,864 A | 2/1984 | Mathiprakasam |
| 4,434,845 A | 3/1984 | Steeb |
| 4,474,021 A | 10/1984 | Harband |
| 4,532,347 A * | 7/1985 | Vaughan .............. B01D 61/246 560/231 |
| 4,538,426 A | 9/1985 | Bock |
| 4,594,860 A | 6/1986 | Coellner et al. |
| 4,691,530 A | 9/1987 | Meckler |
| 4,700,550 A | 10/1987 | Rhodes |
| 4,719,761 A | 1/1988 | Cromer |
| 4,723,417 A | 2/1988 | Meckler |
| 4,729,428 A | 3/1988 | Yasutake et al. |
| 4,729,774 A | 3/1988 | Cohen et al. |
| 4,841,733 A | 6/1989 | Dussault et al. |
| 4,887,438 A | 12/1989 | Meckler |
| 4,900,448 A | 2/1990 | Bonne et al. |
| 4,905,479 A | 3/1990 | Wilkinson |
| 4,909,810 A | 3/1990 | Nakao et al. |
| 4,930,322 A | 6/1990 | Ashley et al. |
| 4,936,107 A | 6/1990 | Kitagaki et al. |
| 4,939,906 A | 7/1990 | Spatz et al. |
| 4,941,324 A | 7/1990 | Peterson et al. |
| 4,982,575 A | 1/1991 | Besik |
| 5,003,961 A | 4/1991 | Besik |
| 5,020,334 A | 6/1991 | Wilkinson |
| 5,020,335 A | 6/1991 | Albers et al. |
| 5,022,241 A | 6/1991 | Wilkinson |
| 5,076,065 A | 12/1991 | Brogan |
| 5,120,445 A | 6/1992 | Colman |
| 5,131,238 A | 7/1992 | Meckler |
| 5,148,374 A | 9/1992 | Coellner |
| 5,170,633 A | 12/1992 | Kaplan |
| 5,176,005 A | 1/1993 | Kaplan |
| 5,181,387 A | 1/1993 | Meckler |
| 5,191,771 A | 3/1993 | Meckler |
| 5,203,161 A | 4/1993 | Lehto |
| 5,206,002 A | 4/1993 | Skelley et al. |
| 5,297,398 A | 3/1994 | Meckler |
| 5,311,929 A | 5/1994 | Verret |
| 5,325,676 A | 7/1994 | Meckler |
| 5,337,574 A | 8/1994 | Dick |
| 5,351,497 A | 10/1994 | Lowenstein |
| 5,353,606 A | 10/1994 | Yoho et al. |
| 5,373,704 A | 12/1994 | Mcfadden |
| 5,387,376 A | 2/1995 | Gasser |
| 5,448,895 A | 9/1995 | Coellner et al. |
| 5,460,004 A | 10/1995 | Tsimerman |
| 5,471,852 A | 12/1995 | Meckler |
| 5,482,625 A | 1/1996 | Shimizu et al. |
| 5,496,397 A | 3/1996 | Fischer et al. |
| 5,502,975 A | 4/1996 | Brickley et al. |
| 5,517,828 A | 5/1996 | Calton et al. |
| 5,526,651 A | 6/1996 | Worek et al. |
| 5,536,405 A * | 7/1996 | Myrna .................. B01D 65/00 210/231 |
| 5,542,968 A | 8/1996 | Belding et al. |
| 5,551,245 A | 9/1996 | Calton et al. |
| 5,564,281 A | 10/1996 | Calton et al. |
| 5,579,647 A | 12/1996 | Calton et al. |
| 5,580,369 A | 12/1996 | Belding et al. |
| 5,632,954 A | 5/1997 | Coellner et al. |
| 5,638,900 A | 6/1997 | Lowenstein et al. |
| 5,649,428 A | 7/1997 | Calton et al. |
| 5,650,221 A | 7/1997 | Belding et al. |
| 5,653,115 A | 8/1997 | Brickley et al. |
| 5,660,048 A | 8/1997 | Belding et al. |
| 5,661,983 A | 9/1997 | Groten et al. |
| 5,685,897 A | 11/1997 | Belding et al. |
| 5,701,762 A | 12/1997 | Akamatsu et al. |
| 5,718,286 A | 2/1998 | Damsohn et al. |
| 5,727,394 A | 3/1998 | Belding et al. |
| 5,732,562 A | 3/1998 | Moratalla |
| 5,749,230 A | 5/1998 | Coellner et al. |
| 5,758,508 A | 6/1998 | Belding et al. |
| 5,758,511 A | 6/1998 | Yoho et al. |
| 5,761,915 A | 6/1998 | Rao |
| 5,761,923 A | 6/1998 | Maeda |
| 5,791,153 A | 8/1998 | Belding et al. |
| 5,791,157 A | 8/1998 | Maeda |
| 5,816,065 A | 10/1998 | Maeda |
| 5,825,641 A | 10/1998 | Mangtani |
| 5,826,434 A | 10/1998 | Belding et al. |
| 5,826,641 A | 10/1998 | Bierwirth et al. |
| 5,832,736 A | 11/1998 | Yoshioka et al. |
| 5,860,284 A | 1/1999 | Goland et al. |
| 5,890,372 A | 4/1999 | Belding et al. |
| 5,911,273 A | 6/1999 | Brenner et al. |
| 5,931,016 A | 8/1999 | Yoho |
| 5,943,874 A | 8/1999 | Maeda |
| 5,946,931 A | 9/1999 | Lomax et al. |
| 5,950,447 A | 9/1999 | Maeda et al. |
| 5,992,160 A | 11/1999 | Bussjager et al. |
| 6,003,327 A | 12/1999 | Belding et al. |
| 6,018,953 A | 2/2000 | Belding et al. |
| 6,018,954 A | 2/2000 | Assaf |
| 6,029,462 A | 2/2000 | Denniston |
| 6,029,467 A | 2/2000 | Moratalla |
| 6,050,100 A | 4/2000 | Belding et al. |
| 6,079,481 A | 6/2000 | Lowenstein et al. |

(56) References Cited

U.S. PATENT DOCUMENTS

| | | |
|---|---|---|
| 6,094,835 A | 8/2000 | Cromer |
| 6,138,470 A | 10/2000 | Potnis et al. |
| 6,141,979 A | 11/2000 | Dunlap |
| 6,145,588 A | 11/2000 | Martin et al. |
| 6,156,102 A | 12/2000 | Conrad et al. |
| 6,176,101 B1 | 1/2001 | Lowenstein |
| 6,176,305 B1 | 1/2001 | Haglid |
| 6,178,762 B1 | 1/2001 | Flax |
| 6,199,388 B1 | 3/2001 | Fischer |
| 6,199,392 B1 | 3/2001 | Maeda |
| 6,237,354 B1 | 5/2001 | Cromer |
| 6,269,650 B1 | 8/2001 | Shaw |
| 6,318,106 B1 | 11/2001 | Maeda |
| RE37,464 E | 12/2001 | Meckler |
| 6,363,218 B1 | 3/2002 | Lowenstein et al. |
| 6,412,295 B2 | 7/2002 | Weiss et al. |
| 6,442,951 B1 | 9/2002 | Maeda et al. |
| 6,494,053 B1 | 12/2002 | Forkosh |
| 6,497,107 B2 | 12/2002 | Maisotsenko et al. |
| 6,532,763 B1 | 3/2003 | Gupte |
| 6,546,746 B2 | 4/2003 | Forkosh et al. |
| 6,568,466 B2 | 5/2003 | Lowenstein et al. |
| 6,575,228 B1 | 6/2003 | Ragland et al. |
| 6,598,862 B2 | 7/2003 | Merrill et al. |
| 6,635,104 B2 | 10/2003 | Komkova et al. |
| 6,644,059 B2 | 11/2003 | Maeda et al. |
| 6,684,649 B1 | 2/2004 | Thompson |
| 6,709,492 B1 | 3/2004 | Spadaccini et al. |
| 6,720,990 B1 | 4/2004 | Walker et al. |
| 6,739,142 B2 | 5/2004 | Korin |
| 6,745,826 B2 | 6/2004 | Lowenstein et al. |
| 6,751,964 B2 | 6/2004 | Fischer |
| 6,800,118 B2 | 10/2004 | Kusunose et al. |
| 6,841,601 B2 | 1/2005 | Serpico et al. |
| 6,848,265 B2 | 2/2005 | Lowenstein et al. |
| 6,854,278 B2 | 2/2005 | Maisotsenko et al. |
| 6,864,005 B2 | 3/2005 | Mossman |
| 6,935,416 B1 | 8/2005 | Tsunoda et al. |
| 6,973,795 B1 | 12/2005 | Moffitt |
| 6,976,365 B2 | 12/2005 | Forkosh et al. |
| 6,978,633 B2 | 12/2005 | Yamazaki |
| 7,000,427 B2 | 2/2006 | Mathias et al. |
| 7,017,356 B2 | 3/2006 | Moffitt |
| 7,092,006 B2 | 8/2006 | Walker et al. |
| 7,093,452 B2 | 8/2006 | Chee et al. |
| 7,093,649 B2 | 8/2006 | Dawson |
| RE39,288 E | 9/2006 | Assaf |
| 7,178,355 B2 | 2/2007 | Moffitt |
| 7,181,918 B2 | 2/2007 | Reinders et al. |
| 7,231,967 B2 | 6/2007 | Haglid |
| 7,269,966 B2 | 9/2007 | Lowenstein et al. |
| 7,306,650 B2 | 12/2007 | Slayzak et al. |
| 7,331,376 B2 | 2/2008 | Gagnon et al. |
| 7,340,906 B2 | 3/2008 | Moffitt |
| 7,389,646 B2 | 6/2008 | Moffitt |
| 7,389,652 B1 | 6/2008 | Fair |
| 7,593,033 B2 | 9/2009 | Walker et al. |
| 7,602,414 B2 | 10/2009 | Walker et al. |
| 7,605,840 B2 | 10/2009 | Walker et al. |
| 7,717,404 B2 | 5/2010 | Hasegawa et al. |
| 7,719,565 B2 | 5/2010 | Walker et al. |
| 7,737,224 B2 | 6/2010 | Willis et al. |
| 7,753,991 B2 | 7/2010 | Kertzman |
| 7,781,034 B2 | 8/2010 | Yializis et al. |
| 7,817,182 B2 | 10/2010 | Walker et al. |
| D638,925 S | 5/2011 | Charlebois et al. |
| 7,942,387 B2 | 5/2011 | Forkosh |
| 7,966,841 B2 | 6/2011 | Lowenstein et al. |
| 8,002,023 B2 | 8/2011 | Murayama |
| 8,033,532 B2 | 10/2011 | Yabu |
| 8,137,436 B2 | 3/2012 | Calis et al. |
| 8,157,891 B2 | 4/2012 | Montie et al. |
| 8,318,824 B2 | 11/2012 | Matsuoka et al. |
| 8,469,782 B1 | 6/2013 | Roy |
| 8,470,071 B2 | 6/2013 | Ehrenberg et al. |
| 8,511,074 B2 | 8/2013 | Kuehnel et al. |
| 8,550,151 B2 | 10/2013 | Murayama et al. |
| 8,685,142 B2 | 4/2014 | Claridge et al. |
| 8,769,971 B2 | 7/2014 | Kozubal et al. |
| 8,783,053 B2 | 7/2014 | McCann |
| 8,887,523 B2 | 11/2014 | Gommed et al. |
| 8,899,061 B2 | 12/2014 | Reytblat |
| 8,915,092 B2 | 12/2014 | Gerber et al. |
| 8,920,699 B2 | 12/2014 | Marutani et al. |
| 8,943,848 B2 | 2/2015 | Phannavong et al. |
| 8,966,924 B2 | 3/2015 | Pichai |
| 9,021,821 B2 | 5/2015 | Dunnavant |
| 9,027,764 B2 | 5/2015 | Murutani et al. |
| 9,109,808 B2 | 8/2015 | Gerber et al. |
| 9,140,460 B2 | 9/2015 | Woods et al. |
| 9,188,349 B2 | 11/2015 | Warmerdam et al. |
| 9,234,665 B2 | 1/2016 | Erb et al. |
| 9,243,810 B2 | 1/2016 | Vandermeulen et al. |
| 9,273,877 B2 | 3/2016 | Vandermeulen |
| 9,429,332 B2 | 8/2016 | Vandermeulen et al. |
| 9,429,366 B2 | 8/2016 | Dubois |
| 9,664,452 B2 | 5/2017 | Takada et al. |
| 9,810,439 B2 | 11/2017 | Coutu et al. |
| 9,816,760 B2 | 11/2017 | LePoudre et al. |
| 9,909,768 B2 | 3/2018 | Gerber et al. |
| 10,197,310 B2 | 2/2019 | Ghadiri Moghaddam et al. |
| 10,302,317 B2 | 5/2019 | Besant et al. |
| 10,352,628 B2 | 7/2019 | Erb et al. |
| 10,480,801 B2 | 11/2019 | Gerber et al. |
| 10,584,884 B2 | 3/2020 | Coutu et al. |
| 10,712,024 B2 | 7/2020 | LePoudre et al. |
| 10,782,045 B2 | 9/2020 | LePoudre et al. |
| 10,808,951 B2 | 10/2020 | LePoudre et al. |
| 10,928,082 B2 | 2/2021 | Coutu et al. |
| 10,962,252 B2 | 3/2021 | LePoudre et al. |
| 11,035,618 B2 | 6/2021 | Lepoudre et al. |
| 11,300,364 B2 | 4/2022 | Erb et al. |
| 11,408,681 B2 | 8/2022 | Lepoudre |
| 11,598,534 B2 | 3/2023 | Coutu et al. |
| 11,732,972 B2 | 8/2023 | Lepoudre et al. |
| 11,761,645 B2 | 9/2023 | Coutu et al. |
| 2001/0003902 A1 | 6/2001 | Kopko |
| 2002/0005271 A1 | 1/2002 | Weiss et al. |
| 2002/0038552 A1 | 4/2002 | Maisotsenko |
| 2002/0074105 A1 | 6/2002 | Hayashi et al. |
| 2002/0158023 A1 | 10/2002 | Wurzburger |
| 2003/0014983 A1 | 1/2003 | Maisotsenko et al. |
| 2003/0033821 A1 | 2/2003 | Maisotsenko et al. |
| 2003/0037905 A1 | 2/2003 | Weng |
| 2003/0070787 A1 | 4/2003 | Moffitt |
| 2003/0121271 A1 | 7/2003 | Dinnage et al. |
| 2003/0132166 A1 | 7/2003 | Rey |
| 2003/0145609 A1 | 8/2003 | Maisotsenko et al. |
| 2004/0000152 A1 | 1/2004 | Fischer |
| 2004/0026225 A1 | 2/2004 | Domen |
| 2004/0055329 A1 | 3/2004 | Mathias et al. |
| 2004/0061245 A1 | 4/2004 | Maisotsenko et al. |
| 2004/0134211 A1 | 7/2004 | Lee et al. |
| 2004/0134212 A1 | 7/2004 | Lee et al. |
| 2004/0168462 A1 | 9/2004 | Assaf |
| 2004/0226685 A1 | 11/2004 | Gagnon et al. |
| 2005/0056042 A1 | 3/2005 | Bourne et al. |
| 2005/0072303 A1 | 4/2005 | Weidenmann |
| 2005/0230080 A1 | 10/2005 | Paul et al. |
| 2005/0249901 A1 | 11/2005 | Yializis et al. |
| 2005/0262862 A1 | 12/2005 | Moffitt |
| 2005/0279115 A1 | 12/2005 | Lee et al. |
| 2006/0021615 A1 | 2/2006 | Kertzman |
| 2006/0032258 A1 | 2/2006 | Pruitt et al. |
| 2006/0042295 A1 | 3/2006 | Assaf |
| 2006/0118979 A1 | 6/2006 | Beck et al. |
| 2006/0205301 A1 | 9/2006 | Klare et al. |
| 2007/0029685 A1 | 2/2007 | Lin |
| 2007/0056894 A1 | 3/2007 | Connors, Jr. |
| 2007/0068663 A1 | 3/2007 | Thomer et al. |
| 2007/0095519 A1 | 5/2007 | Hombucher |
| 2007/0234743 A1 | 10/2007 | Assaf |
| 2007/0279861 A1 | 12/2007 | Doll et al. |
| 2008/0023182 A1 | 1/2008 | Beamer et al. |

(56) References Cited

U.S. PATENT DOCUMENTS

| | | |
|---|---|---|
| 2008/0066888 A1 | 3/2008 | Tong et al. |
| 2008/0085437 A1 | 4/2008 | Dean et al. |
| 2008/0099184 A1 | 5/2008 | Han |
| 2008/0283217 A1 | 11/2008 | Gagnon et al. |
| 2009/0071638 A1 | 3/2009 | Sugiyama et al. |
| 2009/0095162 A1 | 4/2009 | Hargis et al. |
| 2009/0126913 A1 | 5/2009 | Lee et al. |
| 2009/0133866 A1 | 5/2009 | Campbell et al. |
| 2009/0193974 A1 | 8/2009 | Montie et al. |
| 2009/0211977 A1 | 8/2009 | Miller |
| 2009/0294110 A1 | 12/2009 | Foust |
| 2009/0324929 A1 | 12/2009 | Yamakawa et al. |
| 2010/0055276 A1* | 3/2010 | Chen ............... B32B 27/12 428/305.5 |
| 2010/0090356 A1 | 4/2010 | Sines et al. |
| 2010/0170655 A1 | 7/2010 | Kronvall et al. |
| 2010/0170776 A1 | 7/2010 | Ehrenberg et al. |
| 2010/0181062 A1 | 7/2010 | Mccann |
| 2010/0192605 A1 | 8/2010 | Fang et al. |
| 2010/0200068 A1 | 8/2010 | D'arcy et al. |
| 2010/0275629 A1 | 11/2010 | Erickson |
| 2010/0300123 A1 | 12/2010 | Park et al. |
| 2010/0319370 A1 | 12/2010 | Kozubal et al. |
| 2010/0326914 A1 | 12/2010 | Drost et al. |
| 2011/0056384 A1 | 3/2011 | Kadota |
| 2011/0101549 A1 | 5/2011 | Miyauchi et al. |
| 2011/0192579 A1 | 8/2011 | Sotokawa et al. |
| 2011/0223486 A1 | 9/2011 | Zhang et al. |
| 2011/0232485 A1 | 9/2011 | Ellsworth |
| 2011/0232633 A1 | 9/2011 | Lima |
| 2011/0259572 A1 | 10/2011 | Muratani et al. |
| 2011/0283720 A1 | 11/2011 | Martin |
| 2011/0308265 A1 | 12/2011 | Phannavong et al. |
| 2012/0000227 A1 | 1/2012 | Matsuura et al. |
| 2012/0016700 A1 | 1/2012 | Jabbour et al. |
| 2012/0023988 A1 | 2/2012 | Togano et al. |
| 2012/0031133 A1 | 2/2012 | Kuwabara et al. |
| 2012/0061045 A1 | 3/2012 | Huizing |
| 2012/0073791 A1 | 3/2012 | Dubois |
| 2012/0085112 A1 | 4/2012 | Wintemute |
| 2012/0106073 A1 | 5/2012 | Wu et al. |
| 2012/0125020 A1 | 5/2012 | Vandermeulen et al. |
| 2012/0125021 A1 | 5/2012 | Vandermeulen et al. |
| 2012/0125023 A1 | 5/2012 | Kopko et al. |
| 2012/0125031 A1 | 5/2012 | Vandermeulen et al. |
| 2012/0125405 A1 | 5/2012 | Vandermeulen et al. |
| 2012/0125581 A1 | 5/2012 | Allen et al. |
| 2012/0131934 A1 | 5/2012 | Vandermeulen et al. |
| 2012/0131937 A1 | 5/2012 | Vandermeulen et al. |
| 2012/0131938 A1 | 5/2012 | Vandermeulen et al. |
| 2012/0131939 A1 | 5/2012 | Vandermeulen et al. |
| 2012/0131940 A1 | 5/2012 | Vandermeulen et al. |
| 2012/0132513 A1 | 5/2012 | Vandermeulen et al. |
| 2012/0162918 A1 | 6/2012 | Thyni et al. |
| 2012/0167600 A1 | 7/2012 | Dunnavant |
| 2012/0168369 A1 | 7/2012 | Van Medevoort et al. |
| 2012/0180505 A1 | 7/2012 | Gerber et al. |
| 2012/0186281 A1 | 7/2012 | Vandermeulen et al. |
| 2012/0247132 A1 | 10/2012 | Lakdawala et al. |
| 2012/0298340 A1 | 11/2012 | Al-Otaibi |
| 2013/0056177 A1 | 3/2013 | Coutu et al. |
| 2013/0075066 A1 | 3/2013 | Reytblat |
| 2013/0186121 A1 | 7/2013 | Erb et al. |
| 2013/0199220 A1 | 8/2013 | Ma et al. |
| 2013/0240438 A1 | 9/2013 | Willis et al. |
| 2013/0248147 A1 | 9/2013 | Wintemute et al. |
| 2013/0283837 A1 | 10/2013 | Takahashi et al. |
| 2013/0340449 A1 | 12/2013 | Kozubal et al. |
| 2014/0054004 A1 | 2/2014 | LePoudre et al. |
| 2014/0054013 A1 | 2/2014 | Lepoudre et al. |
| 2014/0069134 A1 | 3/2014 | Grabon |
| 2014/0083648 A1 | 3/2014 | Wawryk |
| 2014/0190037 A1 | 7/2014 | Erb et al. |
| 2014/0190198 A1 | 7/2014 | Slessman et al. |
| 2014/0242900 A1 | 8/2014 | Takada et al. |
| 2014/0138851 A1 | 9/2014 | LePoudre |
| 2014/0245769 A1 | 9/2014 | Vandermeulen et al. |
| 2014/0250935 A1 | 9/2014 | Prochaska et al. |
| 2014/0260367 A1 | 9/2014 | Coutu et al. |
| 2014/0260369 A1 | 9/2014 | Lepoudre et al. |
| 2014/0260373 A1 | 9/2014 | Gerber et al. |
| 2014/0260399 A1 | 9/2014 | Vandermeulen |
| 2014/0262125 A1 | 9/2014 | Erb et al. |
| 2014/0262144 A1 | 9/2014 | Erb et al. |
| 2014/0326433 A1 | 11/2014 | Kozubal |
| 2014/0340842 A1 | 11/2014 | Towner et al. |
| 2015/0096714 A1 | 4/2015 | Dagley |
| 2015/0184876 A1 | 7/2015 | Vandermeulen et al. |
| 2015/0253018 A1 | 9/2015 | Eguchi et al. |
| 2015/0292754 A1 | 10/2015 | Mongar |
| 2015/0323203 A1 | 11/2015 | Gerber et al. |
| 2016/0054012 A1 | 2/2016 | Lepoudre et al. |
| 2016/0084512 A1 | 3/2016 | Erb et al. |
| 2016/0187010 A1 | 6/2016 | Vandermeulen |
| 2016/0209087 A1 | 7/2016 | Reytblat et al. |
| 2016/0290666 A1 | 10/2016 | Coutu et al. |
| 2016/0298865 A1 | 10/2016 | Gerber et al. |
| 2016/0327345 A1 | 11/2016 | Lowenstein |
| 2017/0241655 A1 | 8/2017 | Lepoudre et al. |
| 2018/0073753 A1 | 3/2018 | Lepoudre et al. |
| 2018/0128510 A1 | 5/2018 | Lepoudre et al. |
| 2018/0135880 A1 | 5/2018 | Ghadiri Moghaddam et al. |
| 2018/0187918 A1 | 7/2018 | Lepoudre et al. |
| 2019/0113247 A1 | 4/2019 | Lepoudre et al. |
| 2019/0212020 A1 | 7/2019 | Besant et al. |
| 2019/0346212 A1 | 11/2019 | Norman Erb et al. |
| 2020/0173672 A1 | 6/2020 | Coutu et al. |
| 2021/0231384 A1 | 7/2021 | Lepoudre et al. |
| 2021/0332993 A1 | 10/2021 | Coutu et al. |
| 2022/0333868 A1 | 10/2022 | Lepoudre |
| 2022/0333869 A1 | 10/2022 | Lepoudre |
| 2023/0392872 A1 | 12/2023 | Lepoudre et al. |

FOREIGN PATENT DOCUMENTS

| | | |
|---|---|---|
| AU | 2014231672 B2 | 3/2018 |
| AU | 2015230799 B2 | 3/2018 |
| AU | 2013305427 B2 | 4/2018 |
| AU | 2014231681 B2 | 6/2018 |
| AU | 2013305428 B2 | 9/2018 |
| AU | 2014231668 B2 | 2/2019 |
| AU | 2014231667 B2 | 6/2019 |
| AU | 2017204552 B2 | 7/2019 |
| AU | 2018236791 B2 | 10/2020 |
| AU | 2018204774 B2 | 11/2020 |
| CA | 2283089 A1 | 11/2000 |
| CA | 2801352 A1 | 12/2011 |
| CA | 2798928 A1 | 2/2012 |
| CA | 2843763 A1 | 3/2013 |
| CA | 2904224 A1 | 9/2014 |
| CA | 2901483 C | 4/2019 |
| CA | 2880353 C | 9/2020 |
| CA | 3034592 C | 2/2021 |
| CA | 2904224 | 4/2022 |
| CA | 2901484 | 7/2022 |
| CA | 2958480 | 10/2022 |
| CA | 3046529 | 1/2023 |
| CA | 2880350 | 7/2023 |
| CA | 2986058 C | 10/2023 |
| CA | 3016808 C | 1/2024 |
| CA | 3167769 C | 1/2024 |
| CH | 193732 A | 10/1937 |
| CN | 1163389 A | 10/1997 |
| CN | 1343292 A | 4/2002 |
| CN | 1456855 A | 11/2003 |
| CN | 1517610 A | 8/2004 |
| CN | 1518477 A | 8/2004 |
| CN | 1666081 A | 9/2005 |
| CN | 1711448 A | 12/2005 |
| CN | 2821506 Y | 9/2006 |
| CN | 200958820 Y | 10/2007 |
| CN | 101368754 A | 2/2009 |
| CN | 201203217 Y | 3/2009 |
| CN | 101405559 A | 4/2009 |

(56) References Cited

FOREIGN PATENT DOCUMENTS

| | | |
|---|---|---|
| CN | 101421580 A | 4/2009 |
| CN | 101469090 A | 7/2009 |
| CN | 101776406 A | 7/2010 |
| CN | 101900385 A | 12/2010 |
| CN | 101918777 A | 12/2010 |
| CN | 102076401 A | 5/2011 |
| CN | 201906567 U | 7/2011 |
| CN | 102149979 A | 8/2011 |
| CN | 102165268 A | 8/2011 |
| CN | 102232015 A | 11/2011 |
| CN | 102345909 A | 2/2012 |
| CN | 102395419 A | 3/2012 |
| CN | 202202899 U | 4/2012 |
| CN | 102548727 A | 7/2012 |
| CN | 102549361 A | 7/2012 |
| CN | 102713154 A | 10/2012 |
| CN | 102933931 A | 2/2013 |
| CN | 102939397 A | 2/2013 |
| CN | 103068246 A | 4/2013 |
| CN | 103069246 A | 4/2013 |
| CN | 103245018 A | 8/2013 |
| CN | 203116208 U | 8/2013 |
| CN | 103827595 A | 5/2014 |
| CN | 104048434 A | 9/2014 |
| CN | 203893703 U | 10/2014 |
| CN | 104136855 A | 11/2014 |
| CN | 104583706 A | 4/2015 |
| CN | 103261801 B | 11/2015 |
| CN | 105121989 A | 12/2015 |
| CN | 105164474 A | 12/2015 |
| CN | 105164484 A | 12/2015 |
| CN | 105202795 A | 12/2015 |
| CN | 105283715 A | 1/2016 |
| CN | 101512238 A | 8/2016 |
| CN | 103827595 B | 4/2017 |
| CN | 105164484 B | 6/2017 |
| CN | 105121989 B | 9/2017 |
| CN | 107249715 A | 10/2017 |
| CN | 107300230 A | 10/2017 |
| CN | 107560482 A | 1/2018 |
| CN | 107850335 A | 3/2018 |
| CN | 107923647 A | 4/2018 |
| CN | 108027221 A | 5/2018 |
| CN | 109028519 A | 12/2018 |
| CN | 109073265 A | 12/2018 |
| CN | 110345803 A | 10/2019 |
| CN | 107300230 B | 11/2019 |
| CN | 107560482 B | 2/2020 |
| CN | 107249715 B | 11/2020 |
| CN | 107850335 B | 2/2021 |
| CN | 108027221 B | 3/2021 |
| CN | 109073265 | 9/2021 |
| CN | 107923647 | 12/2021 |
| DE | 10143092 A1 | 3/2003 |
| EP | 0448991 A2 | 10/1991 |
| EP | 0661502 A2 | 7/1995 |
| EP | 0678321 A2 | 10/1995 |
| EP | 1108575 A1 | 6/2001 |
| EP | 1347260 A1 | 9/2003 |
| EP | 2351639 A1 | 8/2011 |
| EP | 2397787 A2 | 12/2011 |
| EP | 2751493 B1 | 3/2018 |
| EP | 3314188 A1 | 5/2018 |
| EP | 2893283 B1 | 12/2018 |
| EP | 2972039 B1 | 12/2018 |
| EP | 2971993 B1 | 8/2019 |
| EP | 2971992 B1 | 1/2020 |
| EP | 3421921 B1 | 3/2020 |
| EP | 3183051 B1 | 4/2020 |
| EP | 3486577 B1 | 4/2020 |
| EP | 2972046 B1 | 6/2020 |
| EP | 3499168 B1 | 2/2021 |
| EP | 3314188 B1 | 5/2021 |
| EP | 3295089 | 10/2021 |
| EP | 3295088 | 1/2022 |
| EP | 3730892 B1 | 9/2023 |
| EP | 3415832 B1 | 10/2023 |
| FR | 2291457 A1 | 6/1976 |
| GB | 1354502 A | 6/1974 |
| GB | 2015384 A | 9/1979 |
| HK | 40009311 A1 | 6/2020 |
| HK | 4009311 B | 4/2021 |
| IN | 201717044889 A | 3/2018 |
| IN | 201717044890 A | 3/2018 |
| IN | 201817002765 A | 4/2018 |
| IN | 201817037404 A | 12/2018 |
| JP | 6152594 A | 3/1986 |
| JP | 05157282 A | 6/1993 |
| JP | H09113167 A | 5/1997 |
| JP | 09196482 A | 7/1997 |
| JP | 10170177 A | 6/1998 |
| JP | 2004116419 A | 4/2004 |
| JP | 2004257588 A | 9/2004 |
| JP | 2008070046 A | 3/2008 |
| JP | 2009275955 A | 11/2009 |
| JP | 4870843 B1 | 11/2011 |
| KR | 100607204 B1 | 8/2006 |
| KR | 20110092773 A | 8/2011 |
| SG | 10201809840 | 12/2018 |
| SG | 11201807692 | 2/2020 |
| SG | 10201913923 | 3/2020 |
| TW | 1271499 B | 1/2007 |
| WO | WO-9641107 A1 | 12/1996 |
| WO | WO-1996041107 A1 | 12/1996 |
| WO | WO-1999014535 A1 | 3/1999 |
| WO | WO-0135039 A1 | 5/2001 |
| WO | WO-0171260 A1 | 9/2001 |
| WO | WO-0201132 A2 | 1/2002 |
| WO | WO-03049835 A1 | 6/2003 |
| WO | WO-2004065875 A1 | 8/2004 |
| WO | WO-2005100243 A1 | 10/2005 |
| WO | WO-2008037079 A1 | 4/2008 |
| WO | WO-2008053367 A2 | 5/2008 |
| WO | WO-2008089484 A1 | 7/2008 |
| WO | WO-2009000974 A1 | 12/2008 |
| WO | WO-2009094032 A1 | 7/2009 |
| WO | WO-2009158030 A1 | 12/2009 |
| WO | WO-2010006968 A1 | 1/2010 |
| WO | WO-2011062808 A1 | 5/2011 |
| WO | WO-201115081 A2 | 12/2011 |
| WO | WO-2011161547 A2 | 12/2011 |
| WO | WO-2011161547 A3 | 12/2011 |
| WO | WO-2012018089 A1 | 2/2012 |
| WO | WO-2012042553 A1 | 4/2012 |
| WO | WO-2012050860 A1 | 4/2012 |
| WO | WO-2012087273 A1 | 6/2012 |
| WO | WO-2012097445 A1 | 7/2012 |
| WO | WO-2012167366 A1 | 12/2012 |
| WO | WO-2013029148 A1 | 3/2013 |
| WO | WO-2013094206 A1 | 6/2013 |
| WO | WO-2013107554 A1 | 7/2013 |
| WO | WO-2013192397 A1 | 12/2013 |
| WO | WO-2014029003 A1 | 2/2014 |
| WO | WO-2014029004 A1 | 2/2014 |
| WO | WO-2014107790 A1 | 7/2014 |
| WO | WO-2014138846 A1 | 9/2014 |
| WO | WO-2014138847 A1 | 9/2014 |
| WO | WO-2014138851 A1 | 9/2014 |
| WO | WO-2014138859 A1 | 9/2014 |
| WO | WO-2014138860 A1 | 9/2014 |
| WO | WO-2014142277 A1 | 9/2014 |
| WO | WO-2015192249 A1 | 12/2015 |
| WO | WO-2016026042 A1 | 2/2016 |
| WO | WO-2016183667 A1 | 11/2016 |
| WO | WO-2016183668 A1 | 11/2016 |
| WO | WO-2016207864 A1 | 12/2016 |
| WO | WO-2017152268 A1 | 9/2017 |

OTHER PUBLICATIONS

Vali, Alireza, "Modeling a Run-around Heat and Moisture Exchanger Using Two Counter/Cross Flow Exchangers", MS Thesis, University of Saskatchewan, 2009, 193 pages. (Year: 193).*

(56) References Cited

OTHER PUBLICATIONS

"AAONAIRE Energy Recovery Units Users Information Manual", AAON, Inc., (Aug. 2006), 16 pgs.

"Advances in Desiccant-Based Dehumidification", American Standard, TRANE Engineers Newsletter, vol. 34-4, (2005), 8 pgs.

"U.S. Appl. No. 14/190,715, Response filed Jul. 20, 2018 to Final Office Action mailed Feb. 20, 2018", 14 pgs.

"U.S. Appl. No. 10/048,797, Amendment and Response filed Apr. 29, 2003 to Non-Final Office mailed Mar. 11, 2003", 10 pgs.

"U.S. Appl. No. 10/048,797, Non-Final Office mailed Mar. 11, 2003", 4 pgs.

"U.S. Appl. No. 10/048,797, Notice of Allowance mailed May 13, 2003", 5 pgs.

"U.S. Appl. No. 13/350,902, Appeal Brief filed Apr. 4, 2014", 24 pgs.

"U.S. Appl. No. 13/350,902, Appeal Decision mailed Sep. 30, 2016", 6 pgs.

"U.S. Appl. No. 13/350,902, Examiner's Answer mailed Jun. 16, 2014", 17 pgs.

"U.S. Appl. No. 13/350,902, Final Office Action mailed Dec. 30, 2013", 13 pgs.

"U.S. Appl. No. 13/350,902, Non Final Office Action mailed Oct. 1, 2013", 13 pgs.

"U.S. Appl. No. 13/350,902, Notice of Allowance mailed Mar. 1, 2017", 7 pgs.

"U.S. Appl. No. 13/350,902, Notice of Allowance mailed Nov. 9, 2016", 9 pgs.

"U.S. Appl. No. 13/350,902, Reply Brief filed Jul. 8, 2014", 9 pgs.

"U.S. Appl. No. 13/350,902, Response filed Aug. 5, 2013 to Restriction Requirement mailed Jul. 23, 2013", 2 pgs.

"U.S. Appl. No. 13/350,902, Response filed Oct. 29, 2013 to Non Final Office Action mailed Oct. 1, 2013", 15 pgs.

"U.S. Appl. No. 13/350,902, Restriction Requirement mailed Jul. 23, 2013", 8 pgs.

"U.S. Appl. No. 13/449,598, Final Office Action mailed Feb. 4, 2016", 23 pgs.

"U.S. Appl. No. 13/449,598, Non Final Office Action mailed Apr. 24, 2015", 18 pgs.

"U.S. Appl. No. 13/449,598, Non Final Office Action mailed Aug. 27, 2015", 20 pgs.

"U.S. Appl. No. 13/449,598, Notice of Allowance mailed Mar. 10, 2017", 7 pgs.

"U.S. Appl. No. 13/449,598, Notice of Allowance mailed Jul. 6, 2017", 7 pgs.

"U.S. Appl. No. 13/449,598, Notice of Allowance mailed Nov. 4, 2016", 9 pgs.

"U.S. Appl. No. 13/449,598, Response filed Jan. 29, 2015 to Restriction Requirement mailed Jan. 5, 2015", 2 pgs.

"U.S. Appl. No. 13/449,598, Response filed Jul. 17, 2015 to Non Final Office Action mailed Apr. 24, 2015", 17 pgs.

"U.S. Appl. No. 13/449,598, Response filed Nov. 16, 2015 to Non Final Office Action mailed Aug. 27, 2015", 18 pgs.

"U.S. Appl. No. 13/449,598, Restriction Requirement mailed Jan. 5, 2015", 10 pgs.

"U.S. Appl. No. 13/702,596, Appeal Brief filed Jun. 15, 2015", 82 pgs.

"U.S. Appl. No. 13/702,596, Final Office Action mailed Jan. 30, 2015", 15 pgs.

"U.S. Appl. No. 13/702,596, Non Final Office Action mailed Oct. 30, 2014", 16 pgs.

"U.S. Appl. No. 13/702,596, Notice of Allowance mailed Oct. 1, 2015", 7 pgs.

"U.S. Appl. No. 13/702,596, Notice of Allowance mailed Nov. 25, 2015", 2 pgs.

"U.S. Appl. No. 13/702,596, Post Allowance Amendment filed Oct. 7, 2015", 13 pgs.

"U.S. Appl. No. 13/702,596, PTO Response to Rule 312 Communication mailed Oct. 19, 2015", 2 pgs.

"U.S. Appl. No. 13/702,596, Response filed Dec. 15, 2014 to Non Final Office Action mailed Oct. 30, 2014", 21 pgs.

"U.S. Appl. No. 13/797,062, Amendment and Response Under 37 C.F.R. 1.116 Filed Jan. 22, 2018 to Final Office Action mailed Feb. 24, 2016", 11 pgs.

"U.S. Appl. No. 13/797,062, Appeal Brief filed Jun. 9, 2016", 33 pgs.

"U.S. Appl. No. 13/797,062, Appeal Decision mailed Nov. 22, 2017", 15 pgs.

"U.S. Appl. No. 13/797,062, Final Office Action mailed Feb. 24, 2016", 29 pgs.

"U.S. Appl. No. 13/797,062, Final Office Action mailed Jul. 13, 2018", 22 pgs.

"U.S. Appl. No. 13/797,062, Non Final Office Action mailed Feb. 21, 2018", 21 pgs.

"U.S. Appl. No. 13/797,062, Non Final Office Action mailed May 7, 2015", 19 pgs.

"U.S. Appl. No. 13/797,062, Non Final Office Action mailed Sep. 25, 2015", 24 pgs.

"U.S. Appl. No. 13/797,062, Non Final Office Action mailed Dec. 28, 2018", 50 pgs.

"U.S. Appl. No. 13/797,062, Response filed Apr. 23, 2015 to Restriction Requirement mailed Mar. 13, 2015", 3 pgs.

"U.S. Appl. No. 13/797,062, Response filed Jul. 17, 2015 to Non Final Office Action mailed May 7, 2015", 16 pgs.

"U.S. Appl. No. 13/797,062, Response filed Nov. 30, 2015 to Non Final Office Action mailed Sep. 25, 2015", 16 pgs.

"U.S. Appl. No. 13/797,062, Response filed Dec. 13, 2018 to Final Office Action mailed Jul. 13, 2018", 12 pgs.

"U.S. Appl. No. 13/797,062, Response filed May 21, 2018 to Non Final Office Action mailed Feb. 21, 2018", 12 pgs.

"U.S. Appl. No. 13/797,062, Restriction Requirement mailed Mar. 13, 2015", 8 pgs.

"U.S. Appl. No. 13/797,152, Appeal Brief filed Jun. 9, 2016", 29 pgs.

"U.S. Appl. No. 13/797,152, Corrected Notice of Allowance mailed Mar. 9, 2017", 7 pgs.

"U.S. Appl. No. 13/797,152, Final Office Action mailed Feb. 25, 2016", 14 pgs.

"U.S. Appl. No. 13/797,152, Non Final Office Action mailed Aug. 25, 2015", 10 pgs.

"U.S. Appl. No. 13/797,152, Notice of Allowance mailed Mar. 9, 2017", 7 pgs.

"U.S. Appl. No. 13/797,152, Notice of Allowance mailed Jun. 27, 2017", 8 pgs.

"U.S. Appl. No. 13/797,152, Notice of Allowance mailed Oct. 31, 2016", 7 pgs.

"U.S. Appl. No. 13/797,152, Response filed Nov. 20, 2015 to Non Final Office Action mailed Aug. 25, 2015", 12 pgs.

"U.S. Appl. No. 13/801,280, 312 Amendment filed Jun. 18, 2015", 8 pgs.

"U.S. Appl. No. 13/801,280, Non Final Office Action mailed Feb. 12, 2015", 7 pgs.

"U.S. Appl. No. 13/801,280, Notice of Allowance mailed May 19, 2015", 7 pgs.

"U.S. Appl. No. 13/801,280, PTO Response to 312 Amendment mailed Jul. 9, 2015", 2 pgs.

"U.S. Appl. No. 13/801,280, Response filed Jan. 7, 2015 to Restriction Requirement mailed Dec. 10, 2014", 1 pg.

"U.S. Appl. No. 13/801,280, Response filed Mar. 31, 2015 to Non Final Office Action mailed Feb. 12, 2015", 9 pgs.

"U.S. Appl. No. 13/801,280, Restriction Requirement mailed Dec. 10, 2014", 9 pgs.

"U.S. Appl. No. 14/171,951, Advisory Action mailed Nov. 10, 2016", 3 pgs.

"U.S. Appl. No. 14/171,951, Final Office Action mailed Jun. 28, 2016", 36 pgs.

"U.S. Appl. No. 14/171,951, Non Final Office Action mailed Jan. 5, 2016", 20 pgs.

"U.S. Appl. No. 14/171,951, Non Final Office Action mailed May 2, 2016", 35 pgs.

"U.S. Appl. No. 14/171,951, Notice of Allowability mailed Jul. 18, 2018", 2 pgs.

"U.S. Appl. No. 14/171,951, Notice of Allowance mailed Jan. 9, 2019", 6 pgs.

(56) References Cited

OTHER PUBLICATIONS

"U.S. Appl. No. 14/171,951, Notice of Allowance mailed Jan. 19, 2018", 5 pgs.
"U.S. Appl. No. 14/171,951, Notice of Allowance mailed Feb. 3, 2017", 5 pgs.
"U.S. Appl. No. 14/171,951, Notice of Allowance mailed May 23, 2018", 5 pgs.
"U.S. Appl. No. 14/171,951, Notice of Allowance mailed Jun. 8, 2017", 5 pgs.
"U.S. Appl. No. 14/171,951, Notice of Allowance mailed Oct. 3, 2017", 5 pgs.
"U.S. Appl. No. 14/171,951, Response filed Mar. 28, 2016 to Non Final Office Action mailed Jan. 5, 2016", 18 pgs.
"U.S. Appl. No. 14/171,951, Response filed Jun. 9, 2016 to Non Final Office Action mailed May 2, 2016", 24 pgs.
"U.S. Appl. No. 14/171,951, Response filed Oct. 28, 2016 to Final Office Action mailed Jun. 28, 2016", 15 pgs.
"U.S. Appl. No. 14/171,951, Response filed Dec. 3, 2015 to Restriction Requirement mailed Nov. 16, 2015", 6 pgs.
"U.S. Appl. No. 14/171,951, Response filed Dec. 15, 2016 to Advisory Action mailed Nov. 10, 2016", 16 pgs.
"U.S. Appl. No. 14/171,951, Restriction Requirement mailed Nov. 16, 2015", 13 pgs.
"U.S. Appl. No. 14/186,420, Notice of Allowance mailed Jan. 27, 2017", 7 pgs.
"U.S. Appl. No. 14/187,413, Advisory Action mailed Nov. 10, 2016", 4 pgs.
"U.S. Appl. No. 14/187,413, Advisory Action mailed Dec. 17, 2018", 5 pgs.
"U.S. Appl. No. 14/187,413, Amendment and Response filed Nov. 30, 2018 to Final Office Action mailed Jul. 26, 2018", 19 pgs.
"U.S. Appl. No. 14/187,413, Final Office Action mailed Jun. 27, 2017", 16 pgs.
"U.S. Appl. No. 14/187,413, Final Office Action mailed Jul. 26, 2018", 16 pgs.
"U.S. Appl. No. 14/187,413, Final Office Action mailed Jul. 28, 2016", 20 pgs.
"U.S. Appl. No. 14/187,413, Non Final Office Action mailed Feb. 8, 2017", 15 pgs.
"U.S. Appl. No. 14/187,413, Non Final Office Action mailed Mar. 17, 2016", 15 pgs.
"U.S. Appl. No. 14/187,413, Non Final Office Action mailed Dec. 18, 2017", 20 pgs.
"U.S. Appl. No. 14/187,413, Response filed Feb. 25, 2015 to Restriction Requirement mailed Feb. 16, 2016", 3 pgs.
"U.S. Appl. No. 14/187,413, Response filed May 26, 2016 to Non Final Office Action mailed Mar. 17, 2016", 15 pgs.
"U.S. Appl. No. 14/187,413, Response filed Jun. 8, 2017 to Non Final Office Action mailed Feb. 8, 2017", 15 pgs.
"U.S. Appl. No. 14/187,413, Response filed Oct. 28, 2016 to Final Office Action mailed Jul. 28, 2016", 17 pgs.
"U.S. Appl. No. 14/187,413, Response filed Nov. 27, 2017 to Final Office Action mailed Jun. 27, 2017", 14 pgs.
"U.S. Appl. No. 14/187,413, Response filed Dec. 21, 2016 to Final Office Action mailed Jul. 28, 2016 and Advisory Action mailed Nov. 10, 2016", 15 pgs.
"U.S. Appl. No. 14/187,413, Restriction Requirement mailed Feb. 16, 2016", 6 pgs.
"U.S. Appl. No. 14/190,715, Advisory Action mailed Aug. 16, 2018", 6 pgs.
"U.S. Appl. No. 14/190,715, Examiner Interview Summary mailed Oct. 31, 2018", 3 pgs.
"U.S. Appl. No. 14/190,715, Final Office Action mailed Feb. 20, 2018", 9 pgs.
"U.S. Appl. No. 14/190,715, Non Final Office Action mailed Aug. 10, 2017", 9 pgs.
"U.S. Appl. No. 14/190,715, Notice of Allowance mailed Mar. 4, 2019", 7 pgs.
"U.S. Appl. No. 14/190,715, Response filed Jul. 12, 2017 to Restriction Requirement mailed Apr. 12, 2017", 7 pgs.
"U.S. Appl. No. 14/190,715, Response filed Nov. 9, 2017 to Non Final Office Action mailed Aug. 10, 2017", 10 pgs.
"U.S. Appl. No. 14/190,715, Restriction Requirement mailed Apr. 13, 2017", 7 pgs.
"U.S. Appl. No. 14/192,019, Final Office Action mailed Jan. 10, 2019", 16 pgs.
"U.S. Appl. No. 14/192,019, Final Office Action mailed Nov. 28, 2017", 16 pgs.
"U.S. Appl. No. 14/192,019, Non Final Office Action mailed May 11, 2018", 16 pgs.
"U.S. Appl. No. 14/192,019, Non Final Office Action mailed May 19, 2017", 15 pgs.
"U.S. Appl. No. 14/192,019, Non Final Office Action mailed Jun. 25, 2019", 13 pgs.
"U.S. Appl. No. 14/192,019, Response filed Jun. 10, 2019 to Final Office Action mailed Jan. 20, 2019", 10 pgs.
"U.S. Appl. No. 14/192,019, Response filed Aug. 21, 2017 to Non Final Office Action mailed May 19, 2017", 13 pgs.
"U.S. Appl. No. 14/192,019, Response filed Sep. 11, 2018 to Non Final Office Action mailed May 11, 2018", 12 pgs.
"U.S. Appl. No. 14/192,019, Response filed Apr. 27, 2018 to Final Office Action mailed Nov. 28, 2017", 11 pgs.
"U.S. Appl. No. 14/804,953, Corrected Notice of Allowance mailed Jan. 25, 2018", 4 pgs.
"U.S. Appl. No. 14/804,953, Non Final Office Action mailed Sep. 15, 2016", 8 pgs.
"U.S. Appl. No. 14/804,953, Notice of Allowance mailed Feb. 27, 2017", 7 pgs.
"U.S. Appl. No. 14/804,953, Notice of Allowance mailed May 9, 2017", 7 pgs.
"U.S. Appl. No. 14/804,953, Notice of Allowance mailed Sep. 7, 2017", 7 pgs.
"U.S. Appl. No. 14/804,953, Response filed Dec. 15, 2016 to Non Final Office Action mailed Sep. 15, 2016", 7 pgs.
"U.S. Appl. No. 14/830,492, Final Office Action mailed Dec. 28, 2018", 9 pgs.
"U.S. Appl. No. 14/830,492, Non-Final Action mailed Mar. 15, 2018", 9 pgs.
"U.S. Appl. No. 14/830,492, Response filed Feb. 15, 2018 to Restriction Requirement mailed Dec. 15, 2017", 7 pgs.
"U.S. Appl. No. 14/830,492, Response filed Aug. 15, 2018 to Non Final Office Action mailed Mar. 15, 2018", 12 pgs.
"U.S. Appl. No. 14/830,492, Restriction Requirement mailed Dec. 15, 2017", 6 pgs.
"U.S. Appl. No. 14/957,795, Corrected Notice of Allowability mailed Feb. 1, 2019", 4 pgs.
"U.S. Appl. No. 14/957,795, Corrected Notice of Allowance mailed May 16, 2018", 4 pgs.
"U.S. Appl. No. 14/957,795, Final Office Action mailed Nov. 6, 2017", 17 pgs.
"U.S. Appl. No. 14/957,795, Non Final Office Action mailed Apr. 3, 2017", 19 pgs.
"U.S. Appl. No. 14/957,795, Notice of Allowance mailed Jan. 17, 2019", 7 pgs.
"U.S. Appl. No. 14/957,795, Notice of Allowance mailed Apr. 27, 2018", 8 pgs.
"U.S. Appl. No. 14/957,795, Notice of Allowance mailed Sep. 11, 2018", 9 pgs.
"U.S. Appl. No. 14/957,795, Response filed Apr. 3, 2018 to Final Office Action mailed Nov. 6, 2017", 11 pgs.
"U.S. Appl. No. 14/957,795, Response filed Aug. 3, 2017 to Non Final Office Action mailed Apr. 3, 2017", 17 pgs.
"U.S. Appl. No. 15/185,155, Corrected Notice of Allowability mailed May 15, 2019", 2 pgs.
"U.S. Appl. No. 15/185,155, Corrected Notice of Allowability mailed May 22, 2019", 2 pgs.
"U.S. Appl. No. 15/185,155, Examiner Interview Summary mailed Feb. 21, 2019", 3 pgs.
"U.S. Appl. No. 15/185,155, Final Office Action mailed Dec. 5, 2018", 11 pgs.
"U.S. Appl. No. 15/185,155, Non Final Office Action mailed Apr. 10, 2018", 13 pgs.

(56) References Cited

OTHER PUBLICATIONS

"U.S. Appl. No. 15/185,155, Notice of Allowance mailed Mar. 25, 2019", 7 pgs.
"U.S. Appl. No. 15/185,155, Response filed Aug. 6, 2018 to Non Final Office Action mailed Apr. 10, 2018", 10 pgs.
"U.S. Appl. No. 15/185,155, Response filed Mar. 5, 2019 to Final Office Action mailed Dec. 5, 2018", 9 pgs.
"U.S. Appl. No. 15/185,180, Non Final Office Action mailed Jan. 8, 2019", 14 pgs.
"U.S. Appl. No. 15/185,180, Response filed Nov. 19, 2018 to Restriction Requirement mailed Jun. 21, 2018", 9 pgs.
"U.S. Appl. No. 15/185,180, Response filed May 1, 2019 to Non Final Office Action mailed Jan. 8, 2019", 11 pgs.
"U.S. Appl. No. 15/185,180, Restriction Requirement mailed Jun. 21, 2018", 10 pgs.
"U.S. Appl. No. 15/574,201, Restriction Requirement mailed Sep. 5, 2018", 6 pgs.
"U.S. Appl. No. 15/574,205, Non Final Office Action mailed Sep. 11, 2018", 6 pgs.
"U.S. Appl. No. 15/590,685, Advisory Action mailed Dec. 12, 2018", 3 pgs.
"U.S. Appl. No. 15/590,685, Final Office Action mailed Jun. 7, 2018", 12 pgs.
"U.S. Appl. No. 15/590,685, Final Office Action mailed Jun. 26, 2019", 14 pgs.
"U.S. Appl. No. 15/590,685, Non Final Office Action mailed Jan. 11, 2019", 13 pgs.
"U.S. Appl. No. 15/590,685, Non Final Office Action mailed Oct. 6, 2017", 11 pgs.
"U.S. Appl. No. 15/590,685, Response filed Feb. 20, 2018 to Non Final Office Action mailed Oct. 6, 2017", 7 pgs.
"U.S. Appl. No. 15/590,685, Response filed Apr. 18, 2019 to NonFinal Office Action mailed Jan. 11, 2019", 11 pgs.
"U.S. Appl. No. 15/590,685, Response filed Nov. 30, 2018 to Final Office Action mailed Jun. 7, 2018", 10 pgs.
"U.S. Appl. No. 15/739,016, Non Final Office Action mailed Feb. 13, 2019", 6 pgs.
"U.S. Appl. No. 15/739,016, Response filed Jan. 28, 2019 to Restriction Requirement mailed Nov. 26, 2018", 8 pgs.
"U.S. Appl. No. 15/739,016, Restriction Requirement mailed Nov. 26, 2018", 5 pgs.
"U.S. Appl. No. 16/351,046, Non Final Office Action mailed Dec. 21, 2020", 8 pgs.
"Australian Application Serial No. 2011268661, First Examiner Report mailed Sep. 24, 2014", 5 pgs.
"Australian Application Serial No. 2011268661, Response filed Jul. 20, 2015 to First Examiner Report mailed Sep. 24, 2014", 8 pgs.
"Australian Application Serial No. 2011268661, Response filed Sep. 23, 2015 to Second Examiner Report mailed Aug. 18, 2015", 5 pgs.
"Australian Application Serial No. 2011268661, Second Examiner Report mailed Aug. 18, 2015", 6 pgs.
"Australian Application Serial No. 2012208921, First Examiner Report mailed Jun. 2, 2016", 7 pgs.
"Australian Application Serial No. 2012304223, First Examiner Report mailed Aug. 5, 2016", 4 pgs.
"Australian Application Serial No. 2012304223, Response filed Feb. 16, 2017 to First Examiner Report mailed Aug. 5, 2016", 25 pgs.
"Australian Application Serial No. 2013305427, Examination Report mailed Mar. 3, 2017", 4 pgs.
"Australian Application Serial No. 2013305427, Response filed Oct. 10, 2017 to Examination Report mailed Mar. 3, 2017", 30 pgs.
"Australian Application Serial No. 2013305428, Office Action mailed May 30, 2017", 5 pgs.
"Australian Application Serial No. 2013305428, Response filed May 15, 2018 to Office Action mailed May 30, 2017", 23 pgs.
"Australian Application Serial No. 2014231667, First Examination Report mailed Apr. 5, 2018", 4 pgs.
"Australian Application Serial No. 2014231667, Response filed Jan. 15, 2019 to Subsequent Examiners Report mailed Aug. 29, 2018", 12 pgs.
"Australian Application Serial No. 2014231667, Response filed Jul. 20, 2018 to First Examination Report mailed Apr. 5, 2018", 19 pgs.
"Australian Application Serial No. 2014231667, Subsequent Examiners Report mailed Aug. 29, 2018", 4 pgs.
"Australian Application Serial No. 2014231668, First Examination Report mailed Dec. 6, 2017", 6 pgs.
"Australian Application Serial No. 2014231668, Response filed Mar. 14, 2018 to First Examination Report mailed Dec. 6, 2017", 31 pgs.
"Australian Application Serial No. 2014231668, Subsequent Examiners Report mailed Apr. 5, 2018", 3 pgs.
"Australian Application Serial No. 2014231672, First Examiners Report mailed Jul. 14, 2017", 4 pgs.
"Australian Application Serial No. 2014231672, Response filed Oct. 9, 2017 to First Examiners Report mailed Jul. 14, 2017", 24 pgs.
"Australian Application Serial No. 2014231680, First Examiners Report mailed Aug. 4, 2017", 4 pgs.
"Australian Application Serial No. 2014231681, First Examiners Report mailed Jul. 12, 2017", 4 pgs.
"Australian Application Serial No. 2014231681, Response filed Jan. 30, 2018 to Subsequent Examiners Report mailed Sep. 26, 2017", 15 pgs.
"Australian Application Serial No. 2014231681, Response filed Apr. 26, 2018 to Subsequent Examiners Report mailed Mar. 13, 2018", 3 pgs.
"Australian Application Serial No. 2014231681, Response filed Sep. 15, 2017 to First Examiners Report mailed Jul. 12, 2017", 9 pgs.
"Australian Application Serial No. 2014231681, Subsequent Examiners Report mailed Mar. 13, 2018", 4 pgs.
"Australian Application Serial No. 2014231681, Subsequent Examiners Report mailed Sep. 26, 2017", 4 pgs.
"Australian Application Serial No. 2015230799, First Examiner Report mailed Mar. 27, 2017", 10 pgs.
"Australian Application Serial No. 2015230799, Response filed Feb. 16, 2018 to First Examiner Report mailed Mar. 27, 2017", 24 pgs.
"Australian Application Serial No. 2017204552, First Examination Report mailed Oct. 9, 2018", 3 pgs.
"Canadian Application Serial No. 2,801,352, Office Action mailed Jul. 4, 2017", 3 pgs.
"Canadian Application Serial No. 2,801,352, Office Action mailed Aug. 2, 2018", 3 pgs.
"Canadian Application Serial No. 2,801,352, Office Action mailed Aug. 15, 2016", 3 pgs.
"Canadian Application Serial No. 2,801,352, Response filed Jan. 29, 2019 to Office Action mailed Aug. 2, 2018", 12 pgs.
"Canadian Application Serial No. 2,801,352, Response filed Feb. 8, 2017 to Office Action mailed Aug. 15, 2016", 89 pgs.
"Canadian Application Serial No. 2,801,352, Response filed Dec. 18, 2017 to Office Action mailed Jul. 4, 2017", 8 pgs.
"Canadian Application Serial No. 2,843,763, Office Action mailed Dec. 4, 2014", 3 pgs.
"Canadian Application Serial No. 2,843,763, Response filed May 12, 2015 to Office Action mailed Dec. 4, 2014", 31 pgs.
"Canadian Application Serial No. 2,880,350, Examiner's Rule 30(2) Requisition mailed May 1, 2019", 4 pgs.
"Canadian Application Serial No. 2,880,353, Office Action mailed Apr. 29, 2019", 4 pgs.
"Canadian Application Serial No. 2,901,483, Office Action mailed Jul. 19, 2017", 3 pgs.
"Canadian Application Serial No. 2,901,483, Office Action mailed Nov. 23, 2016", 4 pgs.
"Canadian Application Serial No. 2,901,483, Response filed Jan. 16, 2018 to Office Action mailed Jul. 19, 2017", 28 pgs.
"Canadian Application Serial No. 2,901,483, Response filed May 23, 2017 to Office Action mailed Nov. 23, 2016", 40 pgs.

(56) References Cited

OTHER PUBLICATIONS

"Chapter 8—Heating, Ventilating, and Air Conditioning (HVAC) Demonstration", HVAC Demonstration, (published prior to Feb. 21, 2014), 16 pgs.
"Chinese Application Serial No. 201280006006.9, Office Action mailed Feb. 2, 2016", w/ English Summary, 19 pgs.
"Chinese Application Serial No. 201280006006.9, Response filed Apr. 8, 2016 to Office Action mailed Feb. 2, 2016", w/ English Translation of Claims, 64 pgs.
"Chinese Application Serial No. 201280006006.9, Voluntary Amendment filed Apr. 14, 2014", w/ English Translation of Claims, 83 pgs.
"Chinese Application Serial No. 201180031103.9, Office Action mailed Feb. 11, 2015", w/ English Translation, 16 pgs.
"Chinese Application Serial No. 201180031103.9, Office Action mailed Jun. 13, 2014", w/ English Translation, 19 pgs.
"Chinese Application Serial No. 201180031103.9, Office Action mailed Sep. 9, 2015", w/ English Translation, 7 pgs.
"Chinese Application Serial No. 201180031103.9, Office Action mailed Nov. 6, 2015", w/ English Translation, 5 pgs.
"Chinese Application Serial No. 201180031103.9, Response filed Apr. 27, 2015 to Office Action mailed Feb. 11, 2015", w/ English Translation, 15 pgs.
"Chinese Application Serial No. 201180031103.9, Response filed Sep. 26, 2014 to Office Action mailed Jun. 13, 2014", w/ English Translation, 12 pgs.
"Chinese Application Serial No. 201180031103.9, Response filed Sep. 29, 2015 to Office Action mailed Sep. 9, 2015", w/ English Translation, 78 pgs.
"Chinese Application Serial No. 201280006006.9, Office Action mailed May 13, 2015", w/ English Translation, 7 pgs.
"Chinese Application Serial No. 201280006006.9, Office Action mailed Aug. 15, 2016", w/ English Translation, 18 pgs.
"Chinese Application Serial No. 201280006006.9, Response filed Sep. 28, 2015 to Office Action mailed May 13, 2015", w/ English Translation of Claims, 71 pgs.
"Chinese Application Serial No. 201280006006.9, Response filed Dec. 30, 2016 to Office Action mailed Aug. 15, 2016", w/ English Translation of Claims, 69 pgs.
"Chinese Application Serial No. 201280042778.8, Office Action mailed Feb. 3, 2016", w/ English Translation, 9 pgs.
"Chinese Application Serial No. 201280042778.8, Office Action mailed Sep. 7, 2016", w/ English Translation of Claims, 17 pgs.
"Chinese Application Serial No. 201280042778.8, Response filed May 25, 2016 to Office Action mailed Feb. 3, 2016", w/ English Translation, 11 pgs.
"Chinese Application Serial No. 201280042778.8, Response filed Nov. 16, 2016 to Office Action mailed Sep. 7, 2016", w/ English Translation, 44 pgs.
"Chinese Application Serial No. 201380042926.0, Decision of Reexamination—Upholding Decision of Rejection mailed Mar. 15, 2019", w/ English Translation, 18 pgs.
"Chinese Application Serial No. 201380042926.0, Decision of Rejection mailed Jan. 5, 2018", w/ English Claims, 11 pgs.
"Chinese Application Serial No. 201380042926.0, Notice of Reexamination mailed Aug. 23, 2018", w/ English Machine Translation, 18 pgs.
"Chinese Application Serial No. 201380042926.0, Office Action mailed Feb. 26, 2016", w/ English Translation, 15 pgs.
"Chinese Application Serial No. 201380042926.0, Office Action mailed May 11, 2017", W/ English Translation, 13 pgs.
"Chinese Application Serial No. 201380042926.0, Office Action mailed Sep. 28, 2016", w/ English Translation, 12 pgs.
"Chinese Application Serial No. 201380042926.0, Request for Reexamination filed Apr. 20, 2018 to Decision of Rejection mailed Jan. 5, 2018", w/ English claims, 52 pgs.
"Chinese Application Serial No. 201380042926.0, Response filed Feb. 13, 2017 to Office Action mailed Sep. 28, 2016", w/ English Translation of Amended Claims, 56 pgs.
"Chinese Application Serial No. 201380042926.0, Response filed Jul. 7, 2016 to Office Action mailed Feb. 26, 2016", w/ English Translation of Claims, 40 pgs.
"Chinese Application Serial No. 201380042926.0, Response filed Sep. 26, 2017 to Office Action mailed May 11, 2017", w/ English Translation of Claims (not amended), 13 pgs.
"Chinese Application Serial No. 201380042926.0, Response filed Dec. 7, 2018 to Notice of Reexamination mailed Aug. 23, 2018", w/ English Translation, 15 pgs.
"Chinese Application Serial No. 201380044484.3, Examiner Interview Summary Jan. 3, 2018", w/ English Translation, 1 pg.
"Chinese Application Serial No. 201380044484.3, Office Action mailed Jan. 13, 2017", w/ English Translation, 16 pgs.
"Chinese Application Serial No. 201380044484.3, Office Action mailed Mar. 28, 2016", w/ English Translation, 16 pgs.
"Chinese Application Serial No. 201380044484.3, Office Action mailed Jul. 31, 2017", w/ English Translation, 21 pgs.
"Chinese Application Serial No. 201380044484.3, Response filed Jan. 3, 2018 to Examiner Interview Summary Jan. 3, 2018", w/ English claims, 53 pgs.
"Chinese Application Serial No. 201380044484.3, Response filed Mar. 28, 2017 to Office Action mailed Jan. 13, 2017", w/ English Translation of Claims, 58 pgs.
"Chinese Application Serial No. 201380044484.3, Response filed Oct. 12, 2016 to Office Action mailed Mar. 28, 2016", w/ English Translation of Claims, 54 pgs.
"Chinese Application Serial No. 201380044484.3, Response filed Oct. 12, 2017 to Office Action mailed Jul. 31, 2017", w/ English Translation of Claims, 54 pgs.
"Chinese Application Serial No. 201480014783.7, Office Action mailed Mar. 26, 2018", w/ English Translation, 16 pgs.
"Chinese Application Serial No. 201480014783.7, Office Action mailed Jun. 30, 2017", w/ English Translation, 19 pgs.
"Chinese Application Serial No. 201480014783.7, Response filed Jun. 11, 2018 to Office Action mailed Mar. 26, 2018", w/ English claims, 18 pgs.
"Chinese Application Serial No. 201480014783.7, Response filed Nov. 10, 2017 to Office Action mailed Jun. 30, 2017", w/ English Claims, 48 pgs.
"Chinese Application Serial No. 201480015355.6, Decision of Rejection mailed Mar. 18, 2019", w/ English Translation, 7 pgs.
"Chinese Application Serial No. 201480015355.6, Office Action mailed Jun. 14, 2018", w/ English Translation, 16 pgs.
"Chinese Application Serial No. 201480015355.6, Office Action mailed Oct. 13, 2017", w/ English Translation, 18 pgs.
"Chinese Application Serial No. 201480015355.6, Office Action mailed Nov. 28, 2016", w/ English Translation, 16 pgs.
"Chinese Application Serial No. 201480015355.6, Response filed Feb. 28, 2018 to Office Action mailed Oct. 13, 2017", w/ English claims, 36 pgs.
"Chinese Application Serial No. 201480015355.6, Response filed Jun. 13, 2017 to Office Action mailed Nov. 28, 2016", w/ English Translation of Claims, 36 pgs.
"Chinese Application Serial No. 201480015355.6, Response filed Dec. 4, 2018 to Office Action mailed Jun. 14, 2018", w/ English claims, 16 pgs.
"Chinese Application Serial No. 201480015422.4, Office Action mailed Nov. 1, 2016", w/ English Translation, 13 pgs.
"Chinese Application Serial No. 201480015422.4, Response filed May 12, 2017 to Office Action mailed Nov. 1, 2016", w/ English Translation of Claims, 47 pgs.
"Chinese Application Serial No. 201480015766.5, Office Action mailed Oct. 19, 2016", w/ English Translation, 9 pgs.
"Chinese Application Serial No. 201480015766.5, Response filed Jan. 20, 2017 to Office Action mailed Oct. 19, 2016", w/ English Translation of Claims, 52 pgs.
"Chinese Application Serial No. 201480016150.X, Office Action mailed Jun. 19, 2017", w/ English Translation, 22 pgs.
"Chinese Application Serial No. 201480016150.X, Response filed Nov. 2, 2017 to Office Action mailed Jun. 19, 2017", w/ English Claims, 82 pgs.
"Chinese Application Serial No. 201680048895.3, Office Action mailed Apr. 17, 2019", w/ English Translation, 33 pgs.

(56) References Cited

OTHER PUBLICATIONS

"Chinese Application Serial No. 201710339973.1, Office Action mailed Apr. 26, 2019", w/ English Translation, 9 pgs.
"Chinese Application Serial No. 201710708143.1, Office Action mailed Dec. 29, 2018", w/ English Translation, 9 pgs.
"Chinese Application Serial No. 201710708143.1, Response filed Apr. 29, 2019 to Office Action mailed Dec. 29, 2018", w/ English Claims, 10 pgs.
"Dehumidification Solutions", Des Champs Laboratories, Inc., (2001), 18 pgs.
"Desi-WringerTM Precision Desiccant Dehumidification Systems", Des Champs Technologies, (2007), 12 pgs.
"Energy Recovery—Fresh In Air Quality", SEMCO Inc., (published before Apr. 12, 2012), 131 pgs.
"European Application Serial No. 11797695.1, Communication Pursuant to Article 94(3) EPC mailed Aug. 24, 2018", 5 pgs.
"European Application Serial No. 11797695.1, Extended European Search Report mailed Jan. 25, 2016", 11 pgs.
"European Application Serial No. 11797695.1, Partial Supplementary European Search Report mailed Oct. 7, 2015", 6 pgs.
"European Application Serial No. 11797695.1, Response filed Jan. 9, 2019 to Communication Pursuant to Article 94(3) EPC mailed Aug. 24, 2018", 11 pgs.
"European Application Serial No. 11797695.1, Response filed Aug. 22, 2016 to Office Action mailed Feb. 11, 2016", 9 pgs.
"European Application Serial No. 12736074.1, Extended European Search Report mailed Jul. 13, 2015", 8 pgs.
"European Application Serial No. 12736074.1, Response filed Oct. 2, 2015 to Extended European Search Report mailed Jul. 13, 2015", 10 pgs.
"European Application Serial No. 12827918.9, Extended European Search Report mailed Jul. 6, 2015", 6 pgs.
"European Application Serial No. 12827918.9, Response filed Sep. 28, 2015 to Extended European Search Report mailed Jul. 6, 2015", 8 pgs.
"European Application Serial No. 13830357.3, Extended European Search Report mailed Jun. 8, 2016", 5 pgs.
"European Application Serial No. 13830357.3, Response filed Dec. 23, 2016 to Extended European Search Report mailed Jun. 8, 2016", 11 pgs.
"European Application Serial No. 13830940.6, Extended European Search Report mailed Jul. 4, 2016", 5 pgs.
"European Application Serial No. 13830940.6, Response filed Jan. 16, 2017 to Communication Pursuant to Rules 70(2) and 70a(2) EPC mailed Jul. 21, 2016", 1 pg.
"European Application Serial No. 14764192.2, Extended European Search Report mailed Oct. 27, 2016", 7 pgs.
"European Application Serial No. 14764192.2, Response filed Jan. 30, 2017 to Extended European Search Report mailed Oct. 27, 2016", 19 pgs.
"European Application Serial No. 14764192.2, Response filed Apr. 13, 2016 to Communication Pursuant Rules 161(2) and 162 EPC mailed Nov. 19, 2015", 9 pgs.
"European Application Serial No. 14764305.0, Communication Pursuant to Article 94(3) EPC Feb. 14, 2019", 4 pgs.
"European Application Serial No. 14764305.0, Extended European Search Report mailed Apr. 4, 2017", 8 pgs.
"European Application Serial No. 14764305.0, Response filed Apr. 13, 2016 to Communication Pursuant to Article 94(3) EPC mailed Oct. 8, 2015", 10 pgs.
"European Application Serial No. 14764305.0, Response filed Oct. 31, 2017 to Extended European Search Report mailed Apr. 4, 2017", 7 pgs.
"European Application Serial No. 14764318.3, Extended European Search Report mailed Mar. 15, 2017", 10 pgs.
"European Application Serial No. 14764318.3, Response filed Jan. 28, 2016 to Communication pursuant to Rules 161(1) and 162 EPC mailed Nov. 19, 2015", 17 pgs.
"European Application Serial No. 14764318.3, Response filed Oct. 10, 2017 to Extended European Search Report mailed Mar. 15, 2017", 11 pgs.
"European Application Serial No. 14764713.5, Communication pursuant to Article 94(3) EPC mailed Dec. 18, 2018", 3 pgs.
"European Application Serial No. 14764713.5, Extended European Search Report mailed Dec. 9, 2016", 6 pgs.
"European Application Serial No. 14764713.5, Response filed Jan. 28, 2016 to Communication pursuant to Rules 161(1) and 162 EPC mailed Dec. 2, 2015", 9 pgs.
"European Application Serial No. 14764713.5, Response filed Jul. 13, 2017 to Extended European Search Report mailed Dec. 9, 2016", 9 pgs.
"European Application Serial No. 14765396.8, Communication Pursuant to Article 94(3) EPC mailed Dec. 5, 2018", 4 pgs.
"European Application Serial No. 14765396.8, Extended European Search Report mailed Oct. 28, 2016", 6 pgs.
"European Application Serial No. 14765396.8, Office Action mailed Nov. 20, 2015", 2 pgs.
"European Application Serial No. 14765396.8, Response filed Jan. 29, 2016 to Office Action mailed Nov. 20, 2015", 12 pgs.
"European Application Serial No. 14765396.8, Response filed May 23, 2019 to Communication Pursuant to Article 94(3) EPC mailed Dec. 5, 2018", 16 pgs.
"European Application Serial No. 14765396.8, Response filed May 25, 2017 to Extended European Search Report mailed Oct. 28, 2016", 5 pgs.
"European Application Serial No. 15834201.4, Extended European Search Report mailed Mar. 16, 2018", 8 pgs.
"European Application Serial No. 15834201.4, Response filed Oct. 9, 2017 to Communication Pursuant to Rules 161(2) and 162 EPC mailed Mar. 29, 2017", 15 pgs.
"European Application Serial No. 15834201.4, Response filed Oct. 15, 2018 to Extended European Search Report mailed Mar. 16, 2018", 17 pgs.
"European Application Serial No. 16795581.4, Extended European Search Report mailed Feb. 12, 2019", 9 pgs.
"European Application Serial No. 16795581.4, Response filed Aug. 6, 2018 to Communication Pursuant to Rules 161(2) and 162 EPC mailed Jan. 26, 2018", 16 pgs.
"European Application Serial No. 16795582.2, Extended European Search Report mailed Nov. 20, 2018", 8 pgs.
"European Application Serial No. 16795582.2, Response filed Jun. 17, 2019 to Extended European Search Report mailed Nov. 20, 2018", 16 pgs.
"European Application Serial No. 16795582.2, Response filed Jul. 17, 2018 to Communication Pursuant to Rules 161(2) and 162 EPC mailed Jan. 8, 2018", 12 pgs.
"European Application Serial No. 16813836.0, Extended European Search Report mailed Mar. 25, 2019", 9 pgs.
"European Application Serial No. 16813836.0, Partial Supplementary European Search Report mailed Dec. 5, 2018", 11 pgs.
"European Application Serial No. 16813836.0, Response filed Aug. 21, 2018 to Communication Pursuant to Rules 161(2) and 162 EPC mailed Feb. 13, 2018", 37 pgs.
"European Application Serial No. 17762365.9, Response filed Apr. 25, 2019 to Communication Pursuant to Rules 161 and 162 mailed Oct. 16, 2018", 12 pgs.
"European Application Serial No. 18153408.2, Communication Pursuant to Rule 55 EPC mailed May 17, 2018", 2 pgs.
"European Application Serial No. 18153408.2, Extended European Search Report mailed Dec. 4, 2018", 5 pgs.
"European Application Serial No. 18160812.6, Extended European Search Report mailed Feb. 11, 2019", 6 pgs.
"European Application Serial No. 18211142.7, Extended European Search Report mailed Apr. 11, 2019", 6 pgs.
"European Application Serial No. 18214518.5, Extended European Search Report mailed Apr. 17, 2019", 5 pgs.
"International Application Serial No. PCT/CA2012/000055, International Preliminary Report on Patentability mailed Aug. 1, 2013", 9 pgs.
"International Application Serial No. PCT/CA2012/000055, International Search Report mailed May 24, 2012", 4 pgs.

(56) References Cited

OTHER PUBLICATIONS

"International Application Serial No. PCT/CA2012/000055, Invitation to Pay Add'l Fees and Partial Search Report Mailed Mar. 23, 2012", 2 pgs.
"International Application Serial No. PCT/CA2012/000055, Written Opinion mailed May 24, 2012", 7 pgs.
"International Application Serial No. PCT/CA2012/00055, International Preliminary Report on Patentability mailed Aug. 1, 2013", 9 pgs.
"International Application Serial No. PCT/CA2012/00055, International Search Report mailed May 24, 2012", 4 pgs.
"International Application Serial No. PCT/CA2012/00055, Written Opinion mailed May 24, 2012", 7 pgs.
"International Application Serial No. PCT/CA2012/000749, International Search Report mailed Oct. 26, 2012", 3 pgs.
"International Application Serial No. PCT/CA2012/000749, Written Opinion mailed Oct. 26, 2012", 5 pgs.
"International Application Serial No. PCT/CA2013/000608, International Preliminary Report on Patentability mailed Mar. 5, 2015", 7 pgs.
"International Application Serial No. PCT/CA2013/000608, International Search Report mailed Sep. 23, 2013", 3 pgs.
"International Application Serial No. PCT/CA2013/000608, Written Opinion mailed Sep. 23, 2013", 5 pgs.
"International Application Serial No. PCT/CA2013/000609, International Preliminary Report on Patentability mailed Mar. 5, 2015", 7 pgs.
"International Application Serial No. PCT/CA2013/000609, International Search Report mailed Sep. 17, 2013", 3 pgs.
"International Application Serial No. PCT/CA2013/000609, Written Opinion mailed Sep. 17, 2013", 5 pgs.
"International Application Serial No. PCT/CA2013/000964, International Search Report mailed Feb. 7, 2014", 3 pgs.
"International Application Serial No. PCT/CA2013/000964, Written Opinion mailed Feb. 7, 2014", 6 pgs.
"International Application Serial No. PCT/CA2014/000048, International Preliminary Report on Patentability mailed Sep. 24, 2015", 8 pgs.
"International Application Serial No. PCT/CA2014/000048, International Search Report mailed Apr. 29, 2014", 3 pgs.
"International Application Serial No. PCT/CA2014/000048, Written Opinion mailed Apr. 29, 2014", 6 pgs.
"International Application Serial No. PCT/CA2014/000083, International Preliminary Report on Patentability mailed Sep. 24, 2015", 9 pgs.
"International Application Serial No. PCT/CA2014/000083, International Search Report mailed May 14, 2014", 3 pgs.
"International Application Serial No. PCT/CA2014/000083, Written Opinion mailed May 14, 2014", 7 pgs.
"International Application Serial No. PCT/CA2014/000148, International Preliminary Report on Patentability mailed Sep. 24, 2015", 5 pgs.
"International Application Serial No. PCT/CA2014/000148, International Search Report mailed May 9, 2014", 4 pgs.
"International Application Serial No. PCT/CA2014/000148, Written Opinion mailed May 9, 2014", 3 pgs.
"International Application Serial No. PCT/CA2014/000169, International Preliminary Report on Patentability mailed Sep. 24, 2015", 8 pgs.
"International Application Serial No. PCT/CA2014/000169, International Search Report mailed May 27, 2014", 3 pgs.
"International Application Serial No. PCT/CA2014/000169, Written Opinion mailed May 27, 2014", 6 pgs.
"International Application Serial No. PCT/CA2014/000171, International Preliminary Report on Patentability mailed Sep. 24, 2015", 7 pgs.
"International Application Serial No. PCT/CA2014/000171, International Search Report mailed May 27, 2014", 3 pgs.
"International Application Serial No. PCT/CA2014/000171, Written Opinion mailed May 27, 2014", 5 pgs.
"International Application Serial No. PCT/CA2015/050787, International Search Report mailed Nov. 4, 2015", 3 pgs.
"International Application Serial No. PCT/CA2015/050787, Written Opinion mailed Nov. 4, 2015", 3 pgs.
"International Application Serial No. PCT/CA2016/050252, International Preliminary Report on Patentability mailed Nov. 30, 2017", 6 pgs.
"International Application Serial No. PCT/CA2016/050252, International Search Report mailed May 26, 2016", 3 pgs.
"International Application Serial No. PCT/CA2016/050252, Written Opinion mailed May 26, 2016", 4 pgs.
"International Application Serial No. PCT/CA2016/050507, International Preliminary Report on Patentability mailed Nov. 30, 2017", 5 pgs.
"International Application Serial No. PCT/CA2016/050507, International Search Report mailed Jul. 21, 2016", 3 pgs.
"International Application Serial No. PCT/CA2016/050507, Written Opinion mailed Jul. 21, 2016", 3 pgs.
"International Application Serial No. PCT/CA2017/050180, International Preliminary Report on Patentability mailed Sep. 20, 2018", 6 pgs.
"International Application Serial No. PCT/CA2017/050180, International Search Report mailed Apr. 26, 2017", 3 pgs.
"International Application Serial No. PCT/CA2017/050180, Written Opinion mailed Apr. 26, 2017", 4 pgs.
"International Application Serial No. PCT/IB2011/002145, International Preliminary Report on Patentability mailed Jan. 10, 2013", 13 pgs.
"International Application Serial No. PCT/IB2011/002145, International Search Report mailed Feb. 15, 2012", 7 pgs.
"International Application Serial No. PCT/IB2011/002145, Written Opinion mailed Feb. 15, 2012", 11 pgs.
"International Application Serial No. PCT/IB2016/053799, International Preliminary Report on Patentability mailed Jan. 4, 2018", 8 pgs.
"International Application Serial No. PCT/IB2016/053799, International Search Report mailed Aug. 26, 2016", 3 pgs.
"International Application Serial No. PCT/IB2016/053799, Written Opinion mailed Aug. 26, 2016", 6 pgs.
"International Application Serial No. PCT/US00/02956, International Preliminary Report on Patentability dated Jul. 9, 2001", 3 pgs.
"International Application Serial No. PCT/US00/02956, International Search Report mailed Nov. 8, 2000", 1 pg.
"Machine Translation of JP 09113167 A", Espacenet Patent Translate, [Online] Retrieved from the internet: <URL: https://worldwide.espacenet.com/publicationDetails/description?CC=JP&NR=H09113167A&KC=A&FT=D&ND=3&date=19970502&DB=&locale=en_EP>, (retrieved Dec. 24, 2018), 7 pgs.
"Meeting Programs", ASHRAE Technical Committee, (1997-2001), 13 pgs.
"Plane plate membrane contactor prototypes", University of Genoa, (Published prior to Mar. 28, 2013), 1 pg.
"Singapore Application Serial No. 11201710777Y, Office Action mailed Jan. 31, 2019", in English, 7 pgs.
"Singaporean Application Serial No. 11201709404P, Written Opinion mailed Feb. 22, 2019", in English, 8 pgs.
"Translation of CN 201906567 U", Espacenet Patent Translate, [Online] Retrieved from the internet: <URL: http://translationportal.epo.org/emtp/translate/?ACTION=description-retrieval&COUNTRY=CN&ENGINE=google&FORMAT=docdb&KIND=U&LOCALE=en_EP&NUMBER=201906567&OPS=ops.epo.org/3.2&SRCLANG=zh&TRGLANG=en>, (Feb. 2, 2018), 4 pgs.
"Two-Wheel Desiccant Dehumidification System—Technology for Dehumidification and Improving Indoor Air Quality", Federal Technology Alert, (Apr. 1997), 24 pgs.
Abdel-Salam, Mohamed R. H., et al., "Experimental Study of Effects of Phase-Change Energy and Operating Parameters on Performances of Two-Fluid and Three-Fluid Liquid-to-Air Membrane Energy Exchangers", ASHRAE Transactions, vol. 122, Part 1, (Jan. 2016), 134-145.
Abdel-Salam, Mohamed R. H., et al., "Performance testing of 2-fluid and 3-fluid liquid-to-air membrane energy exchangers for

(56) References Cited

OTHER PUBLICATIONS

HVAC applications in cold-dry climates", International Journal of Heat and Mass Transfer, 106, (2017), 12 pgs.
Abdel-Salam, Mohamed R. H., et al., "Performance testing of a novel 3-fluid liquid-to-air membrane energy exchanger (3-fluid LAMEE) under desiccant solution regeneration operating conditions", International Journal of Heat and Mass Transfer, 95, (2015), 14 pgs.
Acker, William, "Industrial Dehumidification: Water Vapor Load Calculations And System Descriptions", HPAC Heating/Piping/Air Conditioning, (Mar. 1999), 49-59.
Bellia, L., et al., "Air Conditioning Systems With Desiccant Wheel for Italian Climates", International Journal on Architectural Science, vol. 1 No. 4, (2000), 193-213.
Bergero, Stefano, et al., "On the performances of a hybrid air-conditioning system in different climatic conditions", Energy 36(8), (2011), 13 pgs.
Bergero, Stefano, et al., "Performance analysis of a liquid desiccant and membrane contactor hybrid air-conditioning system", Energy and Buildings 42, (2010), 11 pgs.
Chant, Eileen E., et al., "A Steady-State Simulation Of An Advanced Desiccant-Enhanced Cooling And Dehumidification System", ASHRAE Transactions: Research, (Jul. 1992), 339-347.
Coad, William J., "Conditioning Ventilation Air for Improved Performance and Air Quality", HPAC Heating/Piping/Air Conditioning, (Sep. 1999), 6 pgs.
Diblasio, Robert, "Desiccants in Hospitals—Conditioning A Research Facility", Engineered Systems, (Sep. 1995), 4 pgs.
Downing, et al., "Operation and Maintenance for Quality Indoor Air", Proc. of the 7th Symposium On Improving Building Systems in Hot and Humid Climates, Ft. Worth, TX, (Oct. 9, 1990), 5 pgs.
Downing, Chris, "Humidity Control—No Place Like Home", Engineered Systems, (1996), 4 pgs.
Erb, Blake, et al., "Experimental Measurements of a Run-Around Membrane Energy Exchanger (RAMEE) with Comparison to a Numerical Model", ASHRAE Transactions, vol. 115, Part 2, (2009), 689-705.
Fischer, J., et al., "Active Desiccant Dehumidification Module Integration With Rooftop Packaged HVAC Units—Final Report Phase 3B", Oak Ridge National Laboratory, Final Report: Phase 3B, (Mar. 2002), 36 pgs.
Fischer, John C., "Optimizing IAQ, Humidity Control, and Energy Efficiency In School Environments Through The Application Of Desiccant-Based Total Energy Recovery Systems", IAQ Atlanta: Paths to Better Building Environments/Environmental Effects on Heath and Productivity, (1996), 16 pgs.
Harriman, III, et al., "Dehumidification and Cooling Loads From Ventilation Air", ASHRAE Journal, (Nov. 1997), 7 pgs.
Harriman, III, et al., "Evaluating Active Desiccant Systems For Ventilating Commercial Buildings", ASHRAE Journal, (Oct. 1999), 7 pgs.
Harriman, III, et al., "New Weather Data For Energy Calculations", ASHRAE Journal, (Mar. 1999), 7 pgs.
Jeong, et al., "Energy Conservation Benefits of a Dedicated Outdoor Air System with Parallel Sensible Cooling By Ceiling Radiant Panels", ASHRAE Transactions; vol. 109. Part 2, (2003), 10 pgs.
Karniadakis, George E., et al., "Minimum-dissipation transport enhancement by flow destabilization: Reynolds' analogy revisited", J. Fluid Mech vol. 192, (1988), 365-391.
Kosar, Douglas R., et al., "Dehumidification Issues of Standard 62-1989", ASHRAE Journal, (Mar. 1998), 71-75.
Larson, Michael D., et al., "The elastic and moisture transfer properties of polyethylene and polypropylene membranes for use in liquid-to-air energy exchangers", Journal of Membrane Science 302, (2007), 14 pgs.
Larson, Michael David, et al., "The Performance of Membranes in a Newly Proposed Run-Around Heat and Moisture Exchanger", MS Thesis in Mechanical Engineering, University of Saskatchewan, Saskatoon, Canada, [Online] Retrieved from the internet: <URL: http://libran.usask.ca/theses/available/etd-12192006-094159/umestricted/LarsonThesis.pdf>, (Dec. 2006), 177 pgs.
Lepoudre, P., et al., "Channel Flow with Sinusoidal Screen Insert", Dept. of Mech Engineering, Univ. of Saskatchewan, Proceedings of the 19th Annual Conference of the CFD Society of Canada, Montreal, (Apr. 2011), 6 pgs.
Mahmud, Khizir, "Design and Performance Testing of Counter-Cross-Flow Run-Around Membrane Energy Exchanger System", MS Thesis in Mechanical Engineering, University of Saskatchewan, Saskatoon, Canada, [Online] Retrieved form the internet: <URL: http://libranusask.ca/theses/ available/ etd-09092009-223833/ umestricted/KhizirMahmud2009-Sep-28a.pdf>, (Sep. 2009), 168 pgs.
Mahmud, Khizir, et al., "Performance testing of a counter-cross-flow run-around membrane energy exchanger (RAMEE) system for HVAC applications", Energy and Buildings, 42, (2010), 9 pgs.
McGahey, Kevin, et al., "Desiccants: Benefits for the Second Century of Air Conditioning", Proceedings of the 10th Symposium On Improving Building Systems In Hot and Humid Climates, Ft. Worth, Texas, (May 14, 1996), 9 pgs.
McGahey, Kevin, "New Commercial Applications For Desiccant-Based Cooling", ASHRAE Journal, (Jul. 1998), 41-45.
Mumma, Stanley A., et al., "Achieving Dry Outside Air in an Energy-Efficient Manner", ASHRAE Transactions 2001, vol. 107, Part 1, (2001), 8 pgs.
Mumma, Stanley A., "Dedicated Outdoor Air-Dual Wheel System Control Requirements", ASHRAE Transactions, vol. 107, Part 1, (2001), 9 pgs.
Mumma, Stanley A., et al., "Extension of the Multiple Spaces Concept of ASH RAE Standard 62 to Include Infiltration, Exhaust/Exfiltration, Interzonal Transfer, and Additional Short-Circuit Paths", ASHRAE Transactions: Symposia, (1998), 1232-1241.
Mumma, Stanley A, "Overview of Integrating Dedicated Outdoor Air Systems With Parallel Terminal Systems", ASHRAE Transactions vol. 107, Part 1, (2001), 7 pgs.
Nimmo, B. G., et al., "DEAC: Desiccant Enhancement of Cooling-Based Dehumidification", ASHRAE Transactions: Symposia, (1993), 842-848.
Qin, C. K., et al., "Engine-driven Desiccant-assisted Hybrid Air-conditioning System", 23rd World Gas Conference, Amsterdam, (2006), 15 pgs.
Ryan, K., et al., "Three-dimensional transition in the wake of bluff elongated cylinders", J. Fluid Mech., vol. 538, (2005), 29 pgs.
Scofield, C. Mike, et al., "HVAC Design for Classrooms: Divide and Conquer", Heating/Piping/Air Conditioning, (May 1993), 53-59.
Sevigny, Scoot P., et al., "Air Handling Unit Direct Digital Control System Retrofit To Provide Acceptable Indoor Air Quality And Global Energy Optimization", Energy Engineering, vol. 94, No. 5, (1997), 24-43.
Shank, Kurt M., et al., "Selecting the Supply Air Conditions for a Dedicated Outdoor Air System Working in Parallel with Distributed Sensible Cooling Terminal Equipment", ASHRAE Transactions, vol. 107, Part 1, (2001), 10 pgs.
Smith, Christopher S., et al., "Outdoor Air, Heat Wheels and JC Penny: A New Approach to Retail Ventilation", Proc. of the 11th Symposium On Improving Building Systems In Hot and Humid Climates, Ft. Worth, Texas, (Jun. 2, 1998), 1 pg.
Smith, James C., "Schools Resolve IAQ/Humidity Problems with Desiccant Preconditioning", Heating/Piping/Air Conditioning, (Apr. 1996), 6 pgs.
Sonin, Ain A., et al., "Optimization of Flow Design in Forced Flow Electrochemical Systems, with Special Application to Electrodialysis", Ind. Eng. Chem, Process Des. Develop vol. 13, No. 3, (1974), 8 pgs.
Swails, James F., et al., "A Cure for Growing Pains", Consulting Specifying Engineer, [Online] Retrieved from the internet: <URL: https://www.csemag.com>, (Jun. 1997), 4 pgs.
Turpin, Joanna, "Dehumidification: The Problem No One Wants To Talk About", [Online] Retrieved from the internet: <URL: http//www.esmagazine.com/copyrighVde12c1c879ba8010VgnVCM100000f932a8c0_?>, (Apr. 5, 2000), 6 pgs.
Vali, Alireza, "Modeling a Run-Around Heat and Moisture Exchanger Using Two Counter/Cross Flow Exchangers", MS Thesis in Mechanical Engineering, University of Saskatchewan, Saskatoon, Canada,

(56) References Cited

OTHER PUBLICATIONS

[Online] Retrieved from the internet: <URL: http://library.usask.ca/theses/mailable/etd-06032009-15-J.6-J.-1./unrestricted/Vali.AlirezaThesis.pdf>, (2009), 193 pgs.

Vali, Alireza, et al., "Numerical model and effectiveness correlations for a run-around heat recovery system with combined counter and cross flow exchangers", International Journal of Heat and Mass Transfer 52, (2009), 14 pgs.

Woods, J, et al., "Desiccant Enhanced Evaporative Air Conditioning: Parametric Analysis and Design", 2nd International Conference on Building Energy and Environment (COBEE), (Oct. 2012), 10 pgs.

Yborra, Stephen C., "Field Evaluation of Desiccant-Integrated HVAC Systems: A Review of Case Studies in Multiple Commercial/Institutional Building Types", Proc. of the 11th Symposium On Improving Building Systems In Hot and Humid Climates, Ft. Worth, Texas, (Jun. 2, 1998), 10 pgs.

"U.S. Appl. No. 14/187,413, Appeal Decision mailed Mar. 10, 2022", 11 pgs.

"European Application Serial No. 21154403.6, Response filed 12-0921 to Extended European Search Report mailed Apr. 26, 2021", 15 pgs.

"U.S. Appl. No. 16/784,822, Non Final Office Action mailed Mar. 14, 2022", 9 pgs.

U.S. Appl. No. 14/830,492 U.S. Pat. No. 10,712,024, filed Aug. 19, 2015, Liquid to Air Membrane Energy Exchangers.

U.S. Appl. No. 16/891,857, filed Jun. 3, 2020, Liquid to Air Membrane Energy Exchangers.

U.S. Appl. No. 16/918,722, filed Jul. 1, 2020, Three-Fluid Liquid to Air Membrane Energy Exchanger.

U.S. Appl. No. 15/739,016 U.S. Pat. No. 10,962,252, filed Dec. 21, 2017, Three-Fluid Liquid to Air Membrane Energy Exchanger.

U.S. Appl. No. 13/449,598 U.S. Pat. No. 9,810,439, filed Apr. 18, 2012, Energy Exchange System for Conditioning Air in an Enclosed Structure.

U.S. Appl. No. 15/185,180 U.S. Pat. No. 10,928,082, filed Jun. 17, 2016, Energy Exchange System for Conditioning Air in an Enclosed Structure.

U.S. Appl. No. 17/168,928, filed Feb. 5, 2021, Energy Exchange System for Conditioning Air in an Enclosed Structure.

U.S. Appl. No. 13/702,596 U.S. Pat. No. 9,234,665, filed Apr. 15, 2013, Liquid-to-Air Membrane Energy Exchanger.

U.S. Appl. No. 14/957,795 U.S. Pat. No. 10,302,317, filed Dec. 3, 2015, Liquid-to-Air Membrane Energy Exchanger.

U.S. Appl. No. 16/351,046, filed Mar. 12, 2019, Liquid-to-Air Membrane Energy Exchanger.

U.S. Appl. No. 13/737,473, filed Jan. 9, 2013, System and Method for Providing Conditioned Air to an Enclosed Structure.

U.S. Appl. No. 13/797,152 U.S. Pat. No. 9,816,760, filed Mar. 12, 2013, Liquid Panel Assembly.

U.S. Appl. No. 15/590,685 U.S. Pat. No. 11,035,618, filed May 9, 2017, Liquid Panel Assembly.

U.S. Appl. No. 17/231,634, filed Apr. 15, 2021, Liquid Panel Assembly.

U.S. Appl. No. 13/797,062, filed Mar. 12, 2013, Membrane Support Assembly for an Energy Exchanger.

U.S. Appl. No. 14/187,413, filed Feb. 24, 2014, Evaporative Cooling System With Liquid-to-Air Membrane Energy Exchanger.

U.S. Appl. No. 13/801,280 U.S. Pat. No. 9,109,808, filed Mar. 13, 2013, Variable Desiccant Control Energy Exchange System and Method.

U.S. Appl. No. 14/804,953 U.S. Pat. No. 9,909,768, filed Jul. 21, 2015, Variable Desiccant Control Energy Exchange System and Method.

U.S. Appl. No. 15/185,155 U.S. Pat. No. 10,480,801, filed Jun. 17, 2016, Variable Desiccant Control Energy Exchange System and Method.

U.S. Appl. No. 16/661,463, filed Oct. 23, 2019, Variable Desiccant Control Energy Exchange System and Method.

U.S. Appl. No. 14/192,019, filed Feb. 27, 2014, Energy Exchange Assembly With Microporous Membrane.

U.S. Appl. No. 14/190,715 U.S. Pat. No. 10,352,628, filed Feb. 26, 2014, Membrane-Integrated Energy Exchange Assembly.

U.S. Appl. No. 16/431,397, filed Jun. 4, 2019, Membrane-Integrated Energy Exchange Assembly.

U.S. Appl. No. 14/171,951 U.S. Pat. No. 10,584,884, filed Feb. 4, 2014, Control System and Method for a Liquid Desiccant Air Delivery System.

U.S. Appl. No. 16/784,822, filed Feb. 7, 2020, Control System and Method for a Liquid Desiccant Air Delivery System.

U.S. Appl. No. 60/163,731, filed Nov. 5, 1999, Humidity Pump.

U.S. Appl. No. 10/048,797 U.S. Pat. No. 6,684,649, filed Jan. 31, 2002, Enthalpy Pump.

"U.S. Appl. No. 13/797,062 , Appeal Decision mailed Jun. 18, 2021", 12 pgs.

"U.S. Appl. No. 13/797,062, Appeal Brief filed Mar. 25, 2020", 27 pgs.

"U.S. Appl. No. 13/797,062, Final Office Action mailed Jul. 25, 2019", 50 pgs.

"U.S. Appl. No. 13/797,062, Respnose filed Jun. 28, 2019 to Non Final Office Action mailed Jun. 28, 2019", 12 pgs.

"U.S. Appl. No. 14/171,951, Notice of Allowance mailed Nov. 6, 2019", 6 pgs.

"U.S. Appl. No. 14/187,413 Response to Non-Final Office Action filed Jun. 2, 2020", 25 pgs.

"U.S. Appl. No. 14/187,413, Examiner's Answer mailed Jun. 11, 2021", 10 pgs.

"U.S. Appl. No. 14/187,413, Final Office Action mailed Jun. 15, 2020", 19 pgs.

"U.S. Appl. No. 14/187,413, Non Final Office Action mailed Jul. 31, 2019", 22 pgs.

"U.S. Appl. No. 14/830,492, Corrected Notice of Allowability mailed Jun. 15, 2020", 2 pgs.

"U.S. Appl. No. 14/830,492, Notice of Allowance mailed Feb. 27, 2020", 5 pgs.

"U.S. Appl. No. 14/830,492, Notice of Allowance mailed Sep. 24, 2019", 7 pgs.

"U.S. Appl. No. 14/830,492, Response filed Jun. 29, 2019 to Final Office Action mailed Dec. 28, 2018", 6 pgs.

"U.S. Appl. No. 15/185,155, Notice of Allowance mailed Jul. 17, 2019", 8 pgs.

"U.S. Appl. No. 15/185,180, Final Office Action mailed Jul. 31, 2019", 15 pgs.

"U.S. Appl. No. 15/185,180, Notice of Allowance mailed Oct. 15, 2020", 6 pgs.

"U.S. Appl. No. 15/574,201, Non Final Office Action mailed Jan. 15, 2020", 8 pgs.

"U.S. Appl. No. 15/574,201, Non Final Office Action mailed Jan. 26, 2021", 8 pgs.

"U.S. Appl. No. 15/574,201, Non Final Office Action mailed Jan. 29, 2019", 6 pgs.

"U.S. Appl. No. 15/574,201, Notice of Allowance mailed May 21, 2020", 5 pgs.

"U.S. Appl. No. 15/574,201, Notice of Allowance mailed Jun. 4, 2021", 5 pgs.

"U.S. Appl. No. 15/574,201, Notice of Allowance mailed Aug. 20, 2019", 7 pgs.

"U.S. Appl. No. 15/574,201, Notice of Allowance mailed Sep. 10, 2020", 6 pgs.

"U.S. Appl. No. 15/574,201, Response Filed Jan. 7, 2019 to Restriction Requirement mailed Sep. 5, 2018", 8 pgs.

"U.S. Appl. No. 15/574,201, Response filed May 15, 2020 to Non Final Office Action mailed Jan. 15, 2020", 13 pgs.

"U.S. Appl. No. 15/574,201, Response filed May 26, 2021 to Non Final Office Action mailed Jan. 26, 2021", 10 pgs.

"U.S. Appl. No. 15/574,201, Response filed Jul. 29, 2019 to Non-Final Office Action mailed Jan. 29, 2019", 12 pgs.

"U.S. Appl. No. 15/574,205, Corrected Notice of Allowability mailed Apr. 17, 2020", 2 pgs.

"U.S. Appl. No. 15/574,205, Non Final Office Action mailed Jun. 17, 2019", 3 pgs.

"U.S. Appl. No. 15/574,205, Notice of Allowance mailed Feb. 13, 2019", 6 pgs.

(56) References Cited

OTHER PUBLICATIONS

"U.S. Appl. No. 15/574,205, Notice of Allowance mailed Apr. 9, 2020", 5 pgs.
"U.S. Appl. No. 15/574,205, Notice of Allowance mailed Dec. 2, 2019", 5 pgs.
"U.S. Appl. No. 15/574,205, Response filed Jan. 11, 2019 to Non-Final Office Action mailed Sep. 11, 2018", 12 pgs.
"U.S. Appl. No. 15/574,205, Response filed Nov. 18, 2019 to Non-Final Office Action mailed Jun. 17, 2019", 8 pgs.
"U.S. Appl. No. 15/590,685, Examiner Interview Summary mailed Dec. 11, 2020", 3 pgs.
"U.S. Appl. No. 15/590,685, Non Final Office Action mailed Jan. 7, 2020", 15 pgs.
"U.S. Appl. No. 15/590,685, Notice of Allowance mailed Feb. 9, 2021", 6 pgs.
"U.S. Appl. No. 15/590,685, PTO Response to Rule 312 Communication mailed Apr. 27, 2021", 2 pgs.
"U.S. Appl. No. 15/590,685, Response filed Dec. 19, 2019 to Final Office Action mailed Jun. 26, 2019", 11 pgs.
"U.S. Appl. No. 15/739,016, Corrected Notice of Allowability mailed Jul. 1, 2020", 2 pgs.
"U.S. Appl. No. 15/739,016, Notice of Allowance mailed Mar. 25, 2020", 5 pgs.
"U.S. Appl. No. 15/739,016, Notice of Allowance mailed Aug. 1, 2019", 6 pgs.
"U.S. Appl. No. 15/739,016, Notice of Allowance mailed Nov. 20, 2019", 7 pgs.
"U.S. Appl. No. 15/814,153, Corrected Notice of Allowability mailed May 13, 2021", 3 pgs.
"U.S. Appl. No. 15/814,153, Corrected Notice of Allowability mailed May 27, 2021", 3 pgs.
"U.S. Appl. No. 15/814,153, Non Final Office Action mailed Jul. 6, 2020", 12 pgs.
"U.S. Appl. No. 15/814,153, Non Final Office Action mailed Oct. 9, 2019", 16 pgs.
"U.S. Appl. No. 15/814,153, Notice of Allowance mailed Apr. 8, 2021", 10 pgs.
"U.S. Appl. No. 15/814,153, Response filed Jan. 6, 2021 to Non Final Office Action mailed Jul. 6, 2020", 12 pgs.
"U.S. Appl. No. 15/814,153, Response filed Apr. 9, 2020 to Non Final Office Action mailed Oct. 9, 2019", 15 pgs.
"U.S. Appl. No. 15/814,153, Response filed Jul. 15, 2019 to Restriction Requirement mailed May 15, 2019", 9 pgs.
"U.S. Appl. No. 15/814,153, Restriction Requirement mailed May 15, 2019", 6 pgs.
"U.S. Appl. No. 16/083,280, Corrected Notice of Allowability mailed Aug. 3, 2020", 2 pgs.
"U.S. Appl. No. 16/083,280, Corrected Notice of Allowability mailed Sep. 18, 2020", 2 pgs.
"U.S. Appl. No. 16/083,280, Non Final Office Action mailed Jan. 28, 2020", 6 pgs.
"U.S. Appl. No. 16/083,280, Notice of Allowance mailed Jun. 12, 2020", 5 pgs.
"U.S. Appl. No. 16/083,280, Response filed May 28, 2020 to Non Final Office Action mailed Jan. 28, 2020", 8 pgs.
"U.S. Appl. No. 16/431,397, Response filed Aug. 23, 2021 to Restriction Requirement mailed Jun. 23, 2021", 7 pgs.
"U.S. Appl. No. 16/431,397, Restriction Requirement mailed Jun. 23, 2021", 6 pgs.
"U.S. Appl. No. 16/431,397, Supplemental Preliminary Amendment filed Aug. 2, 2019", 6 pgs.
"U.S. Appl. No. 16/784,822, Supplemental Preliminary Amendment filed Feb. 14, 2020", 6 pgs.
"U.S. Appl. No. 17/168,928, Supplemental Preliminary Amendment filed Aug. 12, 2021", 5 pages.
"Australian Application Serial No. 2015306040, First Examination Report mailed Nov. 8, 2019", 4 pgs.
"Australian Application Serial No. 2016265882, First Examination Report mailed Aug. 5, 2020", 4 pgs.
"Australian Application Serial No. 2016265883, First Examination Report mailed Sep. 22, 2020", 4 pgs.
"Australian Application Serial No. 2016281963, First Examination Report mailed Oct. 15, 2020", 5 pgs.
"Australian Application Serial No. 2018202342, First Examination Report mailed Jun. 17, 2019", 5 pgs.
"Australian Application Serial No. 2018202342, Response filed Aug. 1, 2019 to First Examination Report mailed Jun. 17, 2019", 17 pgs.
"Australian Application Serial No. 2018202342, Subsequent Examiners Report mailed Aug. 23, 2019", 4 pgs.
"Australian Application Serial No. 2018204774, First Examination Report mailed Jul. 18, 2019", 4 pgs.
"Australian Application Serial No. 2018204774, Response filed May 28, 2020 to First Examination Report mailed Jul. 18, 2019", 14 pgs.
"Australian Application Serial No. 2018226496, First Examination Report mailed Jul. 25, 2019", 4 pgs.
"Australian Application Serial No. 2018236791, First Examination Report mailed Mar. 2, 2020", 3 pgs.
"Australian Application Serial No. 2018236791, Response filed Jun. 9, 2020 to First Examination Report mailed Mar. 2, 2020", 12 pgs.
"Australian Application Serial No. 2018236791, Voluntary Amendment filed Dec. 3, 2018", 8 pgs.
"Australian Application Serial No. 2019201063, First Examination Report mailed Aug. 6, 2019", 7 pgs.
"Australian Application Serial No. 2019250148, First Examination Report mailed Nov. 23, 2020", 5 pgs.
"Canadian Application Serial No. 2,880,350, Response filed Oct. 28, 2020 to Examiner's Rule 30(2) Requisition mailed May 1, 2019", 36 pgs.
"Canadian Application Serial No. 2,880,350, Voluntary Amendment filed Apr. 29, 2021", 7 pgs.
"Canadian Application Serial No. 2,880,353, Response filed Oct. 29, 2019 to Office Action mailed Apr. 29, 2019", 28 pgs.
"Canadian Application Serial No. 2,901,484, Office Action mailed Apr. 27, 2021", 4 pgs.
"Canadian Application Serial No. 2,901,484, Office Action mailed Jun. 5, 2020", 6 pgs.
"Canadian Application Serial No. 2,901,484, Office Action mailed Dec. 11, 2019", 6 pgs.
"Canadian Application Serial No. 2,901,484, Response filed Apr. 7, 2020 to Office Action mailed Dec. 11, 2019", 25 pgs.
"Canadian Application Serial No. 2,901,484, Response filed Sep. 29, 2020 to Office Action mailed Jun. 5, 2020", 20 pgs.
"Canadian Application Serial No. 2,901,492, Office Action mailed Jan. 29, 2020", 4 pgs.
"Canadian Application Serial No. 2,901,495, Office Action mailed Jan. 29, 2020", 4 pgs.
"Canadian Application Serial No. 2,901,495, Response filed May 13, 2021 to Office Action mailed Jan. 29, 2020", 23 pgs.
"Canadian Application Serial No. 2,904,224, Office Action mailed Jan. 3, 2020", 4 pgs.
"Canadian Application Serial No. 2,904,224, Response filed May 11, 2021 to Office Action mailed Jan. 3, 2020", 36 pgs.
"Canadian Application Serial No. 2,958,480, Office Action mailed Sep. 16, 2021", 4 pgs.
"Canadian Application Serial No. 3,034,592, Office Action mailed Mar. 17, 2020", 5 pgs.
"Canadian Application Serial No. 3,034,592, Response filed Jul. 14, 2020 to Office Action mailed Mar. 17, 2020", 20 pgs.
"Canadian Application Serial No. 3,046,529, Office Action mailed Mar. 5, 2020", 4 pgs.
"Canadian Application Serial No. 3,046,529, Office Action mailed Sep. 18, 2019", 6 pgs.
"Canadian Application Serial No. 3,046,529, Response filed Nov. 14, 2019 to Office Action mailed Sep. 18, 2019", 9 pgs.
"Chinese Application Serial No. 201580053421.3, Office Action mailed Sep. 17, 2019", w/ English Translation, 31 pgs.
"Chinese Application Serial No. 201680038134.X, Office Action mailed Apr. 7, 2020", with English translation, 29 pages.
"Chinese Application Serial No. 201680038134.X, Office Action mailed Jul. 8, 2019", w/ English Translation, 30 pgs.

(56) References Cited

OTHER PUBLICATIONS

"Chinese Application Serial No. 201680038134.X, Response filed Jan. 23, 2020 to Office Action mailed Jul. 8, 2019", with English claims, 32 pages.

"Chinese Application Serial No. 201680038134.X, Response filed Aug. 24, 2020 to Office Action mailed Apr. 7, 2020", with English claims, 24 pages.

"Chinese Application Serial No. 201680038134.X, Response to Examiner Telephone Interview filed Oct. 20, 2020", with English claims, 26 pages.

"Chinese Application Serial No. 201680038135.4, Office Action mailed Apr. 8, 2021", with English Machine Translation, 7 pages.

"Chinese Application Serial No. 201680038135.4, Office Action mailed Jun. 28, 2020", with English translation, 25 pages.

"Chinese Application Serial No. 201680038135.4, Office Action mailed Aug. 26, 2019", w/ English Translation, 23 pgs.

"Chinese Application Serial No. 201680038135.4, Response filed Mar. 10, 2020 to First Office Action mailed Aug. 26, 2019", with English claims, 12 pages.

"Chinese Application Serial No. 201680038135.4, Response filed Nov. 13, 2020 to Office Action mailed Jun. 28, 2020", with current English claims, claims not amended in response filed, 8 pages.

"Chinese Application Serial No. 201680048895.3, Office Action mailed Apr. 15, 2020", with English translation, 12 pages.

"Chinese Application Serial No. 201680048895.3, Response filed Aug. 31, 2020 to Office Action mailed Apr. 15, 2020", with English claims, 25 pages.

"Chinese Application Serial No. 201680048895.3, Response filed Nov. 4, 2019 to Office Action mailed Apr. 17, 2019", with English claims, 29 pages.

"Chinese Application Serial No. 201680048895.3, Response to Examiner Telephone Interview filed Oct. 22, 2020", with English claims, 22 pages.

"Chinese Application Serial No. 201710339973.1, Response filed Jul. 3, 2019 to Office Action mailed Apr. 26, 2019", w/ English Claims, 14 pgs.

"Chinese Application Serial No. 201710708143.1, Office Action mailed Aug. 16, 2019", w/ English Translation, 10 pgs.

"Chinese Application Serial No. 201710708143.1, Response filed Sep. 27, 2019 to Office Action mailed Aug. 16, 2019", with English claims, 10 pages.

"Chinese Application Serial No. 201780027034.1, Office Action mailed Mar. 5, 2021", with English translation, 7 pages.

"Chinese Application Serial No. 201780027034.1, Office Action mailed Apr. 13, 2020", with English translation, 35 pages.

"Chinese Application Serial No. 201780027034.1, Response filed Oct. 28, 2020 to Office Action mailed Apr. 13, 2020", with English claims, 46 pages.

"Chinese Application Serial No. 201780027034.1, Response filed Oct. 28, 2020 to Office Action mailed Apr. 13, 2020", with English claims, 39 pages.

"Chinese Application Serial No. 201810432187.0, Office Action mailed Jan. 16, 2020", with English translation, 12 pages.

"Chinese Application Serial No. 201910516006.7, Office Action mailed Mar. 1, 2021", with English Summary, 9 pages.

"Chinese Application Serial No. 201910516006.7, Office Action mailed Jul. 2, 2020", with English translation, 16 pages.

"Chinese Application Serial No. 201910516006.7, Response filed Jan. 18, 2021 to Office Action mailed Jul. 2, 2020", with English claims, 21 pages.

"Chinese Application Serial No. 201910516006.7, Voluntary Amendment filed Feb. 10, 2020", with English claims, 15 pages.

"European Application Serial No. 11797695.1, Communication Pursuant to Article 94(3) EPC mailed Nov. 19, 2020", 5 pgs.

"European Application Serial No. 11797695.1, Response filed Mar. 26, 2021 to Communication Pursuant to Article 94(3) EPC mailed Nov. 19, 2020", 3 pgs.

"European Application Serial No. 14764305.0, Response filed Jun. 21, 2019 to Communication Pursuant to Article 94(3) EPC Feb. 14, 2019", 24 pgs.

"European Application Serial No. 14764713.5, Response filed Jun. 28, 2019 to Communication pursuant to Article 94(3) EPC mailed Dec. 18, 2018", 8 pgs.

"European Application Serial No. 16795581.4, Response filed Sep. 11, 2019 to Extended European Search Report mailed Feb. 12, 2019", 14 pgs.

"European Application Serial No. 16813836.0, Communication Pursuant to Article 94(3) EPC mailed Mar. 24, 2020", 5 pgs.

"European Application Serial No. 16813836.0, Response filed Aug. 3, 2020 to Communication Pursuant to Article 94(3) EPC mailed Mar. 24, 2020", 8 pgs.

"European Application Serial No. 16813836.0, Response to Extended European Search Report mailed Mar. 25, 2019", 11 pgs.

"European Application Serial No. 17762365.9, Extended European Search Report mailed Oct. 17, 2019", 8 pgs.

"European Application Serial No. 17762365.9, Response filed May 15, 2020 to Extended European Search Report mailed Oct. 17, 2019", 13 pgs.

"European Application Serial No. 18153408.2, Response filed Jul. 2, 2019 to Extended European Search Report mailed Dec. 4, 2018", 12 pgs.

"European Application Serial No. 18160812.6, Communication Pursuant to Article 94(3) EPC mailed Nov. 19, 2020", 4 pgs.

"European Application Serial No. 18160812.6, Response filed Mar. 2, 2021 to Communication Pursuant to Article 94(3) EPC mailed Nov. 19, 2020", 2 pgs.

"European Application Serial No. 18160812.6, Response filed Aug. 6, 2019 to Extended European Search Report mailed Feb. 11, 2019", 23 pgs.

"European Application Serial No. 18211142.7, Response filed Aug. 8, 2019 to Extended European Search Report mailed Apr. 11, 2019", 10 pgs.

"European Application Serial No. 18214518.5, Response filed Jul. 16, 2019 to Extended European Search Report mailed Apr. 17, 2019", 3 pgs.

"European Application Serial No. 20180081.0, Extended European Search Report mailed Sep. 28, 2020", 7 pgs.

"European Application Serial No. 20180081.0, Response filed Apr. 20, 2021 to Extended European Search Report mailed Sep. 28, 2020", 11 pgs.

"European Application Serial No. 21154403.6, Extended European Search Report mailed Apr. 26, 2021", 8 pgs.

"Indian Application Serial No. 201717044889, First Examination Report dated Dec. 17, 2020", with English translation, 6 pages.

"Indian Application Serial No. 201717044889, Response filed Jun. 14, 2021 to First Examination Report dated Dec. 17, 2020", with English translation, 82 pages.

"Indian Application Serial No. 201717044890, First Examination Report mailed Oct. 23, 2020", with English translation, 6 pages.

"Indian Application Serial No. 201817002765, First Examination Report mailed Dec. 24, 2019", with English translation, 6 pages.

"Indian Application Serial No. 201817002765, Response filed Sep. 24, 2020 to First Examination Report mailed Dec. 24, 2019", with English translation, 30 pages.

"Indian Application Serial No. 201817037404, First Examination Report mailed Feb. 19, 2021", with English translation, 7 pages.

"International Application Serial No. PCT/CA2015/050570, International Search Report mailed Sep. 1, 2015", 5 pgs.

"International Application Serial No. PCT/CA2015/050570, Written Opinion mailed Sep. 1, 2015", 4 pgs.

"Munters PFC Polymer Fluid Cooler", Munters Corp., (Sep. 2015), 2 pgs.

"Oasis PFC Polymer Fluid Cooler Product Information", Munters Corp., (Nov. 2013), 2 pgs.

"Singapore Application Serial No. 11201710777Y, Response filed Jul. 1, 2019 to Office Action mailed Jan. 31, 2019", in English, 31 pgs.

"Singaporean Application Serial No. 11201709404P, Response filed Jul. 22, 2019 to Written Opinion mailed Feb. 22, 2019", in English, 62 pgs.

(56) References Cited

OTHER PUBLICATIONS

Abdel-Salam, Mohamed R.H., et al., "Design and testing of a novel 3-fluid liquid-to-air membrane energy exchanger (3-fluid LAMEE)", International Journal of Heat and Mass Transfer 92, (2016), 312-329.
Abdel-Salam, Mohamed R.H., et al., "Performance Testing of a Novel 3-Fluid Liquid-to-Air Membrane Energy Exchanger (3-Fluid LAMEE) for HVAC Applications", 28th Intl. Conference on Efficiency, Cost, Optimization, Simulation and Environmental Impact of Energy Systems (ECOS), Pau, France, (Jun. 30, 2015), 12 pgs.
Philip, Lepoudre, et al., "U.S. Appl. No. 15/574,205", Specification, (filed Nov. 15, 2017), 32 pgs.
Philip, Lepoudre, et al., "U.S. Appl. No. 15/574,205", Drawings, (filed Nov. 15, 2017), 9 pgs.
Philip, Lepoudre, et al., "U.S. Appl. No. 15/574,205", Claims, (filed Nov. 15, 2017), 5 pgs.
"U.S. Appl. No. 16/431,397, Notice of Allowance mailed Dec. 10, 2021", 11 pgs.
"U.S. Appl. No. 16/431,397, Supplemental Notice of Allowability mailed Dec. 24, 2021", 2 pgs.
"U.S. Appl. No. 16/784,822, Restriction Requirement mailed Dec. 27, 2021", 6 pgs.
"Canadian Application Serial No. 2,901,484, Response filed Aug. 26, 2021 to Office Action mailed Apr. 27, 2021", 9 pgs.
"European Application Serial No. 17762365.9, Communication Pursuant to Article 94(3) EPC mailed Dec. 9, 2021", 6 pgs.
"Indian Application Serial No. 201817037404, Response filed Aug. 16, 2021 to First Examination Report mailed Feb. 19, 2021", 24 pgs.
"Australian Application Serial No. 2017228937, First Examination Report mailed Jan. 6, 2022", 3 pgs.
"European Application Serial No. 11797695.1, Communication Pursuant to Article 94(3) EPC mailed Jan. 12, 2022", 7 pgs.
"Canadian Application Serial No. 2,958,480, Response filed Jan. 17, 2022 to Office Action mailed Sep. 16, 2021", 12 pgs.
"Canadian Application Serial No. 3,016,808, Non Final Office Action mailed Mar. 9, 2022", 3 pgs.
"U.S. Appl. No. 14/187,413, Notice of Allowance mailed Mar. 29, 2022", 7 pgs.
"European Application Serial No. 17762365.9, Response filed Apr. 19, 2022 to Communication Pursuant to Article 94(3) EPC mailed Dec. 9, 2021", 29 pgs.
"Canadian Application Serial No. 3,046,529, Response Filed Aug. 26, 2021 to Office Action mailed Mar. 5, 2020", 15 pages.
"Canadian Application Serial No. 3,016,808, Voluntary Amendment mailed Feb. 11, 2022.", 31 pages.
"U.S. Appl. No. 16/784,822, Response filed Feb. 28, 2022 to Restriction Requirement mailed Dec. 27, 2021", 6 pages.
"Canadian Application Serial No. 2,880,350 Examiner's Rule 86 2 Requisition mailed Jun. 20, 2022", 3 pgs.
"U.S. Appl. No. 17/855,344 Preliminary Amendment Filed with Application", 7 pgs.
"U.S. Appl. No. 17/855,413 Preliminary Amendment Filed with Application", 7 pgs.
"U.S. Appl. No. 16/784,822, Response filed Jul. 11, 2022 to Non Final Office Action mailed Mar. 14, 2022", 9 pgs.
"U.S. Appl. No. 16/784,822, Final Office Action mailed Jul. 26, 2022", 7 pgs.
"European Application Serial No. 21212796.3, Extended European Search Report mailed Aug. 1, 2022", 11 pgs.
"European Application Serial No. 11797695.1, Response filed Jul. 20, 2022 to Communication Pursuant to Article 94(3) EPC mailed Jan. 12, 2022", 10 pgs.
"Canadian Application Serial No. 2,986,058, Office Action mailed Jul. 27, 2022", 3 pgs.
"Canadian Application Serial No. 3148296, Voluntary Amendment filed Jun. 30, 2022", 17 pgs.
"Canadian Application Serial No. 3,016,808, Response filed Jul. 11, 2022 to Non Final Office Action mailed Mar. 9, 2022", w o Claims, 2 pgs.
"Canadian Application Serial No. 2,880,350, Response filed Oct. 6, 2022 to Examiner's Rule 86 2 Requisition mailed Jun. 20, 2022", 25 pgs.
"U.S. Appl. No. 16/784,822, Response filed Oct. 25, 2022 to Final Office Action mailed Jul. 26, 2022", 5 pgs.
"U.S. Appl. No. 16/784,822, Notice of Allowance mailed Nov. 9, 2022", 5 pgs.
"U.S. Appl. No. 17/168,928, Restriction Requirement mailed Nov. 25, 2022", 9 pgs.
"Canadian Application Serial No. 3129123 Examiner's Rule 86 2 Report mailed Nov. 25, 2022", 3 pgs.
"Canadian Application Serial No. 2,986,055, Office Action mailed Dec. 12, 2022", 5 pgs.
"Canadian Application Serial No. 3148296, Examiners Rule 86(2) Requisition mailed Dec. 9, 2022", 3 pgs.
"U.S. Appl. No. 17/231,634, Notice of Allowance mailed Jan. 11, 2023", 8 pgs.
"Canadian Application Serial No. 3,167,769, Examiners Rule 86(2) Requisition mailed Jan. 13, 2023", 4 pgs.
"U.S. Appl. No. 17/855,344, Non Final Office Action mailed Jan. 27, 2023", 15 pgs.
"U.S. Appl. No. 17/855,413, Non Final Office Action mailed Jan. 27, 2023", 15 pgs.
"U.S. Appl. No. 17/231,634, Corrected Notice of Allowability mailed Feb. 10, 2023", 2 pgs.
"U.S. Appl. No. 17/168,928, Response filed Feb. 27, 2023 to Restriction Requirement mailed Nov. 25, 2022", 8 pgs.
"Canadian Application Serial No. 3,016,808, Voluntary Amendment mailed Feb. 13, 2023.", 24 pgs.
"Canadian Application Serial No. 3,167,769, Response filed Mar. 2, 2023 Examiners Rule 86(2) Requisition mailed Jan. 13, 2023", 14 pgs.
"Canadian Application Serial No. 2,986,058, Response filed Nov. 28, 2022 to Office Action mailed Jul. 27, 2022", w o Claims, 6 pgs.
"Canadian Application Serial No. 3,016,808, Examiners Rule 86(2) Report mailed Mar. 2, 2023", 3 pgs.
"European Application Serial No. 21154403.6, Communication Pursuant to Article 94(3) EPC mailed Mar. 21, 2023", 3 pgs.
"Canadian Application Serial No. 2,990,765, Examiners Rule 86(2) Report mailed Mar. 15, 2023", 5 pgs.
"Canadian Application Serial No. 3148296, Response filed Apr. 4, 2022 to Examiners Rule 86(2) Requisition mailed Dec. 9, 2022", 18 pgs.
"Canadian Application Serial No. 2,986,055, Response filed Apr. 12, 2023 to Office Action mailed Dec. 12, 2022", 40 pgs.
"U.S. Appl. No. 17/231,634, Notice of Allowance mailed Apr. 26, 2023", 9 pgs.
"European Application Serial No. 21212796.3, Response filed Feb. 28, 2023 to Extended European Search Report mailed Aug. 1, 2022", 13 pgs.
"Canadian Application Serial No. 3129123, Response Filed Mar. 10, 2023 to Examiner's Rule 86 2 Report mailed Nov. 25, 2022", 11 pgs.
"U.S. Appl. No. 17/168,928, Notice of Allowance mailed May 3, 2023", 13 pgs.
"Canadian Application Serial No. 3,129,123, Office Action mailed May 1, 2023", 3 pgs.
"U.S. Appl. No. 17/855,344, Response filed Jun. 27, 2023 to Non Final Office Action mailed Jan. 27, 2023", 13 pgs.
"U.S. Appl. No. 17/855,413, Response filed Jun. 27, 2023 to Non Final Office Action mailed Jan. 27, 2023", 11 pgs.
U.S. Appl. No. 17/855,344, filed Jun. 30, 2022, Evaporative Cooling System With Liquid-to-Air Membrane Energy Exchanger.
U.S. Appl. No. 17/855,413, filed Jun. 30, 2022, Evaporative Cooling System With Liquid-to-Air Membrane Energy Exchanger.
"Canadian Application Serial No. 3,129,123, Response filed Jul. 28, 2023 to Office Action mailed May 1, 2023", 16 pgs.
"U.S. Appl. No. 17/855,344, Examiner Interview Summary mailed Sep. 1, 2023", 2 pgs.
"U.S. Appl. No. 17/855,413, Examiner Interview Summary mailed Sep. 1, 2023", 2 pgs.
"Indian Application Serial No. 201817037404, Hearing Notice mailed Aug. 30, 2023", 3 pgs.

(56) References Cited

OTHER PUBLICATIONS

"Canadian Application Serial No. 3,148,296, Office Action mailed Sep. 5, 2023", 3 pgs.
"Canadian Application Serial No. 2,986,055, Examiners Rule 86(2) Report mailed Sep. 15, 2023", 4 pgs.
"U.S. Appl. No. 17/855,344, Advisory Action mailed Nov. 28, 2023", 3 pgs.
"U.S. Appl. No. 17/855,344, Examiner Interview Summary mailed Jan. 24, 2024", 2 pgs.
"U.S. Appl. No. 17/855,344, Final Office Action mailed Apr. 24, 2024", 19 pgs.
"U.S. Appl. No. 17/855,344, Non Final Office Action mailed Jan. 9, 2024", 9 pgs.
"U.S. Appl. No. 17/855,344, Response filed Mar. 29, 2024 to Non Final Office Action mailed Jan. 9, 2024", 8 pgs.
"U.S. Appl. No. 17/855,344, Response filed Nov. 17, 2023 to Final Office Action mailed Jul. 17, 2023", 15 pgs.
"U.S. Appl. No. 17/855,413, Final Office Action mailed Dec. 11, 2023", 12 pgs.
"U.S. Appl. No. 17/855,413, Response filed Nov. 17, 2023 to Non Final Office Action mailed Jul. 17, 2023", 11 pgs.
"U.S. Appl. No. 18/217,348, Non Final Office Action mailed May 8, 2024", 12 pgs.
"Canadian Application Serial No. 2,986,055, Response filed Dec. 14, 2023 to Examiners Rule 86(2) Report mailed Sep. 15, 2023", w/ claims.
"Canadian Application Serial No. 3,129,123, Examiners Rule 86(2) Requisition mailed Feb. 29 2024", 4 pgs.
"Canadian Application Serial No. 3,129,123, Response filed Apr. 17, 2024 to Examiners Rule 86(2) Requisition mailed Feb. 29, 2024", 9 pgs.
"Canadian Application Serial No. 3,148,296, Response filed Dec. 28, 2023 to Office Action mailed Sep. 5, 2023", 22 pgs.
"European Application Serial No. 23189613.5, Extended European Search Report mailed Oct. 27, 2023", 5 pgs.
Conde-Petit, "Open Absorption System for Cooling and Air Conditioning using Membrane Contactors", (Nov. 14, 2006), 13 pgs.

* cited by examiner

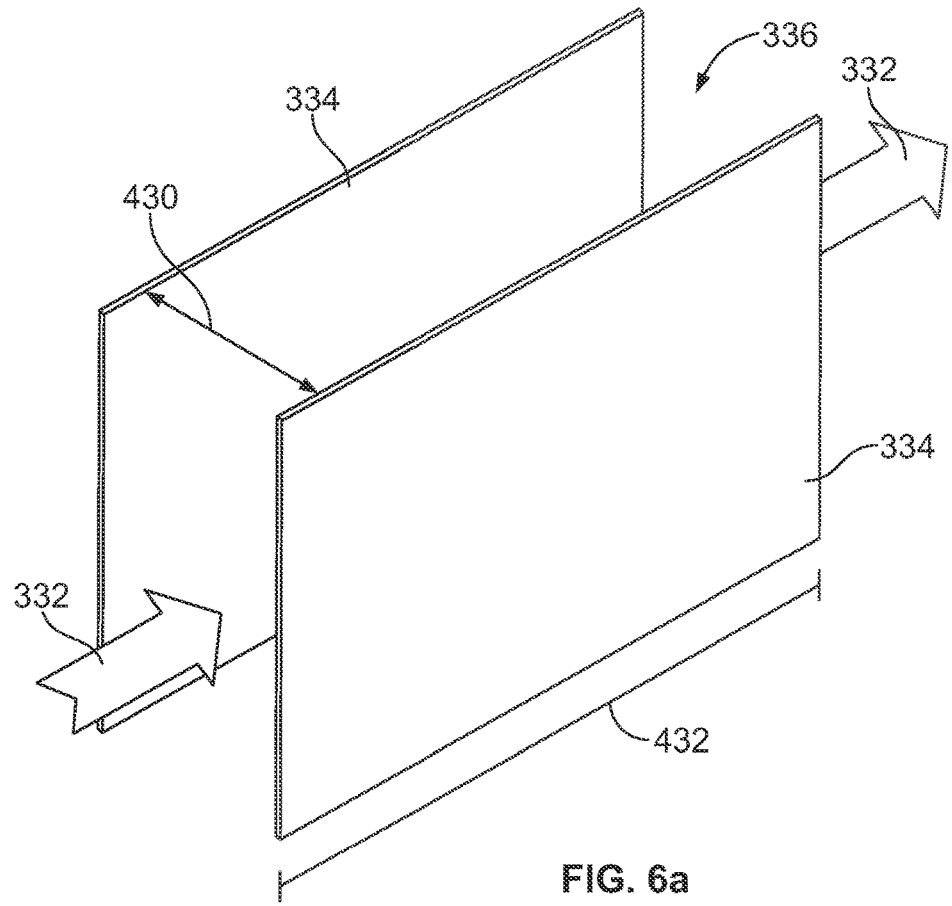
FIG. 6a
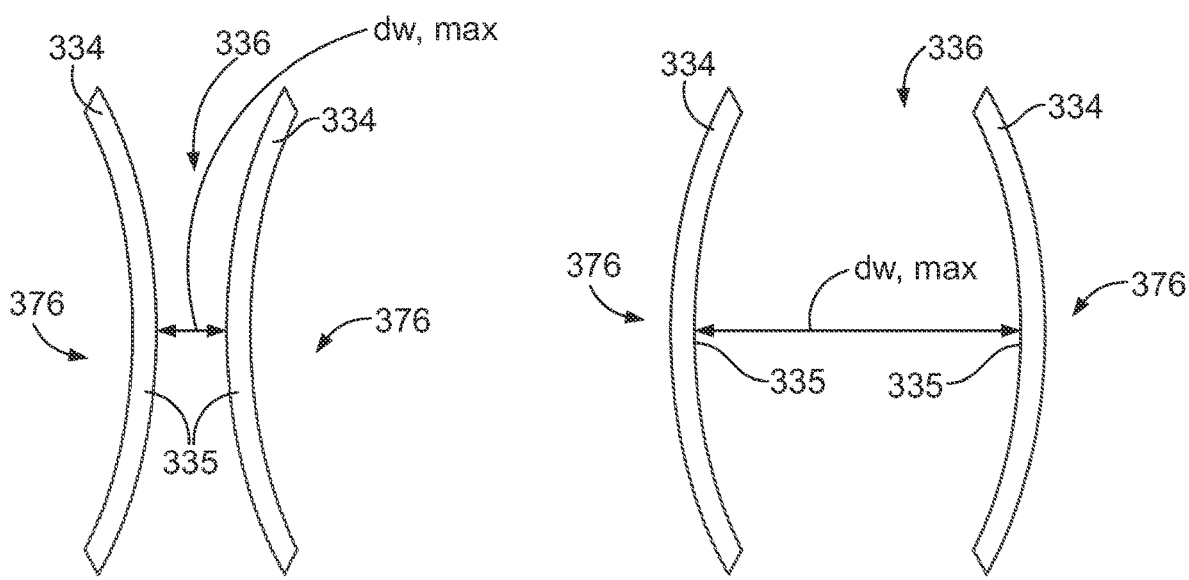
FIG. 6b
FIG. 6c

LIQUID-TO-AIR MEMBRANE ENERGY EXCHANGER

CROSS-REFERENCE TO RELATED APPLICATIONS

The present application is a continuation of U.S. patent Application Ser. No. 16/351,046 titled "Liquid-To-Air Membrane Energy Exchanger" filed Mar. 12, 2019, which is a continuation of U.S. patent application Ser. No. 14/957,795 titled "Liquid-To-Air Membrane Energy Exchanger" filed Dec. 3, 2015, which is a continuation of U.S. patent application Ser. No. 13/702,596 titled "Liquid-To-Air Membrane Energy Exchanger" filed Apr. 15, 2013, which is a U.S. national stage entry of co-pending International Application Number PCT/IB2011/002145 titled "Liquid-To-Air Membrane Energy Exchanger" filed Jun. 22, 2011 (published as WO 2011/161547), which relates to and claims priority from U.S. Provisional Patent Application 61/358,321 titled "Liquid-To-Air Membrane Energy Exchanger" filed Jun. 24, 2010, and U.S. Provisional Patent Application 61/359,193 titled "System and Method for Energy Exchange" filed Jun. 28, 2010. All of the applications noted above are hereby incorporated by reference in their entireties

BACKGROUND OF THE INVENTION

The subject matter described herein relates generally to an energy exchange system for conditioning air in an enclosed structure, and more particularly, to a liquid-to-air membrane energy exchanger (LAMEE).

Enclosed structures, such as occupied buildings, factories and animal barns, generally include an HVAC system for conditioning ventilated and/or recirculated air in the structure. The HVAC system includes a supply air flow path and an exhaust air flow path. The supply air flow path receives pre-conditioned air, for example outside air or outside air mixed with re-circulated air, and channels and distributes the air into the enclosed structure. The pre-conditioned air is conditioned by the HVAC system to provide a desired temperature and humidity of supply air discharged into the enclosed structure. The exhaust air flow path discharges air back to the environment outside the structure. Without energy recovery, conditioning the supply air typically requires a significant amount of auxiliary energy. This is especially true in environments having extreme outside air conditions that are much different than the required supply air temperature and humidity. Accordingly, energy exchange or recovery systems are typically used to recover energy from the exhaust air flow path. Energy recovered from air in the exhaust flow path is utilized to reduce the energy required to condition the supply air.

Conventional energy exchange systems may utilize energy recovery devices (e.g. energy wheels and permeable plate exchangers) or heat exchange devices (e.g. heat wheels, plate exchangers, heat-pipe exchangers and run-around heat exchangers) positioned in both the supply air flow path and the return air flow path. LAMEEs are fluidly coupled so that a desiccant liquid flows between the LAMEEs in a run-around loop, similar to run-around heat exchangers that typically use aqueous glycol as a coupling fluid. When the only auxiliary energy used for such a loop is for desiccant liquid circulation pumps and external air-flow fans, the run-around system is referred to as a passive run-around membrane energy exchange (RAMEE) system, otherwise it is an active RAMEE system with controlled auxiliary heat and/or water inputs or extractions.

For the passive RAMEE system with one or more LAMEEs in each of the exhaust and supply air ducts, energy in the form of heat and water vapor is transferred between the LAMEEs in the supply and exhaust ducts, which is interpreted as the transfer of sensible and latent energy between the exhaust air and the supply air. For example, the exhaust air LAMEE may recover heat and moisture from the exhaust air to transfer the heat and moisture to the supply air during winter conditions to heat and humidify the supply air. Conversely, during summer conditions, the supply air LAMEE may transfer heat and moisture from the supply air to the exhaust air to cool and dehumidify the supply air.

Laboratory prototype LAMEEs have been constructed and tested in passive RAMEE loops to utilize both cross-flow and counter-flow arrangements for each LAMEE. In a counter-flow configuration, the desiccant liquid flows in a direction 180° away from the air flow direction in the adjacent air flow channel (i.e. counter-flow with respect to the air flow direction for each pair of flow channels) and heat and water vapor are transferred through the semi-permeable, energy exchange, membrane of each LAMEE. In the cross-flow arrangement, the liquid desiccant in the LAMEE flows at 90° or perpendicular to the air flow direction through each pair of channels in the LAMEE energy exchange membrane area.

Both counter-flow and cross-flow LAMEE devices can be used to recover energy from exhaust air-flows. This energy can be used to condition the supply air using another LAMEE device. Cross-flow LAMEEs are not without disadvantages. In certain circumstances, cross-flow exchangers generally have lower energy transfer effectiveness in comparison to counter-flow exchangers of the same energy exchange membrane area and inlet operating conditions. Accordingly, it may be desirable to have an energy exchange system that utilizes counter-flow LAMEEs. However, counter-flow LAMEEs are generally more difficult and expensive to construct. In particular, counter-flow LAMEEs require headers positioned on each end of the LAMEE and require tighter design specifications. Accordingly, conventional counter-flow LAMEEs may be impractical for some applications but, where higher performance factors are needed, they may be cost effective for other applications.

Cross-flow and counter-flow LAMEE devices have been constructed and tested in laboratory RAMEE system loops. The laboratory test prototypes for LAMEE devices have not performed as expected. In particular, the test systems have not reached steady-state operating conditions during a reasonable test period. Moreover, the internal geometry of the air and liquid flow channels are known to be far from the simple geometric configurations with uniform, equally distributed mass flow conditions assumed in the reported theoretical models.

Several key problems exist with the past research and development efforts for LAMEE devices. First, simple theoretical models of RAMEE or HVAC systems containing LAMEE devices, with overly simplified internal geometries and physics, fail to model what is physically occurring within the system. For example, each fluid flow will self adjust in a few seconds to distribute its local mass flux to minimize the pressure drop across the exchanger as a whole unit for each type of fluid, flow channel geometry, Reynolds number, Rayleigh number, and total mass flow rate. Within a fluid, both viscous flow forces and buoyancy forces can alter the flow streamlines. For example, buoyancy forces, caused by fluid density gradients, may result in unstable mal-distributed flow when the fluid density increases with height (i.e. counter to gravity) and the viscous forces are not sufficient to cause a uniform flow and so avoid a mal-distribution of flow within an exchanger. With some flow configurations in an exchanger, such flow conditions are likely to occur for laminar liquid flows but not the air flows. The enhanced performance of stable flows with enhancing buoyancy effects that self correct mal-distributions of flow are not exploited in existing systems.

When the self-adjusted flow is steady, the rate of entropy generation due to viscous (laminar or turbulent) flow will be a minimum for each flow channel and collectively for all the channels for each fluid (air or liquid desiccant) in the LAMEE. Due to small geometric variations and destabilizing buoyancy effects in each channel and among all the flow channels for each fluid, the self-adjusted flow distribution will not, in general, be such that the fluid mass flux is equally distributed among all channels or is uniformly distributed in each channel for heat and mass transfer through the semi-permeable membrane surfaces in a LAMEE. In order to minimize the declination of performance of each LAMEE due to the non-uniformities of flow distribution, the design specifications must be very complete for each and all independent performance influencing factors. When the uneven flow distribution leads to unequal flows among channels and/or poor non-uniform area integrated or locally averaged heat and water vapor transfer rates, the flow is mal-distributed in the exchanger for energy exchange. Mal-distribution of flows in any LAMEE in a RAMEE system will cause the performance of the system to be sub-optimal. Mal-distribution of flow will be especially prevalent for laminar flows with destabilizing buoyancy effects within each liquid channel and among the many liquid flow channels of a LAMEE. However, mal-distribution can also occur with transition and turbulent flows. Local flow instabilities, due to channel flow surface geometry when the flow is above threshold Reynolds numbers, will induce local turbulent mixing that can reduce mal-distributed flow in each channel and will increase both the pressure drop and convection coefficients. Exploiting fluid flow turbulence instabilities for enhanced convection coefficients and reduction of flow mal-distribution in exchangers has not been fully recognized or exploited in HVAC exchanger designs.

Further, LAMEE devices constructed with very flexible membranes need more detailed design and construction specifications for each local flow region in flow channels than more rigid flat-plate heat exchangers if they are to exceed the performance factors required for buildings {i.e. ASHRAE Std. 90.1 and 189.1} when tested using an accepted international standard {i.e. ASHRAE Std. 84} and/or approach the theoretical performance factors put forward by modelers. There is no indication that previous researchers and inventors have fully understood the complexities of the physical problems or were aware of the large number of independent design factors that influence the performance of the exchangers.

The key problems with existing RAMEE type energy recovery systems and HVAC systems having one or more LAMEE type devices for air conditioning supply air for buildings are closely related to the research and development problems set forth above. Typically, the factors that impact on the performance are not considered as a complete set if they are considered at all.

The steady-state performance of a passive RAMEE system is not characterized by a single factor as are some simple systems (e.g. pumps and motors). Rather, the performance may be characterized by a set of six dimensionless performance factors (i.e. four system effectiveness values for the measured fraction of the maximum possible steady-state sensible and latent energy transfer under summer and winter standard test conditions and two RER values for the measured fraction of auxiliary energy used with respect to the total energy transferred between the supply and exhaust air streams for the summer and winter test conditions). The set of performance factors, Pf, can be referred to as the dependent objective dimensionless ratios determined by analyzing the data from two standard steady-state tests for a passive RAMEE system.

The set of dimensionless ratios or factors that cause changes to the values in Pf are independent factors, If, because each one, or collectively several or all, will, if changed significantly, change one or more of the factors in the set, Pf. Mathematically, the relationship is expressed such that the dependent dimensionless set Pf is only a function of a predetermined dimensionless set, If, the operating conditions for the inlet air temperature and humidity (i.e. one standard test condition for winter and another for summer), and the uncertainty in the measured test data for both Pf and If or in short Pf(If) and where the standard test conditions are constrained by steady-state or quasi-steady-state operating conditions for each test.

Existing LAMEE devices and passive RAMEE systems have not been designed to meet specified performance factors other than designing the LAMEE device with an internal geometry similar to flat plate heat exchangers constructed using stiff elastic solids. That is, the systems have not met the desired set Pf because not all the factors in the set If were understood, considered, measured or specified.

A need remains to specify or predetermine a complete set of design parameters to construct a LAMEE and, for any inlet air conditions, select a narrow range of system operating conditions (i.e. the complete set If) if the RAMEE systems using two identical LAMEEs are to exceed all the required performance factors in the set Pf. When the design specifications are complete, the set Pf for a passive RAMEE and its two LAMEEs will be predictable in design, reproducible in manufacturing, and with reproducible and certifiable steady-state standard test results. Another need remains for LAMEEs used in a passive RAMEE system having an increased effectiveness. The LAMEEs need to be designed and operated to satisfy conditions that are typical for conventional energy exchange systems and that are required through international standards or local or state building codes.

SUMMARY OF THE INVENTION

In one embodiment, an energy exchanger is provided having a housing constructed to meet a predetermined exchanger aspect ratio. A plurality of panels extend through the housing. The panels have a semi-permeable membrane forming an energy exchange area of the panel. The panels form desiccant channels and air channels that are separated by the semi-permeable membranes to facilitate contact between an air stream flowing through the air channels and desiccant flowing through the desiccant channels within the energy exchange areas of the panels. The energy exchange area of each panel has a top and a bottom. A height of the energy exchange area is defined between the top and the bottom. The energy exchange area of each panel has a front and a back. A length of the energy exchange area is defined between the front and the back. The exchanger aspect ratio is defined by the height of the energy exchange area of each panel divided by the length of the energy exchange area of each panel. A desiccant inlet is provided in flow communication with the desiccant channels. A desiccant outlet is provided in flow communication with the desiccant channels. The desiccant channels are configured to channel the desiccant from the desiccant inlet to the desiccant outlet in at least one of a counter-flow or cross-flow direction with respect to the direction of the air stream to facilitate heat and water vapor transfer through the semi-permeable membranes. The exchanger aspect ratio is selected to provide at least one of a predetermined membrane area, a predetermined length, or a predetermine duration of exposure of the air stream to the desiccant.

In another embodiment, an energy exchanger is provided having a housing. A plurality of panels form desiccant channels and air channels that extend through the housing. The air channels are configured to direct an air stream through the housing. The plurality of panels are spaced apart based on a predetermined air to desiccant channel rates that defines an air channel width and a desiccant channel width. A desiccant inlet is provided in flow communication with the desiccant channels. A desiccant outlet is provided in flow communication with the desiccant channels. The desiccant channels are configured to channel desiccant from the desiccant inlet to the desiccant outlet in at least one of a counter-flow or cross-flow direction with respect to the direction of the air stream to facilitate heat and water vapor transfer between the desiccant in the desiccant channels and the air stream in the air channels. The air to desiccant channel rates are selected to provide a predetermined mass or volume rate of air stream flowing through the air channels and a predetermined mass or volume rate of desiccant flowing through the desiccant channels.

In another embodiment, an energy exchanger is provided having a housing. A plurality of panels form desiccant channels and air channels that extend through the housing. The air channels are configured to direct an air stream through the housing. A desiccant inlet is provided in flow communication with the liquid desiccant channels. A desiccant outlet is provided in flow communication with the liquid desiccant channels. The desiccant channels are configured to channel liquid desiccant from the desiccant inlet to the desiccant outlet in at least one of a counter-flow or cross-flow direction with respect to the direction of the air stream. A semi-permeable membrane extends through each panel to facilitate heat and water vapor transfer between the desiccant in the desiccant channels and the air stream in the air channels. The air stream and the liquid desiccant pressure cause the semi-permeable membrane to deflect during operation. The desiccant membrane is selected based on predetermined channel deflection ranges that are defined to limit the amount of membrane deflection.

In another embodiment, an energy exchanger is provided having a housing. A plurality of panels form liquid desiccant channels and air channels that extend through the housing. The air channels are configured to direct an air stream through the housing. A desiccant inlet is in flow communication with the liquid desiccant channels. A desiccant outlet is in flow communication with the desiccant channels. The desiccant channels are configured to channel desiccant from the desiccant inlet to the desiccant outlet in at least one of a counter-flow or cross-flow direction with respect to the direction of the air stream to facilitate heat and water vapor transfer between the desiccant in the desiccant channels and the air stream in the air channels. The desiccant is selected based on predetermined salt solution concentration ranges for a selected life span and cost of the desiccant.

In another embodiment, an energy exchanger includes a housing. A plurality of panels form desiccant channels that extend through the housing. Each of the plurality of panels has a semi-permeable membrane that is selected to meet predetermined membrane resistance ranges defining physical properties of the membrane. Air channels are formed between the desiccant channels. The air channels are configured to direct an air stream through the housing. A desiccant inlet is in flow communication with the desiccant channels. A desiccant outlet is in flow communication with the desiccant channels. The desiccant channels are configured to channel desiccant from the desiccant inlet to the desiccant outlet so that the desiccant membranes facilitate heat exchange between the desiccant and the air stream. The membrane resistance ranges are selected to limit a flow of the desiccant through the desiccant membrane.

In another embodiment, an energy exchanger is provided having a housing. A plurality of panels form desiccant channels that extend through the housing. The plurality of panels each have a desiccant membrane. Air channels are formed between the desiccant channels. The air channels are configured to direct an air stream through the housing. The air stream flows through the air channels at a predetermined air flow ratio. A desiccant inlet is in flow communication with the desiccant channels. A desiccant outlet is in flow communication with the desiccant channels. The desiccant channels are configured to channel liquid desiccant from the desiccant inlet to the desiccant outlet so that the semi-permeable membranes facilitate heat and water vapor exchange between the liquid desiccant and air streams. The air mass flow rate ratio of the air stream selected to meet a predetermined exposure of the air stream to the semi-permeable membranes.

In another embodiment, an energy exchanger is provided having a housing. A plurality of panels form desiccant channels extending through the housing. Air channels are formed between adjacent desiccant channels. The air channels are configured to direct an air stream through the housing. A desiccant inlet is in flow communication with the desiccant channels. A desiccant outlet is in flow communication with the desiccant channels. The desiccant channels are configured to channel desiccant from the desiccant inlet to the desiccant outlet so that the desiccant membranes facilitate heat exchange between the desiccant and the air stream. The energy exchanger operates within predetermined exchanger performance ratios that define a sensible and latent energy exchange between the desiccant and the air stream.

In another embodiment, a method of exchanging energy between a desiccant and an air stream is provided. The method includes extending a plurality of panels through a housing of the energy exchanger to form desiccant channels and air channels. A desiccant membrane is selected for each of the panels. An air stream is directed at a predetermined air flow ratio through the air channels. Desiccant is directed through the desiccant channels. The desiccant membrane is selected based on membrane resistance ranges defined to limit a flow of the desiccant through the desiccant membrane. The air flow ratio of the air stream is selected to meet a predetermined exposure of the air stream to the desiccant membrane. A flow rate of the desiccant with respect to a flow rate of the air stream is controlled to achieve predetermined exchanger performance ratios that define a thermal energy exchange between the desiccant and the airstream.

In another embodiment, a method of exchanging energy between a desiccant and an air stream is provided. The method includes extending a plurality of panels through a housing of the energy exchanger. The plurality of panels are spaced based on predetermined air to desiccant channel rates to form desiccant channels and air channels between adjacent panels. The predetermined air to desiccant channel mass or volume flow rates help to design an air channel width and a desiccant channel width. A membrane is selected to extend through the panels based on predetermined channel deflection ranges that are defined to limit an amount of membrane deflection with respect to the channel width. An air stream is directed through the air channels. A desiccant is directed through the liquid desiccant channels in at least one of a counter-flow or cross-flow direction with respect to the direction of the air stream so that the membrane facilitates heat and water vapor exchange between the liquid desiccant in the desiccant channels and the air stream in the air channels. The predetermined air to desiccant channel rates provide a predetermined volume rate of air stream flowing through the air channels and a predetermined volume rate of liquid desiccant flowing through the desiccant channels.

BRIEF DESCRIPTION OF THE DRAWINGS

FIG. 3b is a front view of the panels shown in FIG. 3a.

FIG. 6a is a view of an air channel formed in accordance with an embodiment.

FIG. 6b is a front view of the air channels shown in FIG. 6 and being deformed.

FIG. 6c is a front view of the air channels shown in FIG. 6 and being deformed.

DETAILED DESCRIPTION OF THE DRAWINGS

Figure 1:
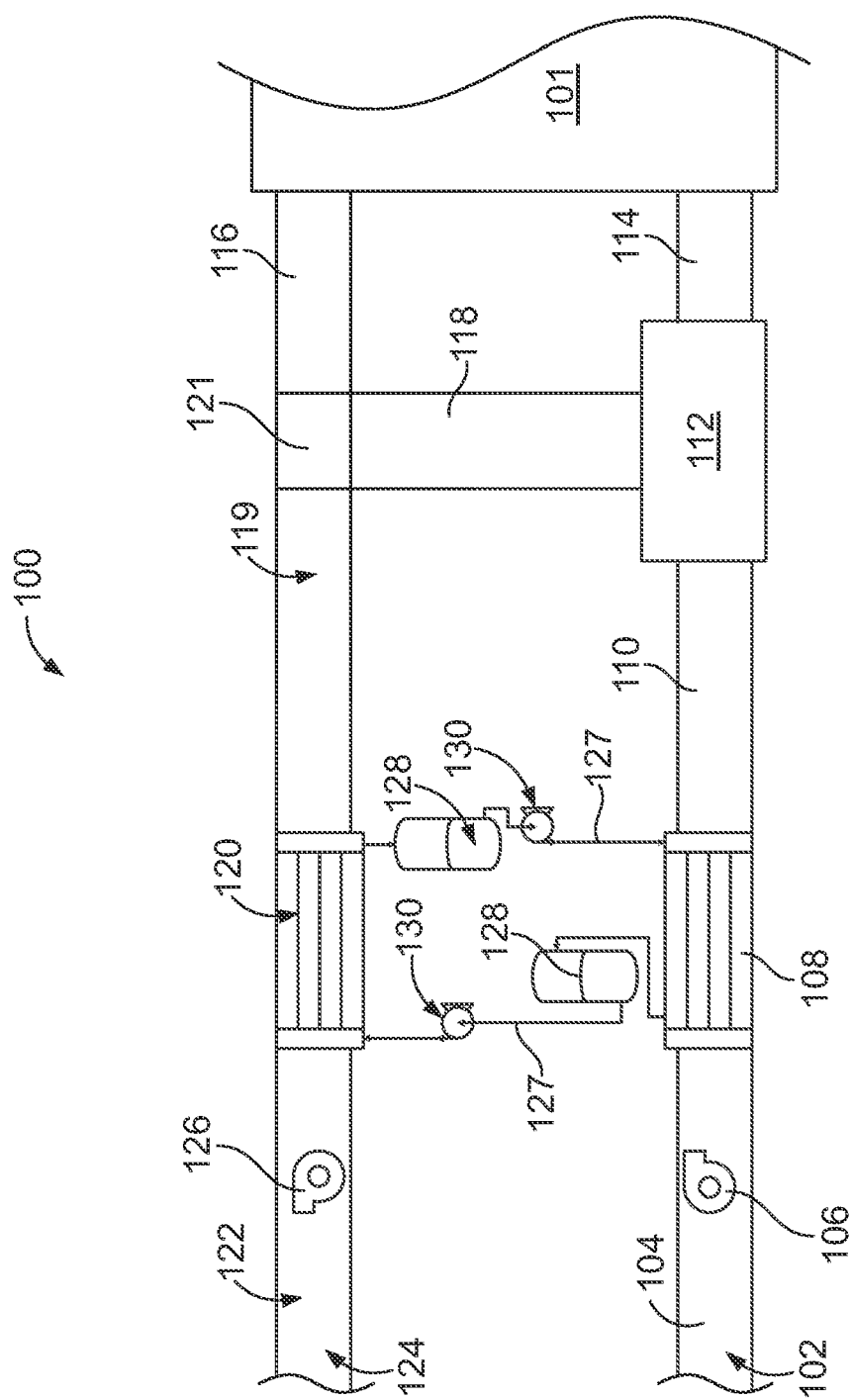
FIG. 1 is a schematic view of an energy exchange system formed in accordance with an embodiment.

The foregoing summary, as well as the following detailed description of certain embodiments will be better understood when read in conjunction with the appended drawings. As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

In one embodiment, a LAMEE energy exchanger is provided. Each embodiment will represent at least one factor in the set If (presented below in Table 1 as independent factors G1-G10 and P1-P12). Many factors of the set If pertain to the LAMEE design and operation. Other factors pertain to the passive RAMEE system, comprising two identical LAMEEs, under a standard steady-state summer or winter test condition. The energy exchanger includes a housing having a front and a back and two sides. The housing has a top and a bottom extending between the front and the back. The housing is constructed to contain a set of air and liquid desiccant flow channels which are each separated by a semi-permeable membrane that permits heat and water vapor to be transferred between the air and liquid desiccant flows. Each of the flow channel energy exchange membrane areas is rectangular in shape, with liquid desiccant flow either nearly counter-flow or cross-flow relative to the direction of the air flow in each adjacent fluid channel pair. Other predetermined geometric length ratios that may be specified for each LAMEE are the exchanger panel aspect ratio and liquid flow entrance/exit length ratio. The exchanger panel aspect ratio is defined by the height of each panel energy exchange membrane area divided by the length of the energy exchange membrane area in the panel. A plurality of panels forming desiccant liquid channels and air channels extend through the housing. The air channels are configured to direct an air stream uniformly, with equal mass flow rate among the total number of air channels in the housing. Likewise, the fluid flow through each liquid flow channel is uniformly distributed in each liquid flow channel and the mass flow rate for each channel is the same for all liquid flow channels. In alternative embodiments, the air stream and the fluid flow through the heat exchanger may be non-uniform. A desiccant inlet is provided in flow communication with the liquid desiccant channels in the housing. A desiccant outlet is provided in flow communication with the liquid desiccant channels.

The design and operational parameters of the LAMEEs and passive RAMEE system will include all of the geometric (0) and physical (P) ratios set forth in Table 1.

TABLE 1

Defined Set of Dimensionless Independent Factors IF and their Ranges

| Parameter | Description | Suggested Range | Parameter Meaning |
| --- | --- | --- | --- |
| G1 | Counter or Cross flow for the liquid desiccant and air streams in each exchanger | 180° or 90° | Dominant relative flow directions for air and liquid desiccant in each exchanger |
| G2 | Aspect ratio (AR = H/L) of each panel in the LAMEE, wherein AR is the aspect ratio, H is the height of the energy exchange area in the flow panel, and L is the air flow length of the energy exchange area of the LAMEE | 0.1 < AR < 3.0 | Energy Exchange Aspect Ratio for each panel in a LAMEE (Since this ratio is also a factor in reducing buoyancy induced mal-distributions effects the factor's magnitude may be restricted.) |
| G3 | Inlet/outlet ratio | 0.02 < Le/L < 0.2 for primarily counter-flow LAMEE 0.5 < Le/L < or = 1.0 for primarily cross-flow LAMEE | ratio of the flow channel liquid inlet/outlet length, Le, divided by the flow channel length, L |
| G4 | Ratio of the operating flow channel average hydraulic diameter standard deviation for all channels [$sig(d_{w,air})$ and $sig(d_{w,liq})$ for air and liquid channels] with respect to the average hydraulic diameter for all air $d_{w,air}$ and liquid $d_{w,liq}$ channels (including membrane deflections) in a LAMEE | $0.0 < sig(d_{w,air})/d_{w,air} < 0.2$ $0.0 < sig(d_{w,liq})/d_{w,liq} < 0.2$ | Air and liquid desiccant channel manufactured and operating width characteristic variations causing flow mal-distributions due to channel geometry variations for each LAMEE |
| G5 | Ratio of the standard deviation of the flow channel hydraulic diameter to mean hydraulic diameter for a typical flow channel in a LAMEE for air or liquid desiccant | $0.0 < sig(d_{st})/d_{st} < 0.2$ | Flow channel variations in each typical flow channel to reduce flow mal-distributions due to geometric variations in a channel and so make each LAMEE more compact in size |
| G6 | Ratio of the solid surface area of (a) the air flow channel structural membrane support screen to its total area and (b) the liquid flow channel screen solid area to its total area | $0.05 < (Ass/Ast)_{air} < 0.2$ $0.1 < (Ass/Ast)_{liq} < .3$ | The screen area ratios are (a) directly proportional to the area blockage factor for the membrane for water vapor transfer and (a&b) directly related to the turbulence enhancement ratio for each flow |
| G7 | Support Spacer Ratios | Dssa/Dsa = m/n and 0.3 < m/n < 5.0, where m and n are whole numbers | distance between the air channel spacer support structures in the average bulk flow streamline direction, Dssa, divided by the distance between spacer support |

TABLE 1-continued

Defined Set of Dimensionless Independent Factors IF and their Ranges

| Parameter | Description | Suggested Range | Parameter Meaning |
|---|---|---|---|
| | | | structures normal to the average bulk flow spacer support structures, Dsa, is a fraction or whole number |
| G8 | Liquid flow direction | liquid flow direction through the liquid flow channels is controlled with respect to the direction of gravity | minimize mal-distribution effects and maintain high performance factors for the RAMEE system |
| G9 | Flow channel angle | $45 < Z_g < 135°$ | angle $Z_g$ between a vector normal to the plane of each flow channel and the vector for the acceleration of gravity |
| G10 | Flow channel edge angle | $60 < O^* < 120°$ | angle $O^*$ between the vector parallel to the edge of each flow channel along its length and the acceleration of gravity |
| P1 | Dimensionless flow characterization numbers (a) Reynolds number (Re) for each typical flow channel is such that the flow is turbulent for the air flow and, where practical, for the liquid flow channels (b) Rayleigh number (Ra) is favorable for stable uniform especially when the liquid flow is laminar | (a) $Re_{dh} > Re_c$ (b) $Ra_{dh} < Ra_c$ | Where the characteristic length is the hydraulic diameter (dh) and the subscript 'c' refers to (a) the critical transition from laminar to turbulent flow and (b) the critical transition from stable uniform flow to unstable mal-distributed liquid flow due to density variations |
| P2 | Exchanger number of transfer units (NTU) for heat transfer during a RAMEE test | $1.0 < NTU < 15$ | Exchanger operating condition characteristic ratio to obtain a good exchanger and system effectiveness |
| P3 | Exchanger thermal capacity ratio (Cr*) during a RAMEE test | $1.0 < Cr^* < 10.0$ | Exchanger operating condition characteristic ratio to obtain a good exchanger and system effectiveness |
| P4 | Ratio of the membrane water vapor resistance ($R_{m,wv}$) to convective water vapor mass transfer resistance ($R_{air,wv}$) | $0.1 < R_{m,wv}/R_{air,wv} < 3.0$ | Membrane water vapor to air flow convection resistance ratio to obtain a good exchanger and system latent energy effectiveness |
| P5 | Air flow pressure drop ratio | $10^3 < p_h A_c/V_c < 10^4$ | Air flow pressure drop ratio for each LAMEE to obtain a good performance RER for the RAMEE system |
| P6 | flow channel ratio of convective heat transfer coefficient, h | laminar flow convective heat transfer coefficient, $h_{lam}$, at the same channel Reynolds number is $[1.1 < h/h_{lam} < 2.0]_{Re}$ | channel average friction flow coefficients for turbulent and laminar flow, f and $f_{lam}$, satisfy $[f/f_{lam} < h/h_{lam}]_{Re}$ |

TABLE 1-continued

Defined Set of Dimensionless Independent Factors IF and their Ranges

| Parameter | Description | Suggested Range | Parameter Meaning |
|---|---|---|---|
| P7 | Air flow pressure drop ratio ($p_h A_c/V_c$), wherein $p_h$ is the pressure drop across the LAMEE in units of length, $A_c$ is the area of the air channel, and $V_c$ is the channel volume for air flow in the LAMEE | $p_{m,bt}/(rho * g * H) > 20$ | Membrane liquid penetration resistance pressure with respect to the maximum static pressure difference in each LAMEE liquid flow channel to prevent leaks in the LAMEE during normal operation |
| P8 | Membrane liquid break-through pressure ratio $[p_{m,bt}/(rho * g * H)]$, wherein $p_{m,bt}$ is the membrane liquid break-through pressure, g is gravity, and H is the height of the membrane panel energy exchange area | $p_{es,bt}/(rho * g * H) > 20$ | Membrane edge seal liquid penetration pressure with respect to the static liquid flow channel in each LAMEE to prevent leaks in the LAMEE under normal operation |
| P9 | Elastic tensile yield limit ratio for the membrane $[T_{m,yl}/(p_{l,op} * s_{ws})]$, wherein $T_{m,yl}$ is the tensile yield limit for the membrane, $p_{l,op}$ is a typical operating pressure for the liquid in each LAMEE, and $s_{ws}$ is a wire spacing distance for a screen used to resist the liquid pressure for each liquid flow channel | $0.02 < T_{m,yl}/(p_{l,op} * s_{ws}) < 1.5$ | Membrane tensile elastic yield limit pressure per unit length with respect to the support screen pressure per unit length to reduce membrane defections on the support screen for the membrane |
| P10 | Time duration for a risk of crystallization in the salt solution over the year divided by the total yearly time duration of system operation ($t_{salt,risk}/t_{op}$) | $t_{salt,risk}/t_{op} < 0.15$ | Risk time duration of salt solution crystallization compared to the total time duration for RAMEE system operation to reduce the relative time duration required for active control to avoid crystallization in the RAMEE system |
| P11 | cost of salt or mixture of salts used in the system divided by the corresponding cost of LiCl for the system | $C_{salt,mix}/C_{LiCl} < 1.0$ | Salt solution cost compared to the cost of a lithium chloride salt solution for the same RAMEE system |
| P12 | LAMEE heat exchange rate | $0.0 < Q_{sur}/Q_{exch} < 0.05$ | LAMEE heat exchange rate with the surroundings ($Q_{sur}$) divided by the heat rate transferred to or from the air flowing through the exchanger ($Q_{exch}$) during a standard test of a RAMEE system using two identical LAMEEs |

With respect to factor G1, the desiccant channels are configured to channel equally the liquid desiccant mass flow rate through each of the liquid flow channels from the desiccant inlet to the desiccant outlet in at least one of a counter-flow or cross-flow direction with respect to the direction of the adjacent air streams to facilitate heat and water vapor transfer through the semi-permeable membrane between the liquid desiccant flow in the desiccant channels and the air stream in the air channels.

With respect to factor G2, the exchanger panel aspect ratio is selected to provide a predetermined exposure through the semi-permeable membrane between the air and liquid flow for adjacent channels in each LAMEE.

The liquid flow entrance/exit length ratio with respect to the length of the membrane energy transfer area (factor G3) may be utilized for flow channels that are primarily counter-flow within a LAMEE. The effectiveness of the LAMEE may be partly determined using each of the factors G1-G3. Accordingly, fluid flow direction (factor G1), aspect ratio (factor G2) and entrance/exit flow length ratio (factor G3) in the set If may be used to partly determine the LAMEE performance.

With respect to the factor G3, for primarily counter-flow LAMEE exchangers, the ratio of the flow channel liquid inlet/outlet length, Le, divided by the flow channel length, L is approximately $0.02 < Le/L < 0.2$. For primarily cross-flow LAMEE exchangers, the ratio of the liquid flow inlet/outlet the ratio of the liquid flow channel inlet, Le, divided by the flow channel length, L is approximately $0.5 < Le/L <$ or $=1.0$.

The determination of the statistical channel averaged hydraulic diameter variation for the liquid flow channels will be more difficult to determine for the liquid flow channels than the air flow channels because the volume flow rates and channel dimensions are small (e.g. 2 to 10 times smaller than the air channels). The decrease in the effectiveness due to mal-distribution of mass flows among the fluid flow channels of each LAMEE in the passive RAMEE system, comprising two identical LAMEEs, will be partly determined using the ratio of standard deviation of average channel hydraulic diameters to mean average channel hydraulic diameter (factor G4). For example, assuming a uniform flow through each channel but different flow rates among the set of channels in a LAMEE for air flow through a large set of channels, with a standard deviation of hydraulic diameter for the channels divided by the mean hydraulic diameter equal to 0.1 compared with one that has no variations in the liquid flow channels, the decrease in air pressure drop across the flow channels in a LAMEE relative to the same channels with no width variations will be about 3% for laminar flow and 6% for turbulent flow and the corresponding drop in RAMEE system effectiveness will be about 6% for laminar flow and 8% for turbulent flow (it will be made clear that laminar flows in the liquid channels may have strong destabilizing effects unless the buoyancy forces re-stabilize the flows). If the variations in flow channel widths are relatively identical for the liquid flow channels then the total decrease in the effectiveness for the RAMEE system would be approximately 8.5% and 11% for laminar and turbulent flows, respectively. Variations in the channel widths for the typical flow channels, characterized by factor G5, will further decrease the system performance. Furthermore, since there may be a strong correlation between the liquid flow and air flow channel hydraulic diameters (widths) (i.e. the variation in channel widths are not statistically independent for each fluid), the drops in system effectiveness can be significantly larger. Furthermore, and as discussed below, mal-distribution of flow due to buoyancy effects in each liquid flow channel can result in an additional drop in effectiveness. Since the flow channel ratio of flow channel hydraulic diameters only deals with the variations in the average flow channel hydraulic diameters, other independent parameters will be needed to complete the set If in Table 1.

Another embodiment is provided wherein the distance between the membranes of air and liquid flow channels (also called channel widths or hydraulic diameters) are designed to be nearly uniform over each channel in a LAMEE during typical operating conditions. Due to manufacturing and operational tolerances, when averaged over each flow channel, the locally averaged hydraulic diameter may be different for each fluid (i.e. air or liquid desiccant), for local flow regions within each channel and among all the channels in a LAMEE. Manufactured LAMEEs under typical operating conditions will have a distribution of average channel hydraulic diameters that is statistically normal (i.e. Gaussian) or nearly normal in distribution considering the uncertainty bounds. The variation in channel average flow channel hydraulic diameters in a LAMEE will cause air and liquid flow mal-distributions for each fluid among the many flow channels in each LAMEE. Consequently the energy transfer effectiveness and the fluid pressure drop of the LAMEE will be lower than that for an ideal theoretical design with equal mass flow rates for each fluid channel. The variations among all the flow channel average hydraulic diameters that cause variations in each fluid mass flow rate should be designed to be small (i.e. the standard deviation of the flow channel hydraulic diameters for both the air and liquid flow channels should be small with respect to the mean average flow channel hydraulic diameter for each fluid within the LAMEE, G4). The flow channel average hydraulic diameter variation in a LAMEE is also a factor for counter-flow liquid channels because the pressure drop for the liquid flow entrance and exit regions in the channel may be a larger fraction of the total channel pressure drop and the flow path lengths may be longer (e.g. longer than the air flow path length through each channel). Channel width variations will be present for the typical air and liquid flow channels. Due to their normal distribution, these width variations within each panel are best characterized by their statistical properties as defined by geometric factor G5. In an exemplary embodiment a width of the air channels is selected based on a width of the desiccant channels.

As a summary of the geometric factors G6 to G10, the liquid channel screen insures a minimum spacing for the channel width and enhances the transition to turbulent flow for large liquid flow rates. The air and liquid flow channel screen area ratios (factor G6) is yet another predetermined embodiment because the ratios are directly related to turbulence enhancement and blockage fraction of the membrane for water vapor transfer on the air side of the membrane. The air channel spacer support structure ratio (factor G7) is another geometric embodiment that assists the transition to turbulent flow and partly determines the geometry of the flow channel through its structural supports. Factor G8 defines the best liquid flow direction with respect to gravity through each LAMEE exchanger which may be controlled to avoid liquid flow mal-distribution and factors G9 and G10 define LAMEE angles with respect to gravitational acceleration to get high performance factors for the RAMEE system and all its LAMEEs.

The new ratio of standard deviation for each liquid flow stream-tube hydraulic diameter in each liquid flow channel divided by the mean value can be used to analyze the decrease in expected effectiveness of each LAMEE and the passive RAMEE system in which it is used or tested. For example, if the flow tube standard deviation ratio is 0.05 (i.e. 5%) for the typical liquid flow channel in each identical LAMEE in the RAMEE system, then the decrease in total system effectiveness will be about 4% for turbulent flows but the loss of effectiveness may be much higher for laminar liquid flows where the flow field is unstable due to buoyancy effects.

Average or bulk mean flow streamlines in each of the air flow channels will, depending on the air channel support structure, be on average nearly parallel straight lines through the energy exchange area. The air flow channels are mostly a void region with parallel flow spacer guide structures that cause the streamlines to be nearly straight while the inertial to viscous forces in the flow, characterized by the Reynolds numbers (i.e. $Re_{dh}=Vd_h/k_v$ where V is the bulk mean channel fluid speed, $d_h$ is the hydraulic diameter of the flow channel, and $k_v$ is the kinematic viscosity of the fluid) are moderately high (i.e. $300<Re_{dh,air}<1500$ which, as will be discussed in more detail later, may be laminar or turbulent). This is not the case for the liquid desiccant channels in counter/cross flow LAMEEs where the Reynolds numbers will be much lower and the flow is likely to be laminar at low values of Cr*. The average liquid flow streamlines can be much more complex than for the channel flow of air because the liquid flow passages cannot lead to parallel straight lines and when unstable buoyancy forces are much greater than the viscous forces, characterized by the Rayleigh number, Ra, they induce flow instabilities that cause very complex streamlines (i.e. $Ra>Ra_c$) for counter-flow exchangers with parallel membranes (where $Ra=-a^B^gd_h^2H^2/(k_v t_d)$) where a* is the temperature gradient in the vertical direction (i.e. with respect to gravitational acceleration when the tilt angle is small), B* is the coefficient of thermal expansion, g is the acceleration due to gravity, H is the vertical height of the flow channel and $t_d$ is the thermal diffusivity of the fluid). Since the viscous forces for turbulent flows are much higher than they are for laminar flows, the critical Rayleigh number, Rae, at which buoyancy induced instabilities cause significant flow mal-distributions changes significantly with the type of flow. That is, the screens used in each fluid flow channel and the spacers used in the air flow channels can be used to enhance turbulence in each flow but, at the same time it is not desirable to unnecessarily increase the pressure drop due to each fluid flow. The preferred screen solid area to total screen area is given by factor G6. Even cross flow exchangers will have complex streamline patterns when $Ra>Ra_c$ and so their performance factors will be lower than expected from theoretical values derived from typical simplifying assumptions. Operating LAMEE exchangers so that the Rayleigh number is always in the stable flow region (i.e. $Ra_{dh}<Ra_c$) allows the performance factors to be high compared to exchangers that are not designed and operated to account for the instability. The value for the critical Rayleigh number for a particular exchanger is an empirical quantity that depends on the exchanger design and its fluid properties and Reynolds number.

With respect to the factor G7, the distance between the air channel spacer support structures in the average bulk flow streamline direction, Dssa, divided by the distance between spacer support structures normal to the average bulk flow spacer support structures, Dsa, is a fraction or whole number, such that $Dssa/Dsa=m/n$ and $0.01<m/n<5.0$, where m and n are whole or integer numbers.

With respect to factor G8, the liquid flow direction through the liquid flow channels is controlled with respect to the direction of gravity (i.e. from the bottom inlet to the top outlet for liquid flows that are heated within the channel and vice versa for liquid flows that are cooled in the channel) to minimize mal-distribution effects and maintain high performance factors for the RAMEE system.

With respect to factor G9, an angle $Z_g$ between a vector normal to the plane of each flow channel and the vector for the acceleration of gravity is such that $45<Z_g<135°$. The angle $Z_g=90°$ for most applications so that buoyancy effects will enhance the LAMEE performance when the correct flow direction is chosen for each exchanger.

With respect to factor G10, an angle O* between the vector parallel to the edge of each flow channel along its length and the acceleration of gravity is such that $60<O^*<120'$. This angle, or the LAMEE tilt angle (90-O*), is normally selected to result in a positive enhancement of performance due to buoyancy effects.

Further embodiments are provided for with the flow channel flow conditions and their orientation, or combinations of several geometric and operational factors, for each LAMEE which involves flow field characterization through the Reynolds number and the flow stability factor, Rayleigh number. The Rayleigh number can be selected to be most favorable by arranging the temperature gradients in each LAMEE to be such that the fluid density always increases in the downward direction of gravitational acceleration. This implies that the flow channels in a LAMEE should be aligned so that their normal area vector is horizontal and the length vector of the flow channel is tilted with a large enough angle to cause a favorable and significant density gradient for uniform flows in each channel and among all the channels. Channel flows in long thin channels with small or negligible entrance lengths for the flows are well known to be one of: (a) fully developed laminar flow at low Reynolds number, (b) fully developed turbulent flow at high Reynolds number, or (c) transition turbulent flows at intermediate Reynolds numbers between the two low and high transition Reynolds numbers. The flow transition Reynolds number that causes the flow to transfer from laminar to transition turbulence tends to be fixed for any given channel (see factor P1) where the Rayleigh number indicates no buoyancy induced mal-distributions (see factors G8, G9, & G10), but very small changes to the surfaces inside each channel can cause large changes to the transition Reynolds number. That is, the flow in a channel can become turbulent when small increased surface roughness or flow separations within the channel flow changes are introduced at some low Reynolds numbers compared to laminar flow in the same channels with no roughness additions. In one embodiment, a characteristic Reynolds number for the air stream through the air channels is greater than a critical Reynolds number for turbulent flow in the air channels. In another embodiment, a characteristic Rayleigh number for desiccant flow in the desiccant channels is less than a critical Rayleigh number for thermally induced liquid density instability causing non-uniform mal-distributed flow at a Reynolds number for desiccant flow.

The fluid inertial, viscous and buoyancy forces all play important roles for a well designed and operated LAMEE and their ratios are characterized by the Reynolds number and Rayleigh number in factor Pt where it is stated that we prefer to have turbulent flow when practical and we should always avoid adverse buoyancy effects in the liquid flows. The Reynolds number for the liquid flow through the liquid flow channels will typically be very low (i.e. $0.1<Re_{dh,Hq}<100$). Under these circumstances, the liquid flow may be laminar for the lowest Reynolds numbers in the range but, for some specially designed internal geometries the flow will become complex-laminar-turbulent or turbulent as the Reynolds number is increased from the low to the high end of this Reynolds number range. Therefore the liquid channel flow, which may exhibit laminar flow mass flux channeling or fingering of the liquid for unfavorable Rayleigh numbers at the low Reynolds numbers in the above range, will, due to turbulent mixing, locally self adjust at higher Reynolds number so that mal-distribution effects are much smaller. On the other hand, the air flow channels will most likely have turbulent flow, especially if some surface roughness is introduced to cause the flow to be turbulent. In an exemplary embodiment, the air channels include turbulence enhancing surface roughness features to facilitate increasing energy transfer that exceeds an additional air pressure drop energy loss when convective heat and latent energy transfer increase. In another embodiment, the desiccant include turbulence enhancing surface roughness features when a Rayleigh number is less than a critical Rayleigh number at a Reynolds number for the flow.

Since the liquid is under a pressure greater than the adjacent channel air pressure, it causes the flexible semi-permeable membrane and its support structure in the air channel on either side of each liquid flow channel to deflect or deform elastically. As previously noted, the liquid flow should be directed through each channel so that it minimizes flow mal-distributions (i.e. $Ra<Ra_c$ for laminar flow and, when flow rates are higher, $Re>Re_c$ for turbulent flow). The design and operational conditions imply that the liquid flow direction will be such that the liquid flow will be from a bottom inlet to the top outlet for the supply LAMEE exchanger and from the top inlet to the bottom outlet for the exhaust LAMEE exchanger for the standard summer test conditions. The flow directions through each LAMEE will be reversed for the winter standard test conditions. That is, a liquid flow direction controller will be used so that the inlet direction will be bottom or top of each LAMEE exchanger depending on the value of the Rayleigh number for each exchanger and the angles of the flow channels with respect to the acceleration direction of gravity as defined in Table 1 for factors G9 and G10. With these controlled liquid flow directions and a small performance enhancing tilt angle for the LAMEE, the problems of flow mal-distribution will have been reduced to a minimum for the geometric configurations of the flow channels and the channel Reynolds number. In fact, the restoring forces of favorable buoyancy forces that induce flow uniformity into the liquid flow channels that, due to flow channel width variations, can reduce the declination of performance factors for a LAMEE using factors G9 and G10 compared to the case of no restorative buoyancy forces.

On the liquid flow side of the membrane, turbulent mixing within the flow channel may be a factor if there is a tendency toward laminar flow buoyancy induced mass flux fingering at high Rayleigh numbers and very low Reynolds numbers result in non-uniform exposure of the bulk flow to the molecular diffusion transfer process in the liquid. In one embodiment, for the factor P1, turbulence enhancement of the air and liquid flows through the LAMEE energy exchange channels is used to enhance turbulent transition and liquid flow directions are chosen for each LAMEE operating condition to decrease buoyancy induced instabilities in the liquid flow channels. For a given flow channel geometry, which is characterized by the hydraulic diameter and surface roughness, the Reynolds number is the only operating factor that determines whether the flow is laminar or turbulent. The performance effectiveness and RER of the passive RAMEE and its LAMEEs will be enhanced with some turbulent mixing.

In other embodiments, an energy exchanger is provided. The exchanger includes a housing for the air and liquid desiccant channels each separated by a semi-permeable membrane. A plurality of panels forming desiccant channels and air channels extend through the housing. The air channels are configured to direct an air stream through the housing. The plurality of panels are spaced apart partly based on predetermined air to desiccant mass rates (P3) and the air channel width or spacing and a desiccant channel width or spacing. The air to desiccant mass flow rate may be selected to achieve predetermined exchanger performance ratios that define a sensible and latent energy exchange rate between the desiccant and the air stream. The panel spacing may also be dependent on factors G4, G5, and P5. The air to desiccant mass flow rates may define an air channel width and/or a desiccant channel width. The air-to-desiccant channel mass flow rates may be selected to provide a predetermined mass or volume of air stream flowing through the air channels and/or a predetermined mass or volume of desiccant flowing through the desiccant channels. The desiccant channels may have an approximately constant desiccant channel width. Additionally, the air channels may have an approximately constant air channel width. In one embodiment, a ratio of the average air channel width divided by the average desiccant channel width is within a range of 1 to 5.

A desiccant inlet header is provided in flow communication with all the desiccant channels. A desiccant outlet is provided in flow communication with the desiccant channels. The desiccant channels are configured to channel desiccant from the desiccant inlet to the desiccant outlet in at least one of a counter-flow or cross-flow direction with respect to the direction of the air stream to facilitate heat and water vapor transfer between the desiccant in the desiccant channels and the air stream in the air channels.

For a predetermined test condition of the passive RAMEE system, a predetermined equal mass flow rate of supply and exhaust air pass through each identical LAMEE. By so doing, the number of transfer units for heat transfer (NTU) in each LAMEE is predetermined (factor P2). When the pumping rate of liquid desiccant is chosen, the heat capacity rate ratio (i.e. the mass flow rate times the specific heat of desiccant liquid flow divided by the mass flow rate of air) through each LAMEE, Cr*, is predetermined (factor P3). There may be a trade-off for the selection of Cr* because increasing the liquid flow rate may enhance turbulence in the liquid flow channels and will increase Cr*, which can have positive and negative effects on the effectiveness. Accordingly, the value of Cr* should be selected so that the effectiveness of the LAMEE is a maximum when the highest performance is required.

Other embodiments for energy exchangers are provided. The exchanger includes a housing containing the air and liquid flow channels each separated by a semi-permeable membrane. A plurality of panels forming desiccant channels and air channels extend through the housing. The air channels are configured to direct an air stream through the housing. A desiccant inlet header is provided in flow communication with all the desiccant channels. A desiccant outlet is provided in flow communication with the desiccant channels. The desiccant channels are configured to channel liquid desiccant from the desiccant inlet to the desiccant outlet in at least one of a counter-flow or cross-flow direction with respect to the direction of the air stream. A semi-permeable membrane extends through each panel to facilitate heat and water vapor transfer between the desiccant liquid in the desiccant channels and the air stream in the air channels. The membrane may be selected based on membrane resistance ranges defined to reduce a flow of desiccant through the membrane. The semi-permeable membrane possesses a resistance to water vapor diffusion which, relative to the typical convection water vapor transport resistance in the air channels, lies within a specified range given by factor P4. A water vapor transfer resistance ratio is defined by a ratio of the membrane water vapor resistance ($R_{m,wv}$) to convective water vapor mass transfer resistance ($R_{air,wv}$). The ratio of the membrane water vapor resistance (to convective water vapor mass transfer resistance ($R_{air,wv}$) may be within a range of 0.2 to 3.

The static air pressure drop as it passes from air inlet to outlet in each LAMEE in a RAMEE system is the same for each air channel. The range of acceptable air pressure drops for a LAMEE so that the passive RAMEE system will have a high RER value in the set Pf is presented using factor P5. In one embodiment, the air flow pressure drop ratio is defined as ($p_h A_c/V_c$), wherein $p_h$ is a pressure drop of the air stream across the energy exchanger, $A_c$ is an area of an air channel, and $V_c$ is a volume of the air channel. In one embodiment, the air flow pressure drop ratio is between $1 \times 10^3$ and $1 \times 10^4$.

With respect to factor P6, a flow channel ratio of convective heat transfer coefficient, h, (i.e. for turbulent flow) with respect to the theoretical laminar flow convective heat transfer coefficient, $h_{lam}$, at the same channel Reynolds number is $[1.1 < h/h_{lam} < 2.0]R_e$. The channel average friction flow coefficients for turbulent and laminar flow, f and $f_{lam}$, satisfy $[f/f_{lam} < h/h_{lam}]_{Re}$.

Turbulent flows in channels with flow at a particular Reynolds number will have enhanced heat and mass transfer rates compared with those with laminar flows. Taking advantage of this fact is the purpose of factor P6. Accordingly, the internal surface roughness may be enhanced for channel flows that would have been laminar for smooth internal surfaces but turbulent for the same channel with rough surfaces or flow separation causing surfaces at the same Reynolds number (i.e. operating close to the flow transition Reynolds number between laminar and transition turbulence so as to cause the laminar flow to become turbulent). The heat or mass transfer enhancement is a factor for the air flow channels where the relatively high laminar flow characteristic convection resistance dominates the total resistance and the design need for the LAMEE energy exchange total area and LAMEE total volume and geometry. Air channel support structures must be chosen and positioned to provide the desired membrane channel width and concurrently induce a turbulent flow transition from laminar to turbulent flow, but not cause an excessive increase air pressure drop for the flow channel. The ratios for the same channel flow Reynolds number are empirically selected for enhanced heat and mass transfer coefficients compared to laminar flow heat and mass transfer coefficients, which may be large, while the ratios for increased friction coefficients compared to laminar flow friction coefficients may be smaller (i.e. there is a net heat and mass transfer benefit for the turbulence enhancement relative to the air flow pressure drop increase).

The semi-permeable membrane is designed (or selected) and operated to avoid the transfer of any liquid from the liquid channels to the air channels. Factors P7 and P8 define the acceptable liquid pressure ratios that should be used for selecting the semi-permeable membrane and its edge seals in each LAMEE.

The difference between the static desiccant liquid pressure and the adjacent static air pressure cause the semi-permeable membrane to deflect during normal operation and the deflections will, as discussed above, result in a distribution of typical inter-channel hydraulic diameters that decrease the LAMEE and RAMEE system effectiveness. The deflections of the semi-permeable membrane through its air side support screen will be determined using its elastic properties, the geometry of the screen pores, and the liquid pressure. The operating properties are combined into a ratio (factor P9) that should be selected within a specified range for the design and operation of each LAMEE. In one embodiment, the membrane is selected based on a predetermined channel deflection range that is defined to limit the amount of membrane deflection. A standard deviation of the hydraulic diameter of all of the air channels and desiccant channels divided by a mean value of a hydraulic diameter for one of the air channels or desiccant channels may be within a range of 0.0 to 0.2. A standard deviation of a hydraulic diameter for one air channel or desiccant channel divided by a mean hydraulic diameter for the air channel or desiccant channel may be within a range of 0.0 to 0.2.

In another embodiment, an energy exchanger is provided. The exchanger includes a housing containing the air and liquid flow channels separated by a semi-permeable membrane. A plurality of panels forming desiccant channels and air channels extend through the housing. The air channels are configured to direct an air stream through the housing air channels. A desiccant inlet is provided in flow communication with the desiccant liquid channels. A desiccant outlet is provided in flow communication with the desiccant liquid channels. The desiccant channels are configured to channel desiccant from the desiccant inlet to the desiccant outlet in at least one of a counter-flow or cross-flow direction with respect to the direction of the air stream to facilitate heat and water vapor transfer between the desiccant in the desiccant liquid channels and the air stream in the air channels. The liquid desiccant salt concentration mixture is selected based on predetermined salt solution saturation concentration limit and membrane surface air side relative humidity for each climatic region in which the RAMEE system is to operate in applications. In one embodiment, the desiccant is selected based on at least one of an operating temperature or humidity ratio of the air stream, wherein the humidity ratio is defined by a moisture to air content of the air stream. The annual time fraction duration of RAMEE system operation without the risk of salt crystallization problems for a particular climatic region (factor P10) and the expected life-cycle costs relative to that for a system using pure LiCl or LiBr for the system (factor P11) are partly based on the desiccant selection. Each of the above embodiments (factors P10 and P11) are uniquely defined for the LAMEEs operating within a passive RAMEE system under steady-state test conditions.

With respect to factor P12, the LAMEE heat exchange rate with the surroundings ($Q_{sur}$) divided by the heat rate transferred to or from the air flowing through the exchanger ($Q_{exch}$) during a standard test of a RAMEE system using two identical LAMEEs is $0.0 < Q_{sur}/Q_{exch} < 0.05$.

Since the liquid is under a pressure greater than the adjacent channel air pressure, it causes the flexible semi-permeable membrane and its support structure in the air channel on either side of each liquid flow channel to deflect or deform elastically. As previously noted, the liquid flow should be directed through each channel so that it minimizes flow mal-distributions (i.e. $Ra < Ra_c$ for laminar flow and, when flow rates are higher, $Re > Re_c$ for turbulent flow). The design and operational conditions imply that the liquid flow direction will be such that the liquid flow will be from a bottom inlet to the top outlet for the supply LAMEE exchanger and from the top inlet to the bottom outlet for the exhaust LAMEE exchanger for the standard summer test conditions. The flow directions through each LAMEE will be reversed for the winter standard test conditions. That is, a liquid flow direction controller will be used so that the inlet direction will be bottom or top of each LAMEE exchanger depending on the value of the Rayleigh number for each exchanger and the angles of the flow channels with respect to the acceleration direction of gravity as defined in Table 1 for factors G9 and G10. With these controlled liquid flow directions and a small performance enhancing tilt angle for the LAMEE, the problems of flow mal-distribution will have been reduced to a minimum for the geometric configurations of the flow channels and the channel Reynolds number.

The Reynolds number for the liquid flow through the liquid flow channels will typically be very low (i.e. $0.1 < Re_{dh,liq} < 100$). Under these circumstances, the liquid flow may be laminar for the lowest Reynolds numbers in the range but, for some specially designed internal geometries the flow will become complex-laminar-turbulent or turbulent as the Reynolds number is increased from the low to the high end of this Reynolds number range. Therefore the liquid channel flow, which may exhibit laminar flow mass flux channeling or fingering of the liquid for unfavorable Rayleigh numbers at the low Reynolds numbers in the above range, will, due to turbulent mixing, locally self adjust at higher Reynolds number so that mal-distribution effects are much smaller.

This is also a problem for laminar flows and heat and mass transfer coefficients. The liquid channel screen insures a minimum spacing for the channel width and enhances the transition to turbulent flow for large liquid flow rates. The air and liquid flow channel screen area ratios (factor G6) is yet another predetermined embodiment because the ratios are directly related to turbulence enhancement and blockage fraction of the membrane for water vapor transfer on the air side of the membrane. The air channel spacer support structure ratio (factor G7) is another geometric embodiment that assists the transition to turbulent flow and partly determines the geometry of the flow channel through its structural supports. Factor G8 defines the best liquid flow direction with respect to gravity through each LAMEE exchanger which may be controlled to avoid liquid flow mal-distribution and factors G9 and G10 define LAMME angles with respect to gravitational acceleration to get high performance factors for the RAMEE system and all its LAMEEs.

The new ratio of standard deviation for each liquid flow stream-tube hydraulic diameter in each liquid flow channel divided by the mean value can be used to analyze the decrease in expected effectiveness of each LAMEE and the passive RAMEE system in which it is used or tested. For example, if the flow tube standard deviation ratio is 0.05 (i.e. 5%) for the typical liquid flow channel in each identical LAMEE in the RAMEE system, then the decrease in total system effectiveness will be about 4% for turbulent flows but the loss of effectiveness may be much higher for laminar liquid flows where the flow field is unstable due to buoyancy effects.

Another embodiment is provided for the flow channels in each LAMEE which involves flow field characterization through the Reynolds number and the flow stability factor, Rayleigh number. The Rayleigh number can be selected to be most favorable by arranging the temperature gradients in each LAMEE to be such that the fluid density always increases in the downward direction of gravitational acceleration. This implies that the flow channels in a LAMEE should be aligned so that their normal area vector is horizontal and the length vector of the flow channel is tilted with a large enough angle to cause a favorable and significant density gradient for uniform flows in each channel and among all the channels. Channel flows in long thin channels with small or negligible entrance lengths for the flows are well known to be one of: (a) fully developed laminar flow at low Reynolds number, (b) fully developed turbulent flow at high Reynolds number, or (c) transition turbulent flows at intermediate Reynolds numbers between the two low and high transition Reynolds numbers. The flow transition Reynolds number that causes the flow to transfer from laminar to transition turbulence tends to be fixed for any given channel where the Rayleigh number indicates no buoyancy induced mal-distributions, but very small changes to the surfaces inside each channel can cause large changes to the transition Reynolds number. That is, the flow in a channel can become turbulent when small increased surface roughness or flow separations within the channel flow changes are introduced at some low Reynolds numbers compared to laminar flow in the same channels with no roughness additions.

Turbulent flows in channels with flow at a particular Reynolds number will have enhanced heat and mass transfer rates compared with those with laminar flows. Accordingly, the internal surface roughness may be enhanced for channel flows that would have been laminar for smooth internal surfaces but turbulent for the same channel with rough surfaces or flow separation causing surfaces at the same Reynolds number (i.e. operating close to the flow transition Reynolds number between laminar and transition turbulence so as to cause the laminar flow to become turbulent). The heat or mass transfer enhancement is a factor for the air flow channels where the relatively high laminar flow characteristic convection resistance dominates the total resistance and the design need for the LAMEE energy exchange total area and LAMEE total volume and geometry. Air channel support structures must be chosen and positioned to provide the desired membrane channel width and concurrently induce a turbulent flow transition from laminar to turbulent flow, but not cause an excessive increase air pressure drop for the flow channel. The ratios for the same channel flow Reynolds number are empirically selected for enhanced heat and mass transfer coefficients compared to laminar flow heat and mass transfer coefficients, which may be large, while the ratios for increased friction coefficients compared to laminar flow friction coefficients may be smaller (i.e. there is a net heat and mass transfer benefit for the turbulence enhancement relative to the air flow pressure drop increase).

On the liquid flow side of the membrane, turbulent mixing within the flow channel may be a factor if there is a tendency toward laminar flow buoyancy induced mass flux fingering at high Rayleigh numbers and very low Reynolds numbers result in non-uniform exposure of the bulk flow to the molecular diffusion transfer process in the liquid. In one embodiment, for the factor P1, turbulence enhancement of the air and liquid flows through the LAMEE energy exchange channels is used to enhance turbulent transition and liquid flow directions are chosen for each LAMEE operating condition to decrease buoyancy induced instabilities in the liquid flow channels. For a given flow channel geometry, which is characterized by the hydraulic diameter and surface roughness, the Reynolds number is the only operating factor that determines whether the flow is laminar or turbulent. The performance effectiveness and RER of the passive RAMEE and its LAMEEs will be enhanced with some turbulent mixing.

In other embodiments, an energy exchanger is provided. The exchanger includes a housing for the air and liquid desiccant channels each separated by a semi-permeable membrane. A plurality of panels forming desiccant channels and air channels extend through the housing. The air channels are configured to direct an air stream through the housing. The plurality of panels are spaced apart based on predetermined air to desiccant channel rates that define an air channel width or spacing and a desiccant channel width or spacing. A desiccant inlet header is provided in flow communication with all the desiccant channels. A desiccant outlet is provided in flow communication with the desiccant channels. The desiccant channels are configured to channel desiccant from the desiccant inlet to the desiccant outlet in at least one of a counter-flow or cross-flow direction with respect to the direction of the air stream to facilitate heat and water vapor transfer between the desiccant in the desiccant channels and the air stream in the air channels. For a predetermined test condition of the passive RAMEE system, a predetermined equal mass flow rate of supply and exhaust air pass through each identical LAMEE. By so doing, the number of transfer units for heat transfer (NTU) in each LAMEE is predetermined (factor P2). When the pumping rate of liquid desiccant is chosen, the heat capacity rate ratio (i.e. the mass flow rate times the specific heat of desiccant liquid flow divided by the mass flow rate of air) through each LAMEE, Cr*, is predetermined (factor P3). There may be a trade-off for the selection of Cr* because increasing the liquid flow rate may enhance turbulence in the liquid flow channels and will increase Cr*, which can have positive and negative effects on the effectiveness. Accordingly, the value of Cr* should be selected so that the effectiveness of the LAMEE is a maximum when the highest performance is required.

Other embodiments for energy exchangers are provided. The exchanger includes a housing containing the air and liquid flow channels each separated by a semi-permeable membrane. A plurality of panels forming desiccant channels and air channels extend through the housing. The air channels are configured to direct an air stream through the housing. A desiccant inlet header is provided in flow communication with all the desiccant channels. A desiccant outlet is provided in flow communication with the desiccant channels. The desiccant channels are configured to channel desiccant from the desiccant inlet to the desiccant outlet in at least one of a counter-flow or cross-flow w direction with respect to the direction of the air stream. A desiccant membrane extends through each panel to facilitate heat and water vapor transfer between the desiccant liquid in the desiccant channels and the air stream in the air channels. The semi-permeable membrane possesses a resistance to water vapor diffusion which, relative to the typical convection water vapor transport resistance in the air channels, lies within a specified range given by factor P4.

The static air pressure drop as it passes from air inlet to outlet in each LAMEE in a RAMEE system is the same for each air channel. The range of acceptable air pressure drops for a LAMEE so that the passive RAMEE system will have a high RER value in the set Pf is presented using factor P5.

As discussed previously, inducing turbulence for otherwise laminar flows, for both the air-flow and liquid-flow channels, can enhance the heat and mass transfer coefficients more than the flow friction coefficients. Factor P6 defines the circumstance when there will be a net benefit for inducing turbulence in either the air or liquid channels.

In another embodiment for a passive RAMEE system, the exchanger includes a housing. A plurality of panels forming desiccant channels extend through the housing. Each of the plurality of panels has a semi-permeable membrane separating the air flow channels from the liquid flow channels. Air channels are formed between the desiccant liquid channels. The air channels are configured to direct an air stream through the housing. A desiccant inlet is provided in flow communication with the desiccant channels. A desiccant outlet is provided in flow communication with the desiccant channels. The desiccant channels are configured to channel desiccant from the desiccant inlet to the desiccant outlet so that the semi-permeable membranes facilitate heat and water vapor exchange between the liquid desiccant and the adjacent air streams in a LAMEE. During a standard test with two identical LAMEEs in a passive RAMEE test loop, heat will be transferred between the LAMEEs and their surroundings. The relative magnitude of the heat transfer between the surroundings and each LAMEE is designed to be a small fraction of the heat rate between the air flows passing through the LAMEEs (factor P12).

FIG. 1 illustrates a passive run-around membrane energy exchange (RAMEE) system 100 formed in accordance with an embodiment. The RAMEE system 100 is configured to partly or fully condition air supplied to a structure 101. The RAMEE system 100 includes an inlet 102 for a pre-conditioned air flow path 104. The pre-conditioned air flow path 104 may include outside air, air from a building adjacent to the enclosed structure 101, or air from a room within the enclosed structure 101. Airflow in the pre-conditioned air flow path 104 is moved through the pro-conditioned air flow path 104 by a fan 106. The illustrated embodiment includes one fan 106 located upstream of the LAMEE 108. Optionally, the pre-conditioned air flow path 104 may be moved by a down-stream fan and by multiple fans or a fan array or before and after each LAMEE in the system. The fan 106 directs the pre-conditioned air flow through path 104 to a supply liquid-to-air membrane energy exchanger (LAMEE) 108. The supply LAMEE 108 conditions the pre-conditioned air flow in path 104 to generate a change in air temperature and humidity (i.e. to pre-conditioned the air partly or fully) toward that which is required for a supply air flow condition to be discharged into the enclosed space 101. During a winter mode operation, the supply LAMEE 108 may condition the pre-conditioned air flow path 104 by adding heat and moisture to the pro-conditioned air in flow path 104. In a summer mode operation, the supply LAMEE 108 may condition the pre-conditioned air flow path 104 by removing heat and moisture from the pre-conditioned air in flow path 104. The pre-conditioned air 110 is channeled to a HVAC system 112 of the enclosed structure 101. The HVAC system 112 may further condition the pre-conditioned air 110 to generate the desired temperature and humidity for the supply air at 114 that is supplied to the enclosed structure 101.

Return air 116 is channeled out of the enclosed structure 101. A mass flow rate portion 118 of the return air 116 is returned to the HVAC system 112. Another mass flow rate portion 119 of the return air 116 is channeled to a return LAMEE 120. The portions 118 and 119 may be separated with a damper 121 or the like. For example, 80% of the return air 116 may be channeled to the HVAC system 112 and 20% of the return air 116 may be channeled to the return air regeneration LAMEE 120 in the RAMEE loop. The return air LAMEE 120 exchanges energy between the portion 118 of the return air 116 and the preconditioned air 110 in the supply air LAMEE 108. During a winter mode, the return air LAMEE 120 collects heat and moisture from the portion 118 of the return air 116. During a summer mode, the return air LAMEE 120 discharges heat and moisture into the regeneration air flow 119. The return air LAMEE 120 generates exhaust air 122. The exhaust air 122 is discharged from the structure through an outlet 124. A fan 126 is provided to move the exhaust air 122 from the return air LAMEE 120. The RAMEE system 100 may includes multiple fans 126 or one or more fan arrays located either up-stream or down-stream (as in FIG. 1) of the exhaust air LAMEE 120.

A desiccant fluid 127 flows between the supply air LAMEE 108 and the return air LAMEE 120. The desiccant fluid 127 transfers the heat and moisture between the supply air LAMEE 108 and the return air LAMEE 120. The RAMEE system 100 includes desiccant storage tanks 128 in fluid communication between the supply air LAMEE 108 and the return air LAMEE 120. The storage tanks 128 store the desiccant fluid 127 as it is channeled between the supply air LAMEE 108 and the return air LAMEE 120. Optionally, the RAMEE system 100 may not include both storage tanks 128 or may have more than two storage tanks. Pumps 130 are provided to move the desiccant fluid 127 from the storage tanks 128 to one of the supply LAMEE 108 or the return LAMEE 120. The illustrated embodiment includes two pumps 130. Optionally, the RAMEE system 100 may be configured with as few as one pump 130 or more than two pumps 130. The desiccant fluid 127 flows between the supply air LAMEE 108 and the return air LAMEE 120 to transfer heat and moisture between the conditioned air 110 and the portion 118 of the return air 116.

The embodiments described herein utilize a set of predetermined geometric design factors (G1-G10) and physical property and operating parameters (P1-P12) for the supply and exhaust air LAMEEs 108 and 120 and the RAMEE system 100 and maintain predetermined ranges for each parameter for LAMEEs 108 and 120 and for the RAMEE system 100, as illustrated in Table 1. As a set, the design and operating parameters enable the systems to meet selected performance factors. The set of predetermined geometric design and physical property and operating parameters is comprised of a subset of geometric design length ratios and a subset of physical property and operating parameters each comprised of physical property or operating condition ratios that may include some geometric lengths as well as other physical properties in some cases. The defined geometric design and physical ratios represent dimensionless ratios or factors that do not require specific length scales or property units except with respect to another defined length or parameter with the same units in the same ratio (i.e. each of them is dimensionless). The geometric design and physical parameters are discussed herein in connection with various embodiments.

The performance factors for a RAMEE system 100 employing supply and exhaust air counter-flow or cross-flow LAMEEs 108 and 120, in accordance with the embodiments, may be determined using ASHRAE Std. 84-2008 using a defined set of steady-state test conditions defined in AHRI Std.1060-2005. In one embodiment, a thermal insulation surrounding the panels is such that a heat exchange rate between the panels is less than 5% of a heat rate between supply and exhaust air flow streams during standard summer or winter testing with AHRI 1060 air inlet operating conditions. The operating conditions for the RAMEE system 100 during a test with balanced air flows and with the system at or very near steady-state will be determined by specifying: $Cr^*$, $NTU$, $NTU_m$ and the relative flow direction and geometry of each LAMEE (where each of the dimensionless terms have been defined previously or will be defined herein). The deduction of the effectiveness of performance of a single LAMEE 108 from the steady-state or quasi-steady-state RAMEE system 100 test data, which includes two similar LAMEEs, 108 and 120, may be deduced from steady-state energy and mass balance equations. That is, both the overall run-around system effectiveness, $E_0$, and the individual exchanger effectiveness, $E$, in the run-around loop depends on $Cr^*$, $NTU$ and $NTU_m$ at or near steady state so the relationship for $E$ can be readily determined once $E_0$ is measured. For the simple example of a run-around heat exchanger system with equal supply and exhaust air flow rates using two identical counter flow heat exchangers, it can be shown that $Cr=1.0$ at the maximum heat rate and system overall effectiveness, $E_0$, and the individual supply or exhaust exchanger effectiveness is given by:

$E=2E_0/(1+E_0)$ which will have a relative uncertainty of $U(E)/E=2U(E_0)/[E_0(1+E_0)^2]$ where both $E$ and $E_0$ are less than 1.0 for heat exchangers {e.g. when $E_0=\frac{2}{3}$ (or 67%) (calculated from the measured data) and $U(E_0)/E_0=0.05$ (also determined from data) then $E=0.80+/-0.04$ (or $80+/-4\%$)}

In one embodiment, the flow panel aspect ratio is defined by the height of the energy exchange area of each flow panel divided by the length of the same exchange area in the LAMEE. In another embodiment, the entrance length to total panel length ratio is defined for LAMEEs that are either primarily counter-flow or cross-flow exchangers. In another embodiment, the ratio of the flow channel standard deviation of average panel channel hydraulic diameters (widths) for each fluid with respect to average flow hydraulic diameter (width) for each fluid for the LAMEE is limited to reduce mal-distribution of fluid flows among the channels. In another embodiment, the ratio of the stream-tube standard deviation in hydraulic diameter to mean stream-tube hydraulic diameter is limited to reduce flow mal-distributions within a typical flow channel. The liquid desiccant to air capacity rate ratio also implies a particular mass flow rate ratio. Therefore, for a predetermined volume or mass flow rate of air flowing through the air channels of a LAMEE and a particular volume or mass flow rate of liquid desiccant may be required to flow through the adjacent liquid desiccant channels.

In another embodiment, turbulent flow conditions are induced in the air and liquid flow channels of the LAMEE by selecting a distribution and geometric shape for the air and liquid flow channel spacers in the LAMEE. The turbulence can be used to enhance the heat and mass transfer convection coefficients in the air flow channels which can be used to increase the effectiveness and/or decrease the LAMEE size. In other embodiments for the liquid flow channels, turbulence in the liquid flow channels is facilitated to enhance the bulk mean flow distribution (and eliminate laminar flow fingering and mal-distributions) and increase the convective heat and moisture transfer coefficients (i.e. decrease mal-distributions in the liquid flows) because the physical effect increases the effectiveness of a given LAMEE and its RAMEE system and can be used to decrease the physical size of each LAMEE.

In another embodiment, the elastic tensile limit for the semi-permeable membrane is selected to partly limit the deflection of the semi-permeable membrane with respect to its structural support screen in the LAMEE.

In another embodiment, the membrane and membrane frame liquid flow penetration resistance ranges are selected to eliminate any flow of the liquid desiccant through the semi-permeable membrane and its edge seal frame for each panel pair of channels in the LAMEE.

In another embodiment, the air mass flow ratio of the two air streams inlet to the two identical LAMEEs in the RAMEE system is selected to meet a predetermined exposure of the air stream to the semi-permeable membranes.

In another embodiment, the air pressure drop ratio for a selected mass flow rate of air is selected to ensure a high RER performance factor for a RAMEE system.

In another embodiment, the salt solution concentration ranges are used to limit the time fraction when there may be a risk of crystallization for a climatic region for particular application and reduce the life-cycle costs for an application.

In another embodiment, the heat exchange with the surroundings is by using appropriate energy exchange cavity insulation reduced to a small fraction of the heat rate for the RAMEE system under a standard test.

Figure 2:
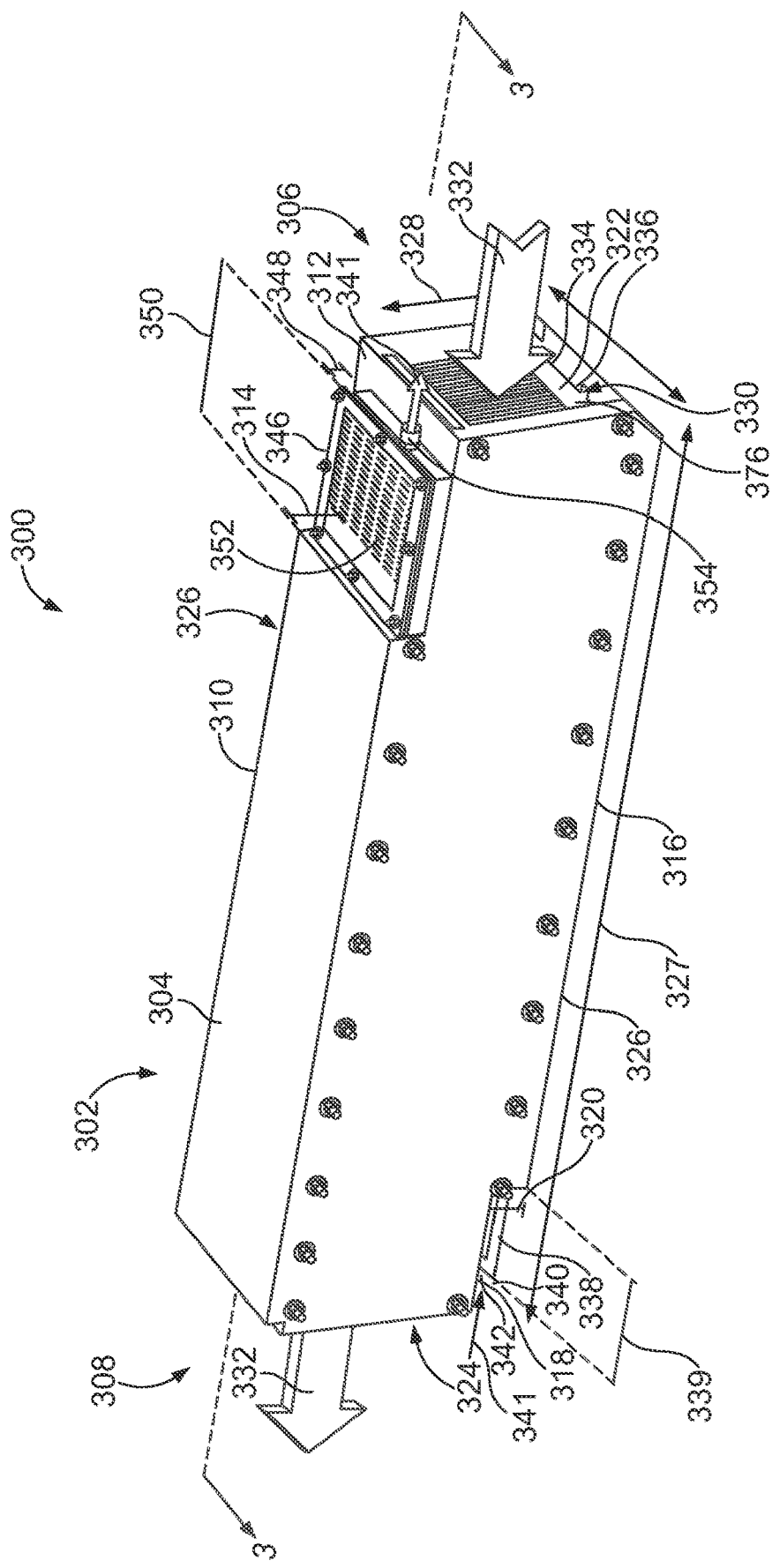
FIG. 2 is a side perspective view of a liquid-to-air membrane energy exchanger formed in accordance with an embodiment.

FIG. 2 illustrates a LAMEE 300 formed in accordance with an embodiment. The LAMEE 300 may be used as the supply air LAMEE 108 and/or the return or exhaust air LAMEE 120 (shown in FIG. 1). The LAMEE 300 includes a housing 302 having a body 304. The body 304 includes an air inlet end 306 and an air outlet end 308. A top 310 extends between the air inlet end 306 and the air outlet end 308. A stepped-down top 312 is positioned at the air inlet end 306. The stepped-down top 312 is stepped a distance 314 from the top 310. A bottom 316 extends between the air inlet end 306 and the air outlet end 308. A stepped-up bottom 318 is positioned at the air outlet end 308. The stepped-up bottom 318 is stepped a distance 320 from the bottom 316. In alternative designs the stepped-up 318 or stepped-down 312 sections may have different sizes of steps or no step at all.

An air inlet 322 is positioned at the air inlet end 306. An air outlet 324 is positioned at the air outlet end 308. Sides 326 extend between the air inlet 322 and the air outlet 324. Each panel in the LAMEE 300 has a semi-permeable membrane length 364, as shown in FIG. 3a. Also shown in FIG. 3a, each panel in the LAMEE 300 has a semi-permeable membrane height 362 defining an energy exchange area extends a height (H) between a top and a bottom defined by the top and bottom of the semi-permeable membrane. The energy exchange area extends a length (L) between a front and a back that is defined by the front and the back of the semi-permeable membrane. An exchanger aspect ratio (AR) is defined by a height (H) 362 of each semi-permeable membrane energy exchange area divided by a length (L) 364 of the energy exchange area. The exchanger aspect ratio (AR) represents the physical design factor G2 (shown in Table 1) and is at least one factor for partly achieving a predetermined performance of the LAMEE 300. The aspect ratio (AR) is a dimensionless ratio. The aspect ratio (AR) is determined using the equation AR=H/L. In an exemplary embodiment for a counter/cross flow LAMEE, factor G2, the aspect ratio (AR), is within a range of 0.1<AR<3.0. In one embodiment, the exchanger aspect ration is within a range of 0.5 to 2. The exchanger aspect ratio is selected to provide at least one of a predetermined membrane area, a predetermined length, or a predetermined duration of exposure of the air stream to the desiccant.

An energy exchange cavity 330 extends through the housing of the LAMEE. The energy exchange cavity 330 extends from the air inlet end 306 to the air outlet end 308. An air stream 332 is received in the air inlet 322 and flows through the energy exchange cavity 330. The air stream 332 is discharged from the energy exchange cavity 330 at the air outlet 324. The energy exchange cavity 330 includes a plurality of panels 334. Each liquid flow panel forms a liquid desiccant channel 376 that is confined by the semi-permeable membranes 378 on either side and is configured to carry desiccant 341 therethrough. The semi-permeable membranes 378 are arranged in parallel to form air channels 336 with an average flow channel width ($d_{w,air}$) of 337 and liquid desiccant channels 376 with an average flow channel width ($d_{w,liq}$) of 377. In one embodiment, the semi-permeable membranes 378 are spaced to form uniform air channels 336 and liquid desiccant channels 376 with $d_{w,air}$ and $d_{w,liq}$ implied by what is practical to reduce statistical variations for each as illustrated in factor G4 of Table 1. The air stream 332 travels through the air channels 336 between the semi-permeable membranes 378. The desiccant 341 in each desiccant channel 376 exchanges heat and moisture with the air stream 332 in the air channels 336 through the semi-permeable membranes 378.

A desiccant inlet reservoir 338 is positioned on the stepped-up bottom 318. The desiccant inlet reservoir 338 may have a height 340 equal to the distance 320 between the bottom 316 and the stepped-up bottom 318. Alternatively, the liquid desiccant inlet reservoir 338 may have any height 340 that meets a predetermined performance of the LAMEE 300. The desiccant inlet reservoir 338 extends a length 339 of the LAMEE body 304. The desiccant inlet reservoir 338 extends a length 339 that is configured to meet a predetermined performance of the LAMEE 300. In one embodiment the desiccant inlet reservoir 338 extends no more than one fourth of the length 327 of the LAMEE body 304. Alternatively, the desiccant inlet reservoir 338 may extend along one fifth of the length 327 of the LAMEE body 304.

The liquid desiccant inlet reservoir 338 is configured to receive desiccant 341 from a storage tank 128 (shown in FIG. 1). The desiccant inlet reservoir 338 includes an inlet 342 in flow communication with the storage tank 128. The desiccant 341 is received through the inlet 342. The desiccant inlet reservoir 338 includes an outlet 344 that is in fluid communication with the desiccant channels 376 in the energy exchange cavity 330. The liquid desiccant 341 flows through the outlet 344 into the desiccant channels 376. The desiccant 341 flows along the panels 334 through desiccant channel 376 to a desiccant outlet reservoir 346.

The desiccant outlet reservoir 346 is positioned on the stepped-down top 312 of the LAMEE housing 302. Alternatively, the desiccant outlet reservoir 346 may be positioned at any location along the top 312 of the LAMEE housing 302 or alternatively on the side of the reservoir with a flow path connected to all the panels. The desiccant outlet reservoir 346 has a height 348 that may be equal to the distance 314 between the top 310 and the stepped-down top 312. The desiccant outlet reservoir 346 extends along the top 312 of the LAMEE housing 302 for a length 350. In one embodiment of a counter/cross flow exchanger, the desiccant outlet reservoir 346 extends a length 350 that is no more than one fourth the length 327 of the flow panel exchange area length 302. In another embodiment of a counter/cross flow LAMEE the desiccant outlet reservoir 346 extends a length 350 that is one fifth the length 327 of the panel exchange area length 302 (i.e. factor G3).

The desiccant outlet reservoir 346 is configured to receive desiccant 341 from the desiccant channels 376 in the energy exchange cavity 330. The desiccant outlet reservoir 346 includes an inlet 352 in flow communication with the desiccant channels 376. The desiccant 341 is received from the desiccant channels 376 through the inlet 352. The desiccant outlet reservoir 346 includes an outlet 354 that is in fluid communication with a storage tank 128. The desiccant 341 flows through the outlet 354 to the storage tank 128 where the desiccant 341 is stored for use in another LAMEE 300. In an alternative embodiment, the desiccant outlet reservoir 346 may be positioned along the bottom 318 of the LAMEE housing 302 and the desiccant inlet reservoir 338 may be positioned along the top 310 of the LAMEE housing 302.

In the illustrated embodiment, the LAMEE 300 includes one liquid desiccant outlet reservoir 346 and one liquid desiccant inlet reservoir 338. Alternatively, the LAMEE 300 may include liquid desiccant outlet reservoirs 346 and liquid desiccant inlet reservoirs 338 on the top and bottom of each of each end of a LAMEE 300. A liquid flow controller may direct the liquid flow to either the top or bottom depending on the value of Ra for factor P1 in the independent factor set If in Table 1.

During testing of the RAMEE system 100 using ASHRAE Std. 84-2008 and the steady-state test conditions defined in AHRI Std.1060-2005, wherein the RAMEE system 100 has balanced air flows and is at or very near steady-state, an exchanger thermal capacity ratio $Cr^*$ (operational independent factor P3 as illustrated in Table 1) is defined. $Cr^*$ is a dimensionless ratio representing the mass flow rate of the liquid desiccant times the heat capacity of the liquid desiccant divided by the mass flow rate of the air times the heat capacity of the air. $Cr^*$ is measured by measuring the flow rates of the air and liquid desiccant and using known heat capacities of the liquid desiccant and the air. In one embodiment, $Cr^*$ falls within a range during RAMEE testing that is between $1.0<Cr^*<10.0$. In one example for a un-around heat exchanger system having equal supply and exhaust air flow rates and using two identical counter flow heat exchangers, $Cr^*$ may equal 1.0 at a maximum heat rate and overall effectiveness, $E_0$.

During RAMEE testing, the exchanger number of transfer units (NTU) for heat transfer (operational independent factor P2 as illustrated in Table 1) may also be defined. In general, the effectiveness of a heat exchanger increases directly with the value of NTU. A heat capacity rate for the air stream 332 and the desiccant 341 is used to determine the maximum feasible heat transfer between the air stream 332 and the desiccant 341. The effectiveness of the RAMEE system for heat transfer between the supply air flow and the exhaust air flow is determined by measuring the two mass flow rates of air and the temperature increase of the air flowing through the supply air exchanger and the temperature difference between the inlet air to the supply and exhaust air exchangers. In one embodiment, NTU is within a range $1<NTU<15$. Having an NTU within this range may provide a predetermined performance of the RAMEE system. In one embodiment, the range of NTU may function concurrently with other performance factors defined herein to achieve the predetermined performance of the LAMEE 300 and the RAMEE system 100.

During RAMEE 100 testing, an air flow pressure drop ratio (operational design factor P4 as illustrated in Table 1) may also be defined for the LAMEEs 300. The air flow pressure drop ratio is calculated using the ratio $p_h A_c/V_c$, wherein $p_h$ is the air flow pressure head drop across the LAMEE 300, $A_c$ is the energy exchange area of one air flow channel in LAMEE 300, and $V_c$ is the volume of each air channel. The air flow pressure drop ratio is used to define a pressure drop in the air stream 332 between the air inlet 322 and the air outlet 324 of the LAMEE 300. In one embodiment, the air flow pressure drop ratio is with a range of $10^3$ to $10^4$ to achieve a predetermined RER performance factor for the RAMEE system 100.

FIG. 3a illustrates the LAMEE 300 having a cutout along the line 3-3 shown in FIG. 2. The top 310 and the bottom 318 of the LAMEE housing 302 include insulation 360 joined thereto. The sides 326 of the LAMEE housing 302 also include insulation 360. Except for the air inlet and outlet areas, the insulation 360 extends around the energy exchange cavity 330. The insulation 360 limits an amount of heat that may be exchanged between the air and liquid desiccant flowing through the energy exchange cavity and the surroundings as the air and liquid desiccant flow through the channels in the energy exchange cavity compared to the heat rate for the air for the supply and exhaust air flows (i.e. factor P12). The insulation 360 may include foam insulation, fiber insulation, gel insulation, or the like. The insulation 360 is selected to at least partially meet a predetermined performance of the LAMEE 300.

The energy exchange cavity 330 has a height 362, a length 364, and a width 366. The height 362 is defined between the top and bottom of the energy exchange cavity 330. The width 366 is defined between the insulation side walls of the energy exchange cavity 330. The length 364 is defined between the air inlet 322 and the air outlet 324 of the energy exchange cavity 330. Each energy exchange panel 334 extends the height 362 and length 364 of the energy exchange cavity 330. The panels 334 are spaced along the width 366 of the energy exchange cavity 330.

For the counter/cross flow LAMEE, the liquid desiccant flow inlet 334 of the desiccant inlet reservoir 338 is in flow communication with the energy exchange cavity 330 at the air outlet end 308 of the LAMEE 300. The liquid desiccant outlet 352 of the desiccant outlet reservoir 346 is in flow communication with the energy exchange cavity 330 at the air inlet end 306 of the LAMEE 300. The desiccant inlet reservoir 338 and the desiccant outlet reservoir 346 are in fluid communication with the liquid channel 376. The panels 334 define a non-linear liquid desiccant flow path 368 between the desiccant inlet reservoir 338 and the desiccant outlet reservoir 346. The flow path 368 illustrates one embodiment of a counter/cross flow path with respect to the direction of the air stream 332. In one embodiment, a desiccant flow direction through the desiccant channels 376 is controlled so that lower density desiccant flows separately from higher density desiccant.

Figure 3B:
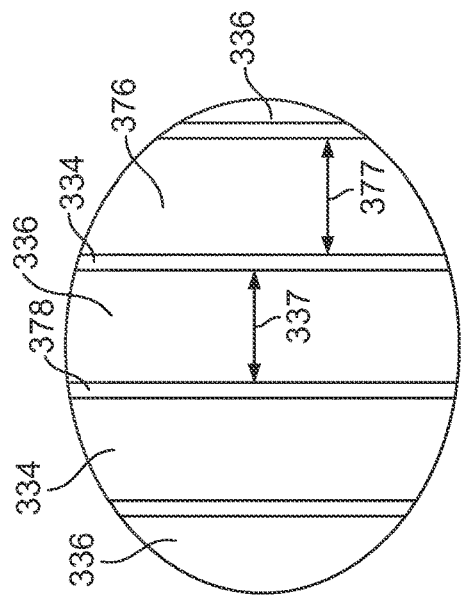
Figure 3A:
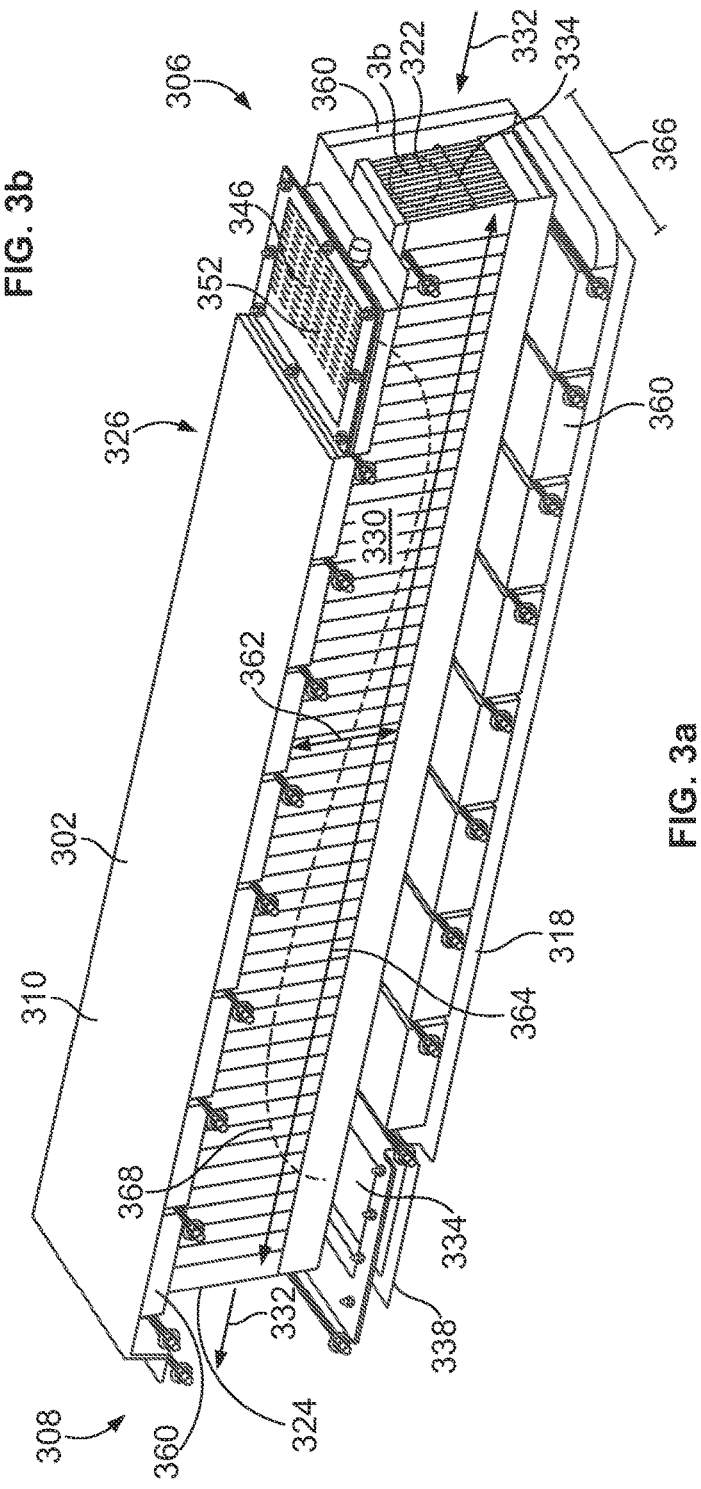
FIG. 3a is a side perspective view of the liquid-to-air membrane energy exchanger shown in FIG. 2 having a cutout along the line 3-3 shown in FIG. 2

FIG. 3b illustrates a front view of the panels 334. The panels 334 are spaced to form air channels 336 and the liquid desiccant channels 376 there-between separated by semipermeable membranes 378. The air channels 336 alternate with the liquid desiccant channels 376. Except for the two side panels of the energy exchange cavity, each air channel 336 is positioned between adjacent liquid desiccant channels 376. The liquid desiccant channels 376 are positioned between adjacent air channels 336. The air channels 336 have an average channel width 337 defined between adjacent panels 334. The liquid desiccant channels 376 have an average channel width 377 defined between adjacent panels 334. The width 337 of the air channels 336 and the width 377 of the liquid desiccant channels 376 are nearly constant over the area of each panel and for the set of panels in the LAMEE energy exchange cavity with the exception of independent geometric design factors G4 and G5 as illustrated in Table 1. In one embodiment, the standard deviation of the average channel hydraulic diameter (directly related to the width 337 of the air channels 336 or average channel width 377 of the liquid desiccant channels 376) divided by the corresponding mean average channel hydraulic diameter for each fluid is an independent geometric design factor (physical design factor G4 as illustrated in Table 1) restricted for each type of fluid channel to at least partly achieve the predetermined set of performance factors Pf of the RAMEE system with its LAMEEs 300. In another embodiment, the statistical variations in the stream-tube hydraulic diameters will be such that the standard deviation of the flow tubes hydraulic diameters for a typical type of fluid channel in a LAMEE divided by the mean stream-tube hydraulic diameter for the typical flow channel of a fluid will be restricted as specified by factor G5 in Table 1.

Figure 4:
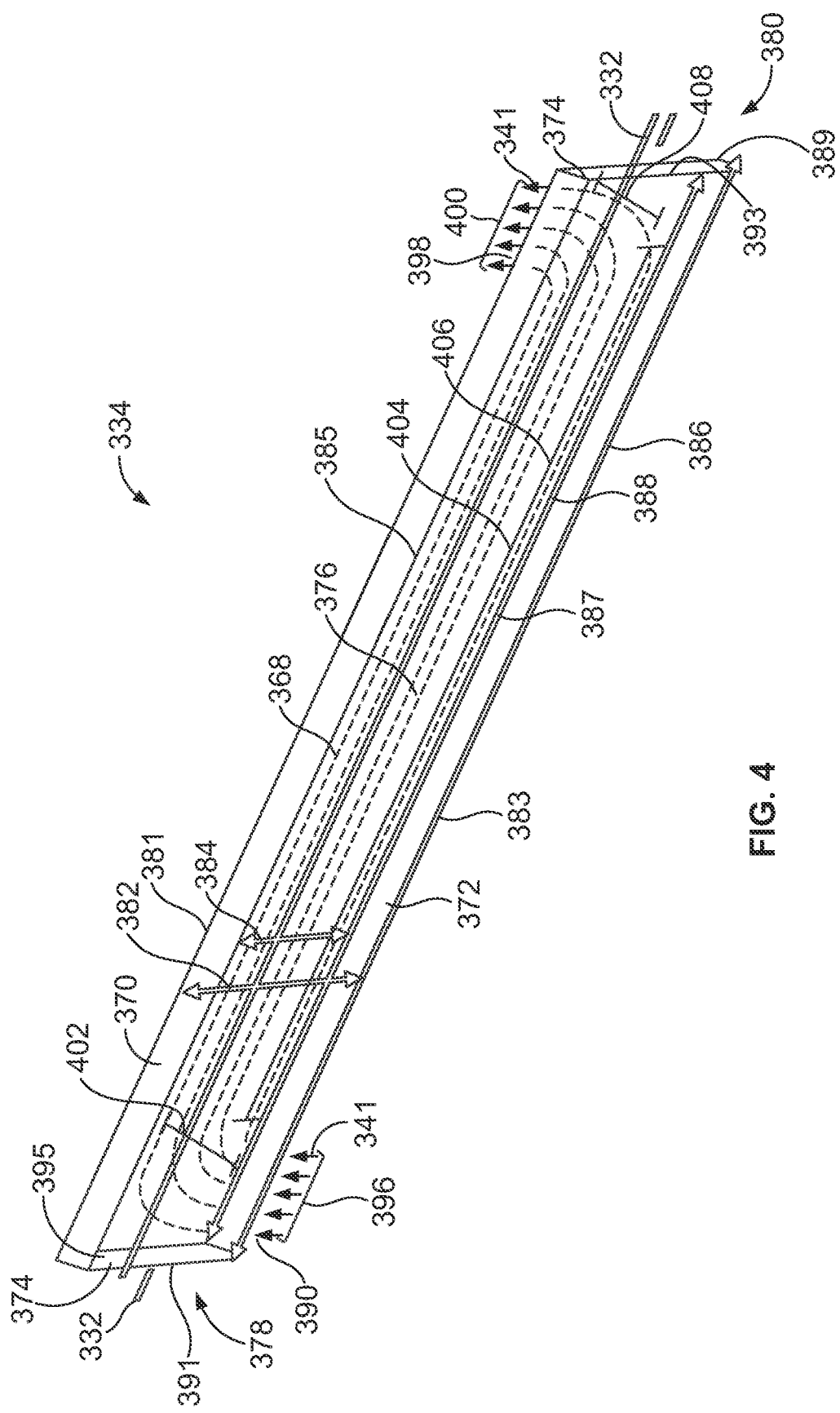
FIG. 4 is a side perspective view of a liquid-to-air membrane energy exchanger panel formed in accordance with an embodiment.

FIG. 4 illustrates a panel 334 to contain the desiccant liquid flow for one channel formed in accordance with an embodiment. The panel 334 includes support structures including a top support 370, a bottom support 372 that is opposite the top support 370, and a pair of opposite side supports 374 extending between the top support 370 and the bottom support 372. The supports 370, 372, and 374 retain the membranes 392 and a liquid desiccant inlet diffuser 396 and outlet diffuser 400. The panel 334 includes a top 381 and a bottom 383. The panel 334 has an overall height 382 defined between the top 381 and the bottom 383. The energy exchange membrane 392 includes a top 385 and a bottom 387. The membrane 392 has an overall height 384 defined between the top 385 and the bottom 387. The height 384 of the membrane 392 is less than the height 382 of the panel 334. The panel 334 has a front end 389 and a back end 391. The panel 334 has an overall length 386 defined between the front end 389 and the back end 391. The membrane 392 includes a front end 393 and a back end 395 corresponding to the air inlet and outlet for the adjacent air flow channels respectively. The membrane 392 has an overall length 388 defined between the front end 393 and the back end 395. The length 388 of the membrane 392 is less than the length 386 of the panel 334. Ratios of the heights 382 and 384 to the lengths 386 and 388, respectively, may be configured based at least partly on a predetermined performance of the LAMEE 300. In one embodiment for a counter/cross-flow panel, the height 384 of the membrane 392 is within a range of 0.1 to 3.0 times the length 388 of the membrane 392 (i.e. factor G2).

The panel 334 has a desiccant inlet end 378 and a desiccant outlet end 380. A desiccant flow path 368 shows a typical bulk mean streamline for flow from the liquid desiccant inlet 396 to the desiccant outlet 400 in a non-linear flow path that is primarily opposite to the direction of the air stream 332. The desiccant inlet end 378 includes an inlet 390 that extends through the bottom support 372 and between adjacent panels 334. The inlet 390 has a length 396. A ratio of the length 396 of the inlet 390 to the length 388 of the panel 334 is selected based on a predetermined performance of the LAMEE. The desiccant outlet end 380 includes an outlet 398 that extends through the top support 370 and between adjacent panels 334. The outlet 398 has a length 400 which is equal to the inlet length 396. A ratio of the length 400 of the outlet 398 to the length 388 of the panel 334 is selected based at least partly on a predetermined performance of the LAMEE 300. The desiccant flow path 368 flows from the inlet 390 to the outlet 398.

The liquid desiccant flow path-line 368 is the same as one possible bulk-mean streamline which is necessarily curved, especially near the liquid ingest and egress regions of the channel, through a counter/cross-flow panel of a LAMEE. The curved streamline is contrasted with the essentially straight bulk-mean air streamline 332 in the air channels 336. The bulk-mean liquid desiccant flow path direction or velocity is mostly upstream of that for the adjacent channel bulk-mean air stream 332. An inlet flow ingest region cross segment 402 of the liquid desiccant bulk-mean streamline 368 is formed as the desiccant enters the desiccant channel 376 from the inlet 390. Liquid desiccant 341 flowing from the inlet 390 into the desiccant channel 376 flows upward through the inlet cross segment 402. Liquid desiccant 341 in the inlet cross segment 402 flows partly in a cross flow direction to that for the adjacent air flow channel streamline 332.

Since the liquid desiccant 341 is channeled from the inlet 390, the desiccant 341 fills the channel 376 and flows through a primarily an air/liquid counter flow segment 404 of the liquid desiccant bulk-mean streamline 368. The liquid/air counter flow segment 404 extends approximately a length 406 through the liquid desiccant flow channel 376. The length 406 is based partly on a predetermined performance of the LAMEE 300. The liquid/air counter flow segment 404 is essentially parallel to direction of the air stream 332 in the air channels 336. The liquid/air counter flow segment 404 has the liquid flow opposite to the direction of the adjacent air flow 332. The counter flow arrangement at least partly provides a predetermined heat and moisture exchange effectiveness between the liquid desiccant 341 in the desiccant channel 376 and the air stream 332 in the air channels 336.

The liquid desiccant 341 in the counter segment 404 flows into a counter/cross-flow liquid flow egress region 408 of the liquid desiccant flow path 368. The liquid desiccant 341 in the outlet counter/cross flow region segment 408 flows with curved bulk mean streamlines from the counter segment 404 to the outlet 398. The liquid desiccant 341 in the outlet counter/cross flow region 408 flows at least partly in a cross flow direction that is perpendicular to the direction of the air stream 332 in the air channels 336.

The counter/cross-flow arrangement of the liquid desiccant bulk-mean streamline flow path 368 provides a liquid desiccant nearly counter flow with respect to the air stream 332. The counter flow arrangement improves the effectiveness of the LAMEE 300 compared to a unit with equal mass flow rates, inlet properties and exchanger energy exchange area. The counter/cross flow arrangement does not require large headers that increase the space required for the LAMEE 300. The illustrated embodiment shows the desiccant flow path 368 flowing upward from the inlet 390 to the outlet 398. Optionally, the inlet 390 may be positioned at the top support 370, but at the same end of the panel 334 and the outlet 398 may be positioned at the bottom support 372 but at the same end of the panel 334. In such an embodiment, the desiccant flow path 368 may flow downward from the inlet 390 to the outlet 398. The flow direction option facilitates avoiding liquid channel flow mal-distributions caused by buoyancy induced instability in one of the two LAMEEs under typical summer and winter operating for a RAMEE system.

Figure 5A:
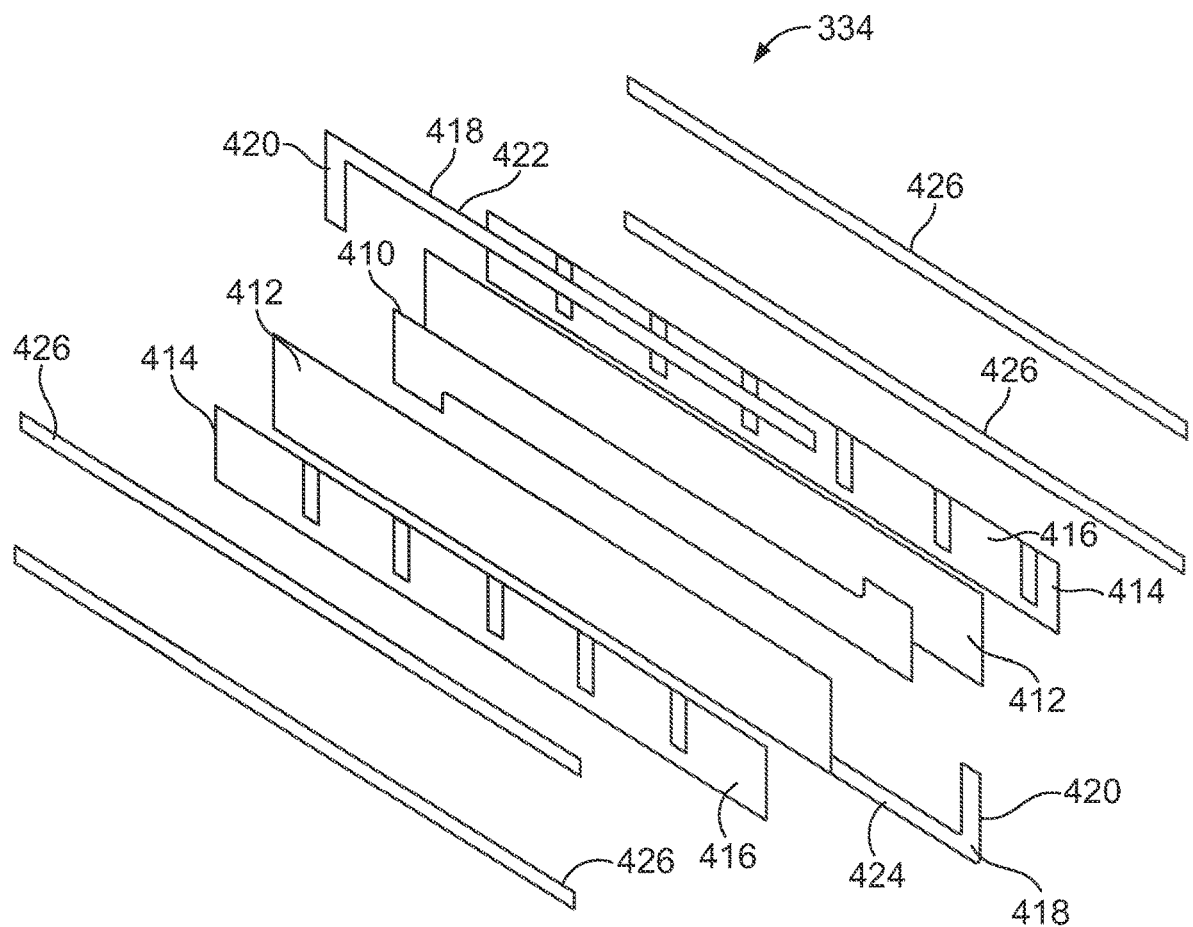
FIG. 5a is an exploded view of the panel shown in FIG. 4.

FIG. 5a is an exploded view of the liquid desiccant flow panel 334. The panel 334 includes a liquid-desiccant flow guide and turbulence-enhancement screen diffuser 410 and a pair of semi-permeable membranes 412. The liquid-desiccant screen diffuser 410 is retained between the semi-permeable membranes 412. The semi-permeable membranes 412 are bonded (by heat sealing or glue) to the membrane support structural elements 418 and 424. The membrane support screens 414 in the adjacent air flow channels 336 may also include air flow channel spacers. An air channel support screen may include a solid area that is a fraction of a total area of the air channel support screen. Additionally, a desiccant channel support screen may have a solid area that is a fraction of a total area of the desiccant channel support screen. In one embodiment, a distance between air channel support screens in the flow direction of the air stream divided by a distance between air channel support screens normal to the flow direction of the air steam is within a range of 0.01 to 5.0. The air flow channels 336 are formed between adjacent liquid-desiccant flow panels 334. The desiccant 341 is configured to have a bulk-mean flow parallel to the semi-permeable membranes 412. The semi-permeable membranes 412 allow heat and moisture exchange between the flowing liquid-desiccant 341 in the desiccant channels 376 and the flowing air stream 332 in the air channels 336. The membrane 412 is semi-permeable and formed with a high density of micron-sized pores that allow water vapor to diffuse through the membrane 412 between the liquid desiccant 341 and the air stream 332. The pores have a size that, due to air-liquid suffice tension forces, prevents the liquid desiccant 341 from flowing through the pores of the membrane 412. The semi-permeable membrane material may be selected in part based on a required performance of the LAMEE 300.

Figure 5B:
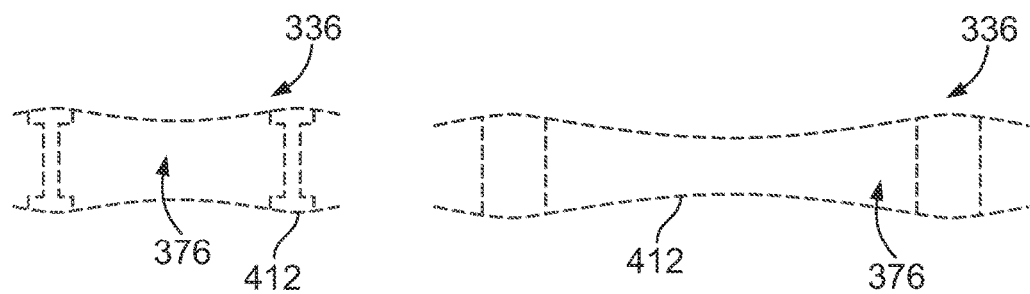
FIG. 5b is a plan view of a screen and mounted or bonded flexible space flow guides for desiccant liquid flow channels formed in accordance with an embodiment.

FIG. 5b is a more detailed view of the air flow channels comprising two membranes, two structural support screens and many air flow channel structural spacers. In an alternative design the spacers may be porous rigid tubes. The parameters for structurally supporting the flexible membranes for the air channel are specified by factor G7.

The membrane material may be selected, in part, based on a water vapor resistance diffusion ($R_{m,wv}$) divided by a convective water vapor transfer resistance into the adjacent air flow channels ($R_{air,wv}$) (independent operational design factor P4 as illustrated in Table 1). The water vapor resistance ($R_{m,wv}$) is defined as the membrane's resistance to water vapor diffusing through the membrane 412 between the air channel 336 and the liquid channel 376. The convective water vapor transfer resistance ($R_{air,wv}$) is defined as the membrane's ability to resist water vapor transfer between the bulk-mean flow of air in channels 336 and the liquid channels 376 through the semi-permeable membrane 412. The ratio of the water vapor diffusion resistance ($R_{m,wv}$) of the semi-permeable membrane 412 to the convective water vapor transfer resistance ($R_{air,wv}$) of the membrane 412 may have a range of $0.1<(R_{m,wv})/(R_{air,wv})<3.0$ in factor P4. In one embodiment, the ratio is selected to be as small as practical.

The semi-permeable membrane 412 may also be partly selected based on a liquid break through pressure of the membrane 412 (operational design factor P7 as illustrated in Table 1). The liquid break through pressure is defined by a standard test as a liquid pressure within the LAMEE 300 that is required for liquid desiccant 341 to flow through the semi-permeable membrane 412. In one embodiment, factor P8, the membrane liquid break through pressure ($p_{m,bt}$), is selected to satisfy the inequality $(p_{m,bt})/(rho*g*H)>20$, where rho is the density of the liquid desiccant solution, g is the acceleration of gravity and H is the height of the semi-permeable membrane in the energy exchange area of the surface for each channel. A liquid break through pressure ratio is defined by $p_{m,bt}/(rho*g*H)$, wherein $p_{m,bt}$ is the membrane liquid break-through pressure, g is gravity, and H is the height of the membrane panel energy exchange area. In one embodiment, the membrane liquid break through pressure may be greater than 20.

A channel edge seal liquid break-through pressure ($p_{es,bt}$) (operational design factor P8 as illustrated in Table 1) defines a pressure within the LAMEE 300 that is required for the desiccant 341 to flow through the edge seal of the membrane 412. The channel edge seal liquid break-through pressure ($p_{es,bt}$) is selected to satisfy the inequality $p_{es,bt}/(rho*g*H)>20$. When the operating pressure of the liquid flow channels is less than $p_{m,bt}$ or $p_{es,bt}$ no liquid leeks will occur through the membrane 412 or the edge seals. In one embodiment, the edge seal liquid break through pressure may be greater than 20.

The membrane material may also be at least partly selected based on an elastic tensile yield limit ($T_{m,yl}$) (operational design factor P9 as illustrated in Table 1). The elastic tensile yield limit ($T_{m,yl}$) defines the membrane's elastic deformation limits when subjected to liquid pressure from the desiccant 341 flowing through the desiccant channel 376. In one embodiment, factor P9, the elastic tensile yield limit ($T_{m,yl}$) for the membrane 412, will lie in the range of $0.02<(T_{m,yl})/(p_{l,op}0*s_{ws})<1.5$, where $p_{l,op}$ is a typical operating pressure for the liquid in each LAMEE and $s_{ws}$ is a wire spacing distance for the air-side screen 416 used to resist the liquid pressure for each desiccant channel 376. The operating pressure of the LAMEE is confined to a value that will not exceed the elastic deformation limits for the membrane 412 for each desiccant channel 376. An elastic tensile yield limit ratio for the membrane is defined by $T_{m,yl}/(p_{l,op}*s_{ws})$, wherein $T_{m,yl}$ is the tensile yield limit for the membrane, $p_{l,op}$ is a typical operating pressure for the liquid in each LAMEE, and $s_{ws}$ is a wire spacing distance for a screen used to resist the liquid pressure for each liquid flow channel Membrane air-side screen support stuctures 414 are positioned adjacent to the membranes 412. Each membrane 412 is positioned between an air-side membrane support structure 414 and the desiccant flow channel liquid-flow-guide screen diffuser 410. The membrane support structures 414 retain the membranes 412 to limit the elastic deflections of the membranes 412. Deflection of the membranes 412 will occur due to liquid static pressure that is higher than that for the adjacent air channels 332. The liquid desiccant will create pressure on the membranes 412 that causes the membranes 412 to bow and/or elastically deform. The mass flow mal-distribution on the adjacent liquid and air sides is tightly controlled for the design and quality control of the manufacturing process and operation of the RAMEE system and its LAMEEs.

In an example embodiment, the membrane air-side support structures 414 are formed from a screen material. Optionally, the membrane support structures 414 may be formed from a permeable backing, plastic support structures, rods, metal screens, spacers and/or the like. The membrane support structures 414 include openings 416 therethrough that allow the transfer of heat and moisture between the liquid desiccant and the air stream 332.

The liquid-side structural spacers 418 and 424 are positioned around the liquid-desiccant flow guide screen 410. The spacers separate the two membranes 412 that are bonded onto each side of the spacers 418 and 424. The membranes 412 are coupled to the diffuser spacers 418 to form a gap or liquid-flow channel between each membrane 412. Ends 424 and 420 form the air-flow entrance and exit supports of the liquid flow panel 334. A top 422 of one liquid-flow channel spacer 418 forms a portion of the top support 370 of the liquid-flow panel 334. A bottom 424 of the other liquid-flow channel spacer 418 forms a portion of the bottom support 372 of the liquid-flow panel 334. The top support 370 and the bottom support 372 are also formed by air channel spacers 426. The air channel spacers 426 are configured to abut the air channel spacers 426 of an adjacent panel 334. The air channel spacers 426 form an air-flow gap between adjacent liquid-flow panels 334. The air-flow gaps between adjacent liquid-flow panels 334 form the air channels 336 within the energy exchange cavity.

FIG. 6a illustrates an air channel 336 formed between adjacent membranes for liquid-flow panels 334. The air channel 336 is configured to carry the air stream 332 therethrough. The air channel 336 is designed to have a uniform width 430 along a length 432 of the air channel 336. However, due to elastic deformations of the membrane support structures 414 of the panel 334, there may be significant variations in the air channel width. The air-side membrane support structures 414 limits the amount of membrane deflection restricting the air flow channel width that is caused by the difference in static pressure in the liquid channel 334 and air channel 332. For example, the membrane support structures 414 limit the amount of deflection over small fraction, but a finite region, of each membrane. With respect to factor G4, the air and liquid flow channel statistical variations for typical individual flow tube hydraulic diameter variations may limited. With respect to factor G3, the average channel widths statistical variations for each fluid, among all the channels in the LAMEE, may be limited.

FIG. 6b illustrates an air-flow channel 336 that has been deformed by liquid air static pressure difference between adjacent liquid-flow and air-flow channels for a small finite region of the air-flow panel 334. Statistical variations in the deflections in the membrane air-flow and liquid flow channels can be deduced using mass or volume of liquid in the LAMEE under typical liquid pressures measurements, carefully developed pressure drop measurements across flow channels for each fluid and optical laser beam measurements for the minimum air-flow channel widths. The measurements can then be used along with other data for the determinations of the air and liquid channel average and standard deviations of flow hydraulic diameters for each fluid, which may be specified separately for the typical channel (factor G4) and the set of channels in each LAMEE (factor G3). The design and manufacturing quality control and operation of a LAMEE may depend in part on knowing the data.

Figure 7:
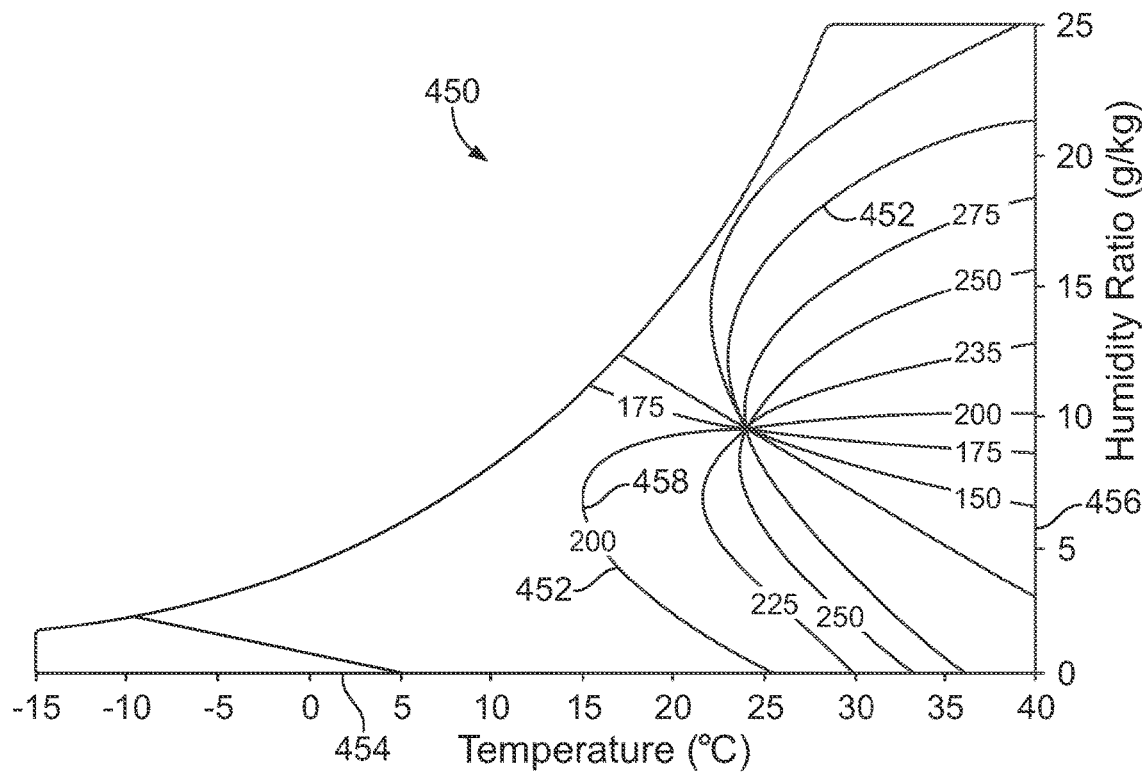
FIG. 7 is a graph of mass flow rates as a ratio of the mass flow rate of a desiccant with respect to a mass flow rate of air.

FIG. 7 is a graph 450 showing simulation results for optimum thermal capacity rate ratio as a parameter on a chart of air humidity ratio versus air temperature for a passive RAMEE system, at steady-state operating conditions with the assumed indoor air at a wide range of outdoor air conditions. The graph 450 presents the optimum value of the thermal capacity rate ratio lines 452 that should be selected for maximum energy transfer effectiveness of the passive RAMEE system with two identical LAMEE units subject to the assumed constraints with each and every air channel with a uniform width of 4.4 mm (with no internal support structure) and liquid-desiccant channel with a uniform width of 2.7 mm (also with no internal structure), a membrane water vapor permeability of 1.66E-6 kg/(m*s), and with fully developed laminar air and liquid flow in each channel. For different operating conditions and geometric ratios graph 450 would have different values for the optimum value of Cr*, as described below.

The results for the optimum thermal capacity rate ratio with the assumed constant widths of the air and liquid-desiccant channels and fully developed laminar flow for each fluid is exemplary of one theoretical case only that differs significantly from what is physically possible. Although variable channel widths and turbulent channel flows are likely to occur, presenting similar results for these cases would be much more complex; but, it can be done using the same computational procedures. In such cases, the optimum thermal capacity rate ratios will be very different than those presented in graph 450 for the same outdoor air conditions.

Using graph 450 as an exemplary illustration of the design and operational procedure to obtain the optimum steady-state effectiveness (and energy transfer rate) of a passive RAMEE system with two identical LAMEEs each subject to the same mass flow rate of air, the system operator or automatic controller selects or controls the pumping rate of the liquid desiccant based on the outdoor air conditions of temperature and humidity. That is, the optimum thermal capacity rate ratio 452 for the particular outdoor air condition is selected to compute the mass flow rate of liquid desiccant knowing the mass flow rate of air. The result is used to set the optimum pumping rate. When the outdoor air conditions change significantly or the air flow rate is changed significantly, a new optimum pumping rate is determined. In one embodiment, the flow rate of the desiccant with respect to the flow rate of the air stream is controlled to achieve predetermined exchanger performance ratios that at least partially define a sensible and latent energy exchange between the desiccant and the air stream.

Figure 8:
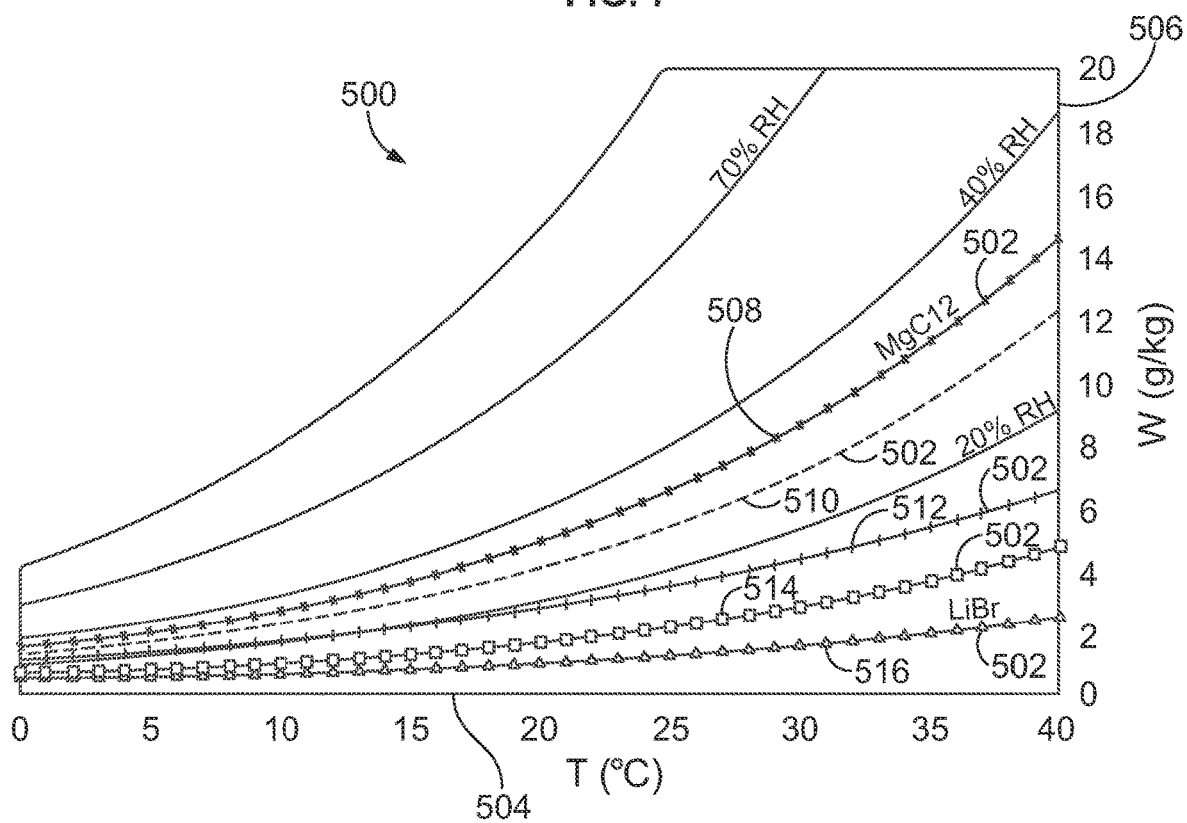
FIG. 8 is a graph of salt solution concentrations formed in accordance with an embodiment.

FIG. 8 is a graph 500 showing equilibrium, saturation, salt-solution concentration lines 502 superimposed on a psychrometric chart of humidity ratio versus temperature for several salts that may be used as liquid desiccants with the system 100. The graph 500 illustrates a temperature 504 of the air flowing through the LAMEE and a humidity ratio 506 of the air at standard atmospheric pressure flowing through the LAMEE. The equilibrium, saturation, salt-solution concentration lines 502 depend only on the type of salt, air temperatures 504 and the humidity ratios 506 at which the desiccant will start to crystallize within the panels of the LAMEE. At the saturation concentration, a particular salt solution will crystallize salt on the nearby membrane surfaces within the liquid-desiccant flow channel for any decrease in the adjacent air flow channel temperature or humidity ratio (i.e. below the line 502 for the particular salt). Based on the expected conditions for a particular climatic region of the air flow through the LAMEE, the graph 500 may be used along with other data to select an appropriate desiccant for the air flow conditions for an HVAC application.

Line 508 represents the adjacent air temperatures 504 and humidity ratios 506 at which a saturation magnesium chloride solution crystallizes if the air temperature and humidity were to drop below this line. Line 510 represents the similar saturation calcium chloride solution crystallization line. Line 512 represents the similar saturation lithium iodide solution crystallization line. Line 514 represents the similar saturation lithium chloride crystallization line. Line 516 represents the similar saturation lithium bromide crystallization line.

Lithium bromide is capable of functioning as a liquid desiccant in the harshest conditions because only very low adjacent air humidity ratios would cause crystallization. However, lithium bromide is relatively expensive in comparison to other salts with no lithium content. In an exemplary embodiment, the system 100 utilizes a desiccant mixture of magnesium chloride with other salts. The mixture may include magnesium chloride and at least one of lithium chloride or lithium bromide. Alternatively, the mixture includes calcium chloride in place of magnesium chloride and at least one of lithium chloride or lithium bromide. In another embodiment, the mixture includes at least three of magnesium chloride, calcium chloride, lithium chloride and/ or lithium bromide. The concentration of magnesium chloride can range from 0% to 35.5% (i.e. saturation salt concentration). Above the saturation salt solution line for a particular salt in graph 500, the equilibrium salt concentration is based on a temperature and humidity of the air flowing through the LAMEE. A salt solution is comprised of water and ions of salts. The concentration of lithium chloride can range from 0% to 45.9% (i.e. saturation salt concentration). In one embodiment, the mixture is 50% magnesium chloride and 50% lithium chloride. The mixture can operate without crystallization at temperatures 504 and humidity ratios 506 below the line 508 for magnesium chloride. The mixture provides a liquid desiccant that can operate at dryer air conditions for the outdoor air conditions for the RAMEE system than pure magnesium chloride or calcium chloride solutions.

In one embodiment, the desiccant is selected based on operational design parameters P10 and P11 as illustrated in Table 1. The desiccant may be selected based on a time duration ($t_{salt,risk}$) for a risk of crystallization in the desiccant over a typical year of weather data for a building located in a particular climate. In particular, the time duration ($t_{salt,risk}$) for a risk of crystallization in the desiccant is divided by the total yearly time duration of system operation ($t_{op}$). In one embodiment, the parameter P10 is within a range of $t_{salt,risk}/t_{op}<0.15$. In another embodiment, the desiccant is selected based on a cost of salt or mixture of salts used in the RAMEE system 100 divided by the corresponding cost of LiCl for the system ($C_{salt,mix}/CLiCl$). In one embodiment, the parameter P11 is within a range of $C_{salt,mix}/CLiCl<1$. The parameters P10 and P11 may be individually selected in part to achieve a predetermined performance of the LAMEE 300 and the RAMEE system 100. In another embodiment, both of the design parameters P10 and P11 may be utilized to achieve the predetermined performance.

The geometric design and operating factors G1 to O8 and the physical operational and design factors P1 to P12 shown in Table 1 are selected to achieve a predetermined performance of the LAMEE 300 and/or the RAMEE system 100. The geometric factors G1-O10 and the physical factors P1-P12 may each be selected to achieve the predetermined performance of the LAMEE 300 and/or the RAMEE system 100. In another embodiment, at least some of the factors G1-G10 and P1-P12 may be selected to achieve the predetermined performance of the LAMEE 300 and the RAMEE system 100.

When LAMEE devices are used in passive RAMEE systems for energy recovery, the aforementioned performance factors are sufficient for applications where the system operates at or near steady-state. When the LAMEE devices are installed in actively controlled RAMEE and HVAC systems for air conditioning supply air, most of the above described LAMEE performance factors still apply; however, the HVAC system performance may be characterized using different dimensionless ratios. For the purpose a coefficient of performance (COP) or energy efficiency ratio (EER) can be used for any typical steady-state or quasi-steady-state operating condition of the controlled RAMEE system and the ratios can be modified for the annual integrated time average values called seasonal energy efficiency ratio (SEER) for both the heating and cooling of a building located in a particular city. The COP or EER for the HVAC system is defined as the useful energy rate change of the supply air from inlet to discharge conditions divided by all the auxiliary energy rate inputs to the HVAC system. Data for the calculation of COP or EER could be measured occasionally or continuously.

Because the cost of auxiliary energy is usually very different for cooling and heating, the ratios should be treated separately. The SEER value for cooling the supply air in summer may be listed separate from the SEER value for heating supply air in winter. Since both heating and cooling are used with mechanical cooling and desiccant dehumidification systems, both forms of input energy may be used for the summer operations. To obtain a high SEER for the HVAC system in a building, waste energy from exhaust air or other process sources can be used directly to condition or partly condition the supply air using RAMEE systems or indirectly using heat pumps (and/or refrigerators) with ambient air or ground water as the energy sources. The use of an economizer by-pass may also raise the SEER.

When modified RAMEE systems are used over the year in both active and passive modes, the calculation of the SEER values for the HVAC system should account for the changes of mode as well as any extra energy use for all the energy recovery or pumped energy.

From the above discussion of active HVAC system options, it is evident that claims for high SEER values are likely to change significantly for the same or different buildings in different climates. Comparisons of the dimensionless performance ratios for actively controlled modified RAMEE systems within an HVAC system may be done with software to show the life-cycle cost savings and the payback period for a particular design in a particular climate. Passive performance of a RAMEE system is still very useful because it will vary directly with cost savings for energy recovery and it can provide the best quantifiable proof of performance for both the RAMEE system and its two LAMEEs. As well, the passive performance should be used directly for the estimation of the HVAC system performance, with a heat pump assisted RAMEE system and its cost savings.

Figure 9:
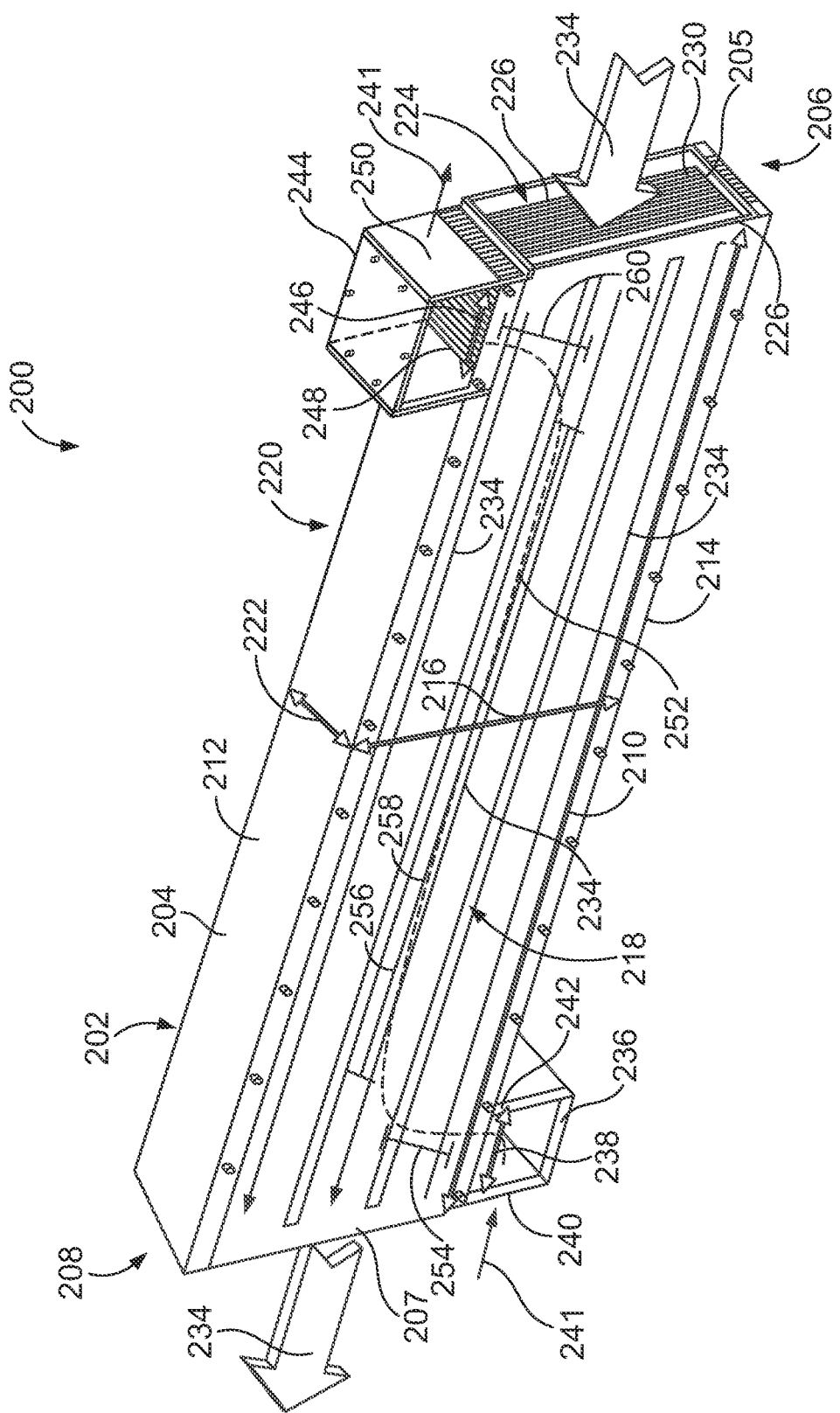
FIG. 9 is a side perspective view of a liquid-to-air membrane energy exchanger formed in accordance with an alternative embodiment.

FIG. 9 illustrates a LAMEE 200 formed in accordance with an alternative embodiment. The LAMEE 200 may be used as the supply air LAMEE 108 and/or the return air LAMEE 120 (shown in FIG. 1). The LAMEE 200 includes a housing 202 having a body 204. The body 204 includes a front 206 and a back 208 opposite the front 206. The body 204 is elongated to extend along a length 210 between the front 206 and the back 208. The body 204 includes a top 212 and a bottom 214 that are parallel to one another. The body 204 includes a height 216 that extends between the top 212 and the bottom 214. The body 204 includes a first side 218 and a second side 220. The first side 218 and the second side 220 span the length 210 between the front 206 and the back 208. The first side 218 and the second side 220 span the height 216 between the top 212 and the bottom 214. The fit side 218 and the second side 220 are arranged parallel to one another and are separate by a width 222.

The LAMEE body 204 includes an air inlet 205 at the front 206 of the body 204 and an air outlet 207 at the back 208 of the body 204. The LAMEE body 204 forms an energy exchange cavity 224. The energy exchange cavity 224 extends the length 210, height 216, and width 222 between the front 206, the back 208, the top 212, the bottom 214, the first side 218, and the second side 220. The length 210, height 216, and/or width 222 represent physical design factors that are selected to satisfy predetermined ratios with one another and/or with predetermined ratios with other design parameters, as explained hereafter. The ratios of the height 216 to the length 210, the width 222 to the length 210, and/or the width 222 to the height 216 represent dimensionless physical ratios, and more generally, dimensionless design factors.

The energy exchange cavity 224 includes a plurality of energy exchange panels 226 extending therethrough. The panels 226 extend the length 210 and height 216 of the energy exchange cavity 224. Each panel 226 forms a desiccant channel that carries desiccant 241 through the energy exchange cavity 224. The panels 226 are arranged parallel to one another and spaced apart to form air channels 230 and desiccant channels 231 therebetween. The air channels 230 extend between the air inlet 205 and the air outlet 207. Each air channel 230 is formed between adjacent desiccant channels 231. The air channels 230 direct an air stream 234 from the front 206 of the LAMEE 200 to the back 208 of the LAMEE 200.

A desiccant inlet housing 236 is joined to the LAMEE housing 202. In the illustrated embodiment, the desiccant inlet housing 236 is joined to the bottom 214 of the LAMEE housing 202. The desiccant inlet housing 236 is positioned adjacent the back 208 of the LAMEE housing 202. The desiccant inlet housing 236 extends from the back 208 of the LAMEE housing 202 along the bottom 214 of the LAMEE housing 202. The desiccant inlet housing 236 extends partially between the back 208 and front 206 of the LAMEE housing 202. Alternatively, the desiccant inlet housing 236 may positioned at any location along the LAMME body 204. In one embodiment, the LAMEE 200 may include more than one desiccant inlet body 204. The desiccant inlet housing 236 extends a length 238 along the bottom 214 of the LAMEE housing 202. The length 238 that the desiccant inlet housing 236 extends is based on a predetermined performance of the LAMEE 200. In one embodiment, the desiccant inlet housing 202 extends no more than one fourth of the length 210 of the LAMEE body 204. In another embodiment, the desiccant inlet housing 236 extends one fifth of the length 210 of the LAMEE body 204.

The desiccant inlet housing 236 includes an inlet 240 and an outlet 242. The inlet 240 is configured to receive desiccant 241 from a storage tank 128 (shown in FIG. 1). The inlet 240 and the outlet 242 are in fluid communication with the desiccant channels 231 extending through the energy exchange cavity 224. The desiccant 241 flows from the desiccant inlet housing 236 into the desiccant channels 231. The desiccant 241 flows through the desiccant channels 231 from the back 208 of the LAMEE housing 202 toward the front 206 of the LAMEE housing 202. The desiccant 241 flows in a direction opposite the direction of the air stream 234. The desiccant 241 flows through the desiccant channels 231 toward a desiccant outlet housing 244.

The desiccant outlet housing 244 is joined to the top 212 of the LAMEE housing 202. The desiccant outlet housing 244 is positioned proximate to the front 206 of the LAMEE housing 202. Alternatively, the desiccant outlet housing 244 may be positioned at any location along the top 212 of the LAMEE housing 202. The desiccant outlet housing 244 is offset from the desiccant inlet housing 236 along the direction of the air stream 234. The desiccant outlet housing 244 extends from the front 206 of the LAMEE housing 202 along the top 212 of the LAMEE housing 202. The desiccant outlet housing 244 extends partially between the front 206 and the back 208 of the LAMEE housing 202. The desiccant outlet housing 244 extends a length 246 along the top 212 of the LAMEE housing 202. The length 246 that the desiccant outlet housing 244 extends is based on a predetermined performance of the LAMEE 200. In one embodiment, the desiccant outlet housing 244 extends a length 246 that is no more than one fifth the channel energy exchange length 210 of the LAMEE body 204. In one embodiment, the desiccant outlet housing 244 extends a length 246 that is one fifth of the length 210 of the LAMEE body 204.

The desiccant outlet housing 244 includes an inlet 248 and an outlet 250. The inlet 248 is in fluid communication with the desiccant channels 231. The desiccant outlet housing 244 receives desiccant 241 from the desiccant channels 231. The desiccant outlet housing 244 channels the desiccant 241 through the outlet 250. The outlet 250 is in fluid communication with a storage tank 128 (shown in FIG. 1).

The desiccant inlet housing 236 and the desiccant outlet housing 244 form a non-linear desiccant flow path 252 through the panels 226. The desiccant flow path 252 flows in a direction opposite to the air stream 234. The desiccant flow path 252 travels upstream with respect to the direction of the air stream 234. The desiccant flow path 252 is a cross/counter flow path with respect to the air stream 234 flowing through the air channels 230. An inlet cross segment 254 of the desiccant flow path 252 is formed as the desiccant 241 enters the panels 226 from the desiccant inlet housing 236. Desiccant 241 flowing from the desiccant inlet housing 236 into the panels 226 flows upward through the inlet cross segment 254. Desiccant in the inlet cross segment 254 flows in a cross flow arrangement that is substantially perpendicular to the direction of the air stream 234.

As the desiccant 241 is channeled from the desiccant inlet housing 236 fills the panels 226, the desiccant 241 begins flowing through a counter segment 256 of the desiccant flow path 252. The counter segment 256 extends a length 258 through the panels 226. The length 258 is based on a predetermined performance of the LAMEE 200. The counter segment 256 flows in a counter flow arrangement with respect to the direction of the air stream 234 flowing through the air channels 230. The counter segment 256 flows substantially parallel to the direction of the air stream 234. The counter segment 256 flows upstream with respect to the direction of the air stream 234. The counter flow arrangement provides a predetermined heat and moisture exchange between the desiccant in the panels 226 and the air stream 234 in the air channels 230.

The desiccant 241 in the counter segment 256 flows into an outlet cross segment 260 of the desiccant flow path 252. The outer cross segment 260 flows substantially perpendicular to the direction of the air stream 234. The desiccant in the outlet cross segment 260 flows in a cross flow arrangement with respect to the air 234 in the air channels 230. The desiccant in the outlet cross segment 260 flows upward from the counter segment 256 to the desiccant outlet housing 244.

The cross/counter flow arrangement of the desiccant flow path 252 provides desiccant counter flow with respect to the direction of the air stream 234. The counter flow arrangement improves an efficiency of the LAMEE 200. The cross/counter flow arrangement does not require large headers that would otherwise increase the space required for the LAMEE 200. The illustrated embodiment shows the desiccant flow path 252 flowing upward from the bottom 214 of the LAMEE 200 to the top 212 of the LAMEE 200. Optionally, the desiccant inlet housing 236 may be positioned on the top 212 of the LAMEE 200 and the desiccant outlet housing 244 may be positioned on the bottom 214 of the LAMEE 200. In such an embodiment, the desiccant flow path 252 may flow downward from the top 212 of the LAMEE 200 to the bottom 214 of the LAMEE 200.

The geometric design factors G1-G8 and the physical operational and design factors P1-P12 shown in Table 1 should be used to achieve a predetermined performance of the LAMEE 200. Although each of the dimensionless independent factors in the set, G1-G10 and P1-P12, should be selected within the specified ranges in Table 1 to achieve the predetermined performance of the passive RAMEE system with its two LAMEE 200 units operating at steady-state, it may be possible to relax the design and operational range of a few independent factors in Table 1 for some narrow range of system operating conditions and still achieve an acceptable system performance. Therefore, in another embodiment, only some of the factors, G1-G10 and P1-P12, need to be selected in the ranges specified in Table 1 to achieve an acceptable predetermined performance of the LAMEE 200 when tested as part of a passive RAMEE system.

Figure 10:
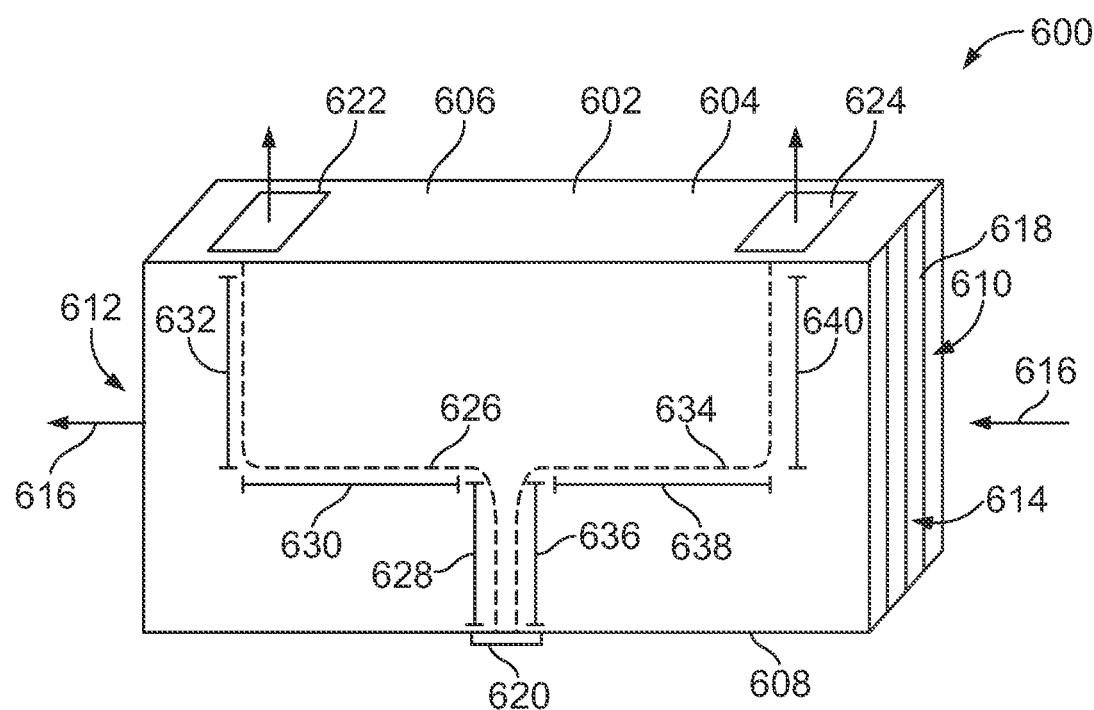
FIG. 10 is a side perspective view of a liquid-to-air membrane energy exchanger formed in accordance with an alternative embodiment.

FIG. 10 illustrates a LAMEE 600 formed in accordance with an alternative embodiment. The LAMEE 600 includes a housing 602 having a body 604 with a top 606 and a bottom 608. The LAMEE 600 includes an air inlet 610 and an air outlet 612. An energy exchange cavity 614 extends through the body 604 between the air inlet 610 and the air outlet 612. An air stream 616 flows through the energy exchange cavity 614 from the air inlet 610 to the air outlet 612. The energy exchange cavity 614 includes panels 618 that form desiccant channels 615 to carry desiccant therethrough.

A desiccant inlet 620 is provided at the bottom 608 of the LAMEE body 604. The desiccant inlet 620 may be positioned at any location along the bottom 608 of the LAMEE body 604. Alternatively, the LAMEE 600 may include any number of desiccant inlets 620. The desiccant inlet 620 is in flow communication with the desiccant channels 615. A first desiccant outlet 622 and a second desiccant outlet 624 are positioned at the top 606 of the LAMEE body 604. The first and second desiccant outlets 622 and 624 may be positioned at any location along the top 606 of the LAMEE body 604. The first and second desiccant outlets 622 and 624 are offset from the desiccant inlet 620 along the direction of the air stream 616. The desiccant inlet 620 and the desiccant outlets 622 and 624 from desiccant flow paths from the bottom 608 of the LAMME body 604 to the top 606 of the LAMEE body 604. Alternatively, the desiccant inlet 620 may be positioned along the top 606 of the LAMEE body 604 and the desiccant outlets 622 and 624 may be positioned along the bottom 608 of the LAMEE body 604. In such an embodiment, the desiccant flows from the top 606 of the LAMEB body 604 to the bottom 608 of the LAMEB body 604.

The desiccant inlet 620 and the first desiccant outlet 622 form a first desiccant flow path 626 that flows non-linearly through the panels 618. The first desiccant flow path 626 includes an inlet segment 628 that flow from the desiccant inlet 620. The inlet segment 628 flows in a cross flow direction substantially perpendicular to the direction of the air stream 616. The inlet segment 628 flow into an intermediate segment 630 that flows substantially parallel to the direction of the air stream 616. The intermediate segment 630 flows in the same direction as the direction of the air stream 616. The intermediate segment 630 flows into an outlet segment 632 that flows to the desiccant outlet 622. The outlet segment 632 flows in a direction that is substantially perpendicular to the direction of the air stream 616.

The desiccant inlet 620 and the second desiccant outlet 624 form a second desiccant flow path 634 that flows non-linearly through the panels 618. The second desiccant flow path 634 includes an inlet segment 636 that flows from the desiccant inlet 620. The inlet segment 636 flows in a cross flow direction substantially perpendicular to the direction of the air stream 616. The inlet segment 636 flows into an intermediate segment 638 that flows substantially parallel to the direction of the air stream 616. The intermediate segment 638 flows in an opposite direction to the direction of the air stream 616. The intermediate segment 638 flows into an outlet segment 640 that flows to the second desiccant outlet 624. The outlet segment 640 flows in a direction that is substantially perpendicular to the direction of the air stream 616.

The physical design geometric factors G1-G10 and the operational design factors P1-P12 shown in Table 1 may be used to achieve a predetermined performance of the LAMEE 600. The physical design geometric factors G1-G10 and the operational design factors P1-P12 may each be selected to achieve the predetermined performance of the LAMEE 600. In another embodiment, only some of the physical design geometric factors G1-O10 and the operational design factors P1-P12 may be selected to achieve the predetermined performance of the LAMEE 600.

Figure 11:
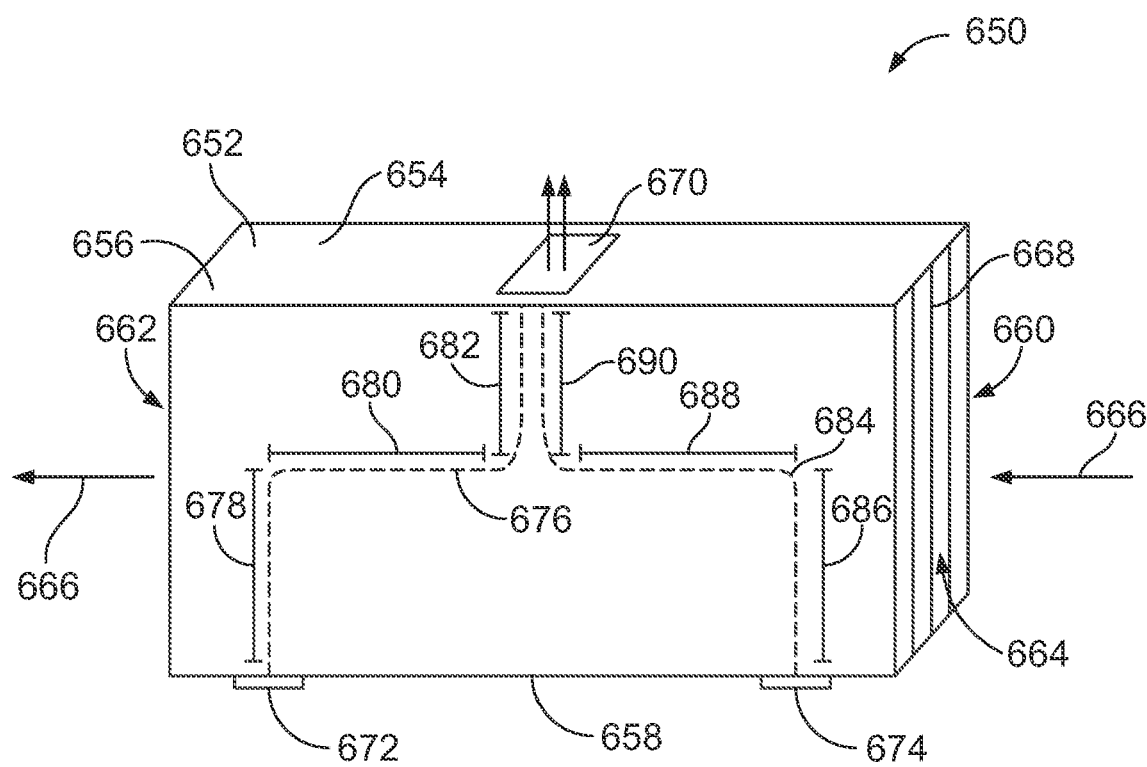
FIG. 11 is a side perspective view of a liquid-to-air membrane energy exchanger formed in accordance with an alternative embodiment.

FIG. 11 illustrates a LAMEE 650 formed in accordance with an alternative embodiment. The LAMEE 650 includes a housing 652 having a body 654 with a top 656 and a bottom 658. The LAMEE 650 includes an air inlet 660 and an air outlet 662. An energy exchange cavity 664 extends through the body 654 between the air inlet 660 and the air outlet 662. An air stream 666 flows through the energy exchange cavity 664 from the air inlet 660 to the air outlet 662. The energy exchange cavity 664 includes panels 668 that form desiccant channels 669 to carry a desiccant therethrough.

A desiccant outlet 670 is provided at the top 656 of the LAMEE body 654. The desiccant outlet 670 may be positioned at any location along the top 656 of the LAMEE body 654. Alternatively, the LAMEE 650 may include any number of desiccant outlets 670. The desiccant outlet 670 is in flow communication with the desiccant channels 669. A first desiccant inlet 672 and a second desiccant inlet 674 are positioned at the bottom 658 of the LAMEE body 654. The first and second desiccant inlets 672 and 674 may be positioned at any location along the bottom 658 of the LAMEE body 654. The first and second desiccant inlets 672 and 674 are offset from the desiccant outlet 670 along the direction of the air stream 666. The desiccant outlet 670 and the desiccant inlets 672 and 674 form desiccant flow paths from the bottom 658 of the LAMME body 654 to the top 656 of the LAMEE body 654. Alternatively, the desiccant outlet 670 may be positioned along the bottom 658 of the LAMEE body 654 and the desiccant inlets 672 and 674 may be positioned along the top 656 of the LAMEE body 654. In such an embodiment, the desiccant flows from the top 656 of the LAMEE body 654 to the bottom 658 of the LAMEE body 654.

The desiccant outlet 670 and the first desiccant inlet 672 form a first desiccant flow path 676 that flows non-linearly through the panels 668. The first desiccant flow path 676 includes an inlet segment 678 that flow from the first desiccant inlet 672. The inlet segment 678 flows in a cross flow direction substantially perpendicular to the direction of the air stream 666. The inlet segment 678 flows into an intermediate segment 680 that flows substantially parallel to the direction of the air stream 666. The intermediate segment 680 flows in a direction opposite to the direction of the air stream 666. The intermediate segment 680 flows into an outlet segment 682 that flows to the desiccant outlet 670. The outlet segment 682 flows in a direction that is substantially perpendicular to the direction of the air stream 666.

The desiccant outlet 670 and the second desiccant inlet 674 form a second desiccant flow path 684 that flows non-linearly through the panels 668. The second desiccant flow path 684 includes an inlet segment 686 that flows from the first desiccant inlet 674. The inlet segment 686 flows in a cross flow direction substantially perpendicular to the direction of the air stream 666. The inlet segment 686 flows into an intermediate segment 688 that flows substantially parallel to the direction of the air stream 666. The intermediate segment 688 flows in the same direction as the direction of the air stream 666. The intermediate segment 688 flows into an outlet segment 690 that flows to the desiccant outlet 670. The outlet segment 690 flows in a direction that is substantially perpendicular to the direction of the air stream 666.

The physical design geometric factors G1-G10 and the operational design factors P1-P12 shown in Table 1 may be used to achieve a predetermined performance of the LAMEE 650. The physical design geometric factors G1-G10 and the operational design factors P1-P12 may each be selected to achieve the predetermined performance of the LAMEE 650. In another embodiment, only some of the physical design geometric factors G1-G10 and the operational design factors P1-P12 may be selected to achieve the predetermined performance of the LAMEE 650.

Figure 12:
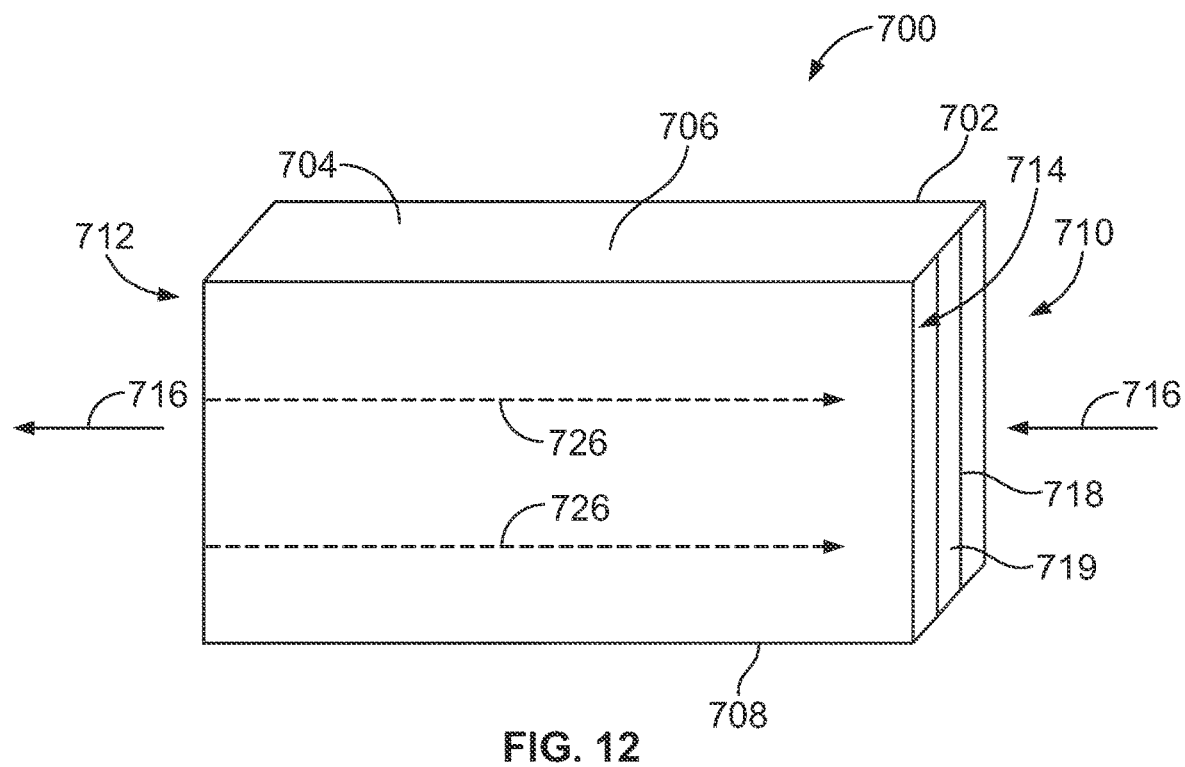
FIG. 12 is a side perspective view of a liquid-to-air membrane energy exchanger formed in accordance with an alternative embodiment.

FIG. 12 illustrates a LAMEE 700 formed in accordance with an alternative embodiment. The LAMEE 700 includes a housing 702 having a body 704 with a top 706 and a bottom 708. The LAMEE 700 includes a first end 710 and a second end 712. An energy exchange cavity 714 extends through the body 704 between the first end 710 and the second end 712. An air stream 716 flows through the energy exchange cavity 714 from the first end 710 to the second end 712. The energy exchange cavity 714 includes panels 718 that form desiccant channels 719 to carry a desiccant therethrough.

A desiccant flow path 726 flows through the desiccant channels 719 from the second end 712 to the first end 710. The desiccant flow path 726 is arranged in a counter-flow arrangement with respect to the air stream 716. Heat is transferred through the panels 719 between the desiccant flow path 726 and the air stream 716.

The physical design geometric factors G1-G10 and the operational design factors P1-P12 shown in Table 1 may be used to achieve a predetermined performance of the LAMEE 700. The physical design geometric factors G1-G10 and the operational design factors P1-P12 may each be selected to achieve the predetermined performance of the LAMEE 700. In another embodiment, only some of the physical design geometric factors G1-G10 and the operational design factors P1-P12 may be selected to achieve the predetermined performance of the LAMEE 700.

Figure 13:
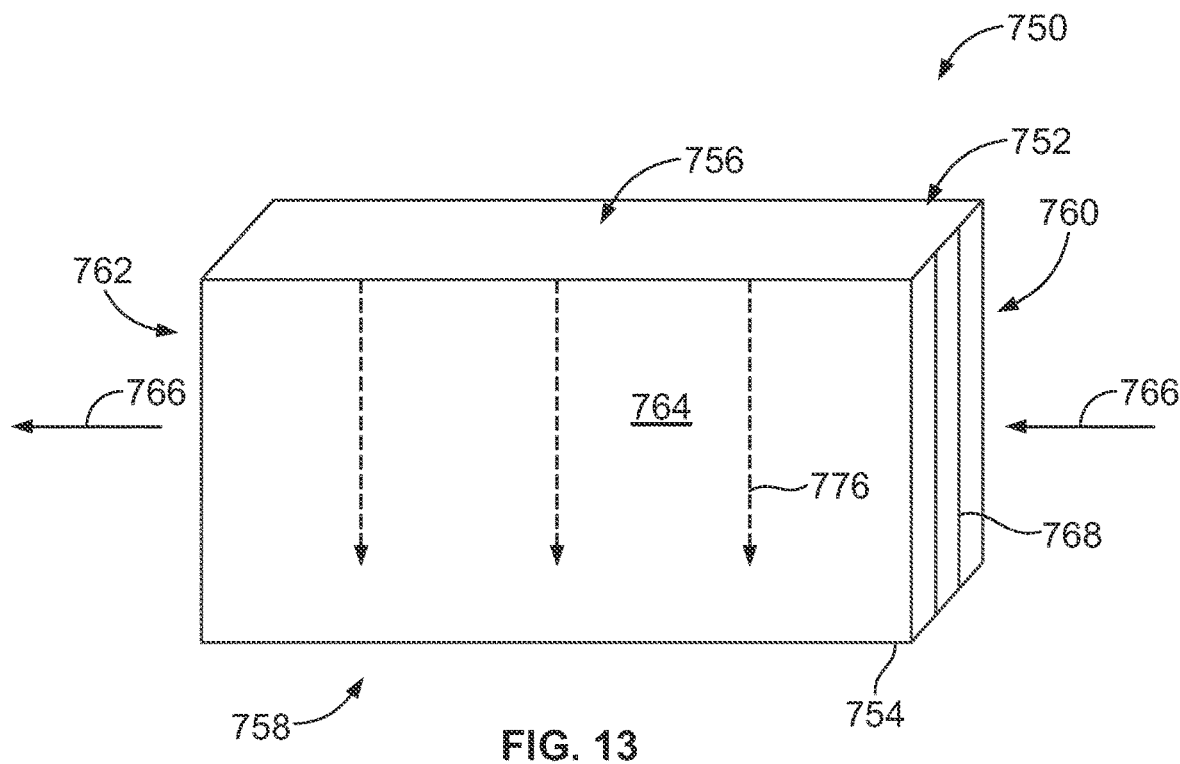
FIG. 13 is a side perspective view of a liquid-to-air membrane energy exchanger formed in accordance with an alternative embodiment.

FIG. 13 illustrates a LAMEE 750 formed in accordance with an alternative embodiment. The LAMEE 750 includes a housing 752 having a body 754 with a top 756 and a bottom 758. The LAMEE 750 includes a first end 760 and a second end 762. An energy exchange cavity 764 extends through the body 754 between the first end 760 and the second end 762. An air stream 766 flows through the energy exchange cavity 764 from the first end 760 to the second end 762. The energy exchange cavity 764 includes panels 768 that form desiccant channels to carry a desiccant therethrough.

A desiccant flow path 776 flows through the desiccant channels from the top 756 to the bottom 758. The desiccant flow path 776 is arranged in a cross-flow arrangement with respect to the air stream 766. Heat is transferred through the panels 768 between the desiccant flow path 776 and the air stream 766.

The physical design geometric factors G1-G10 and the operational design factors P1-P12 shown in Table 1 may be used to achieve a predetermined performance of the LAMEE 750. The physical design geometric factors G1-G10 and the operational design factors P1-P12 may each be selected to achieve the predetermined performance of the LAMEE 750. In another embodiment, only some of the physical design geometric factors G1-G10 and the operational design factors P1-P12 may be selected to achieve the predetermined performance of the LAMEE 750.

Figure 14:
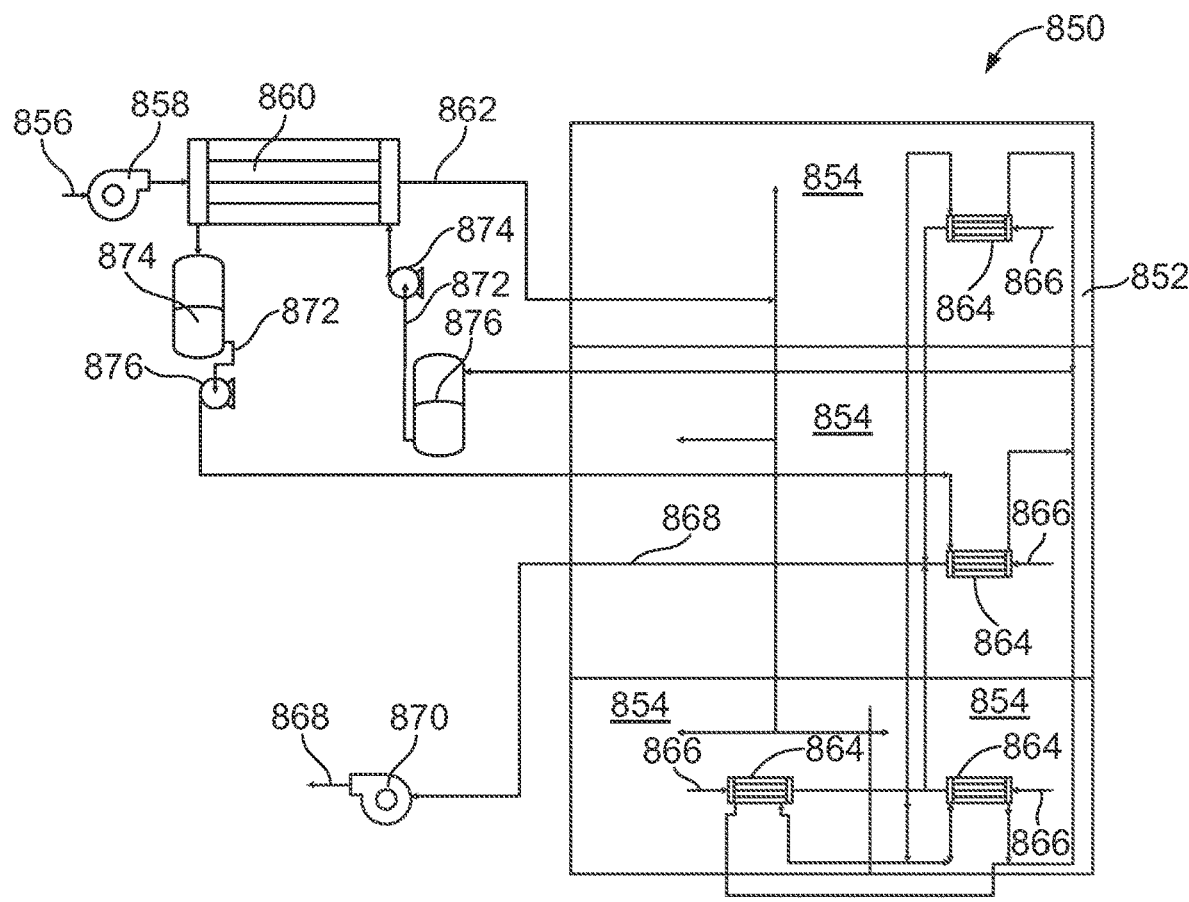
FIG. 14 is a schematic view of an alternative energy exchange system formed in accordance with an embodiment.

FIG. 14 illustrates an exemplary energy exchange system 850 formed in accordance with the set of embodiments specified in Table 1. The energy exchange system 850 is configured to condition air supplied to an enclosed structure 852 having a plurality of rooms 854. The energy exchange system 850 receives pre-conditioned air 856 that is direct through the system 850 with a fan 858. The pre-conditioned air 856 is directed to a supply LAMEE 860 that conditions the pre-conditioned air 856 to generate supply air 862. The supply LAMEE 860 conditions the pro-conditioned air 856 by adding or removing heat and moisture to or from the pre-conditioned air 856. The supply air 862 is discharged into the rooms 854.

Each room 854 includes a return air LAMEE 864 configured to receive return air 866 from the room 854. The return air LAMEE 864 conditions the return air 866 by adding or removing heat and moisture to or from the return air 866. The return air LAMEEs 864 exchange the heat and moisture with the supply air LAMEE 860 to transfer the heat and moisture between the return air 866 and the pre-conditioned air 856. The return LAMEEs 864 generate exhaust air 868 that is discharged from the energy exchange system 850 by a fan 870.

Liquid desiccant 872 flows between the supply LAMEE 860 and the return air LAMEEs 864. The desiccant 872 transfers the heat and moisture between the supply LAMEE 860 and the return air LAMEEs 864. Storage tanks 874 are provided to retain the desiccant 872 as it flows between the supply LAMEE 860 and the return air LAMEEs 864. Pumps 876 may be provided to move the liquid desiccant 872 between the supply LAMEE 860 and the return air LAMEEs 864.

Figure 15:
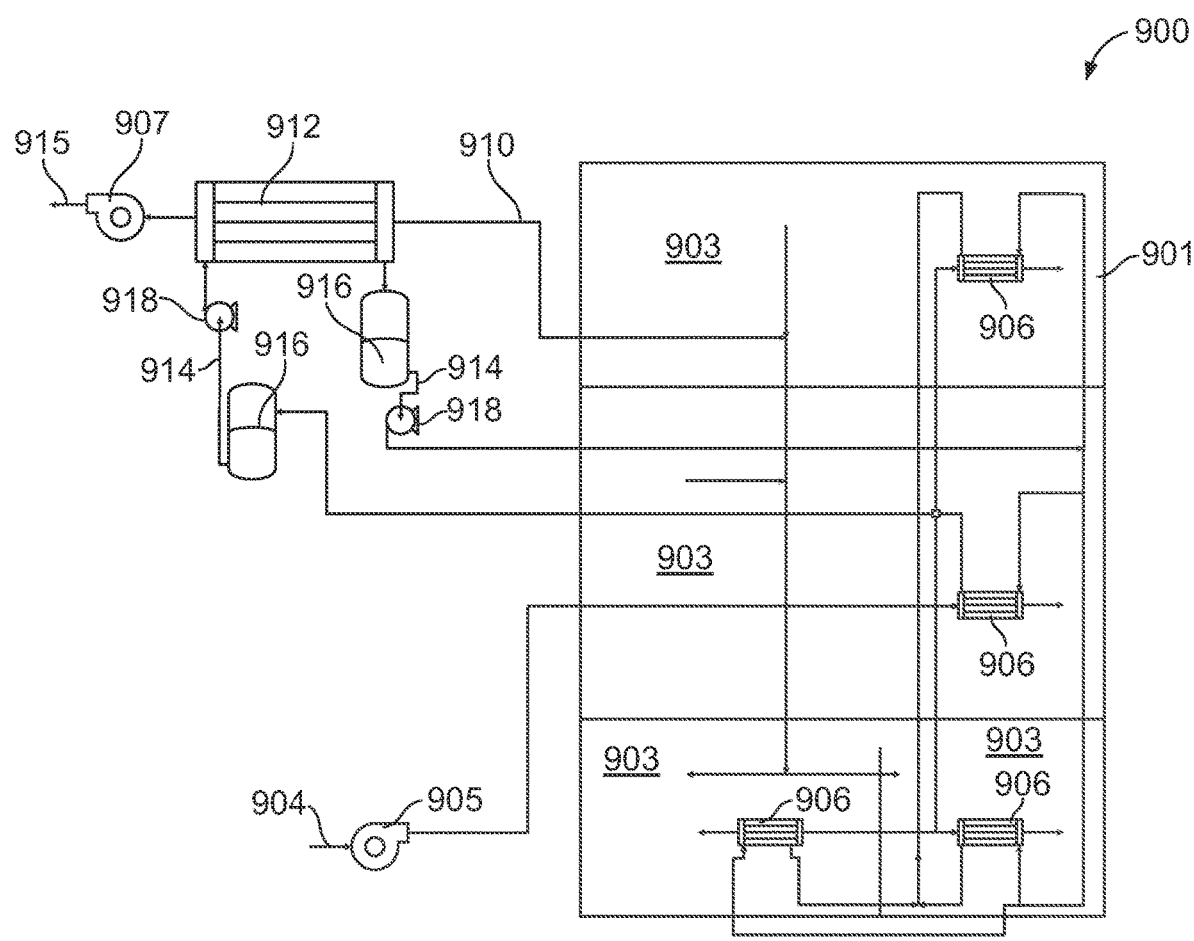
FIG. 15 is a schematic view of another energy exchange system formed in accordance with an alternative embodiment.

FIG. 15 illustrates an alternative exemplary energy exchange system 900 formed in accordance with the set of embodiments. The energy exchange system 900 is configured to condition air supplied to a structure 901. The structure 901 includes a plurality of rooms 903. The energy exchange system 900 includes an inlet 902 that receives pre-conditioned air 904 that may be moved by a fan 905. The pre-conditioned air 904 is divided into each of the rooms 903 of the structure 901. The pre-conditioned air 904 is moved through the energy exchange system 900 with a fan 905. The pre-conditioned air 904 may be divided equally between each of the rooms 903. Optionally, the pre-conditioned air 904 may be divided between the rooms 903 based on a capacity of each room 903 and/or a supply air need in each room 903. Each room 903 includes a supply LAMEE 906 that is configured to condition the pre-conditioned air 904. The supply LAMEE 906 conditions the per-conditioned air by adding or removing heat and moisture to the pre-conditioned air 904. The supply LAMEE 906 generates supply air 908 that is discharged into the room 903.

Return air 910 from each room 903 is channeled to a return LAMEE 912. The return LAMEE 912 conditions the return air 910 to generate exhaust air 915. The exhaust air 915 is moved through the energy exchange system 900 with a fan 907 that directs the exhaust air 915 to an outlet 909. The return LAMEE 912 conditions the return air 910 by adding or removing heat and moisture from the return air 910. Heat and moisture is transferred between the supply LAMEE 906 and the return LAMEE 912 to exchange the heat and moisture between the return air 910 and the pre-conditioned air 904.

Desiccant 914 flows between the supply LAMEE 906 and the return LAMEE 912. The desiccant 914 transfers the heat and moisture between the supply LAMEE 906 and the return LAMEE 912. Storage tanks 916 are provided between the supply LAMEE 906 and the return LAMEE 912. The storage tanks 916 retain desiccant traveling between the supply LAMEE 906 and the return LAMBE 912. Pumps 918 are provided to move the desiccant 914 between the supply LAMEE 906 and the return LAMEB 912.

In another embodiment, an energy exchange system may be provided that includes individual supply LAMEEs and return LAMEEs for each room of a structure. Alternatively, an energy exchange system may be provided that utilizes heat and moisture from a first room of a structure to condition air in a second room of the structure. Such an embodiment would include a first LAMEE positioned within the first room and a second LAMEE positioned within the second room. The heat and moisture from the first room would be transferred from the first LAMEE to the second LAMEE to add the heat and moisture to the air in the second room.

The embodiments described herein provide a LAMEE that utilizes either a counter/cross-flow or cross-flow to improve the effectiveness of the LAMEE. The dimensions of the LAMEE are selected to provide a predetermined performance of the LAMEE. The predetermined performance of the LAMEE is based on the surrounding environment. The LAMEE is configured to reach the predetermined performance based on the conditions of the air flow through the LAMEE. The embodiments herein also provide a desiccant solution that is configured to operate at dry ambient air conditions.

It should be noted that the LAMEEs illustrated in FIGS. 2 and 9-13 are exemplary only and the physical design geometric factors G1-G10 and the operational design factors P1-P12 may be utilized with any LAMEE having any suitable geometry. Further, the energy exchange systems illustrated in FIGS. 14 and 15 are exemplary only and the physical design geometric factors G1-G10 and the operational design factors P1-P12 may be utilized with any suitable energy exchange system.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. An energy exchanger comprising:
a plurality of panels forming liquid channels and air channels separated by at least one semi-permeable membrane, the air channels configured to direct an air stream through the exchanger at a predetermined air flow and each of the air channels defining an area, $A_c$, and a volume, $V_c$;
a liquid inlet in flow communication with the liquid channels; and
a liquid outlet in flow communication with the liquid channels, the liquid channels configured to channel liquid from the liquid inlet to the liquid outlet in a counter-flow direction with respect to the direction of the air stream to facilitate heat and water vapor transfer between the liquid in the liquid channels and the air stream in the air channels through the at least one semi-permeable membrane, wherein:
an air flow pressure drop ratio of the exchanger is between $10^3$ and $10^4$; and
the air flow pressure drop ratio is defined as $(p\, A_c/V_c)$;
p is a pressure drop of the air stream across the energy exchanger;
$A_c$ is the area of each of the air channels; and
$V_c$ is the volume of each of the air channels.

2. The energy exchanger of claim 1, wherein:
a liquid flow direction of the liquid in the liquid channels is approximately 180° from an air flow direction of the air stream in the air channels.

3. The energy exchanger of claim 1, wherein:
the liquid inlet has an inlet length and the liquid channels each have a channel length; and
the inlet length and the channel length are selected to provide a predetermined ratio that is between 0.02 and 0.2.

4. The energy exchanger of claim 1, wherein:
the liquid channels have an approximately constant liquid channel width and the air channels have an approximately constant air channel width; and
a ratio of the average air channel width divided by the average liquid channel width is within a range of 1 to 5.

5. The energy exchanger of claim 1, wherein:
the at least one semi-permeable membrane has a water vapor diffusion resistance and the air stream in the air channel has a convective water vapor mass transfer resistance, a ratio of the water vapor diffusion resistance divided by the convective water vapor mass transfer resistance is within a range of 0.2 to 3.

6. The energy exchanger of claim 1, wherein:
the at least one semi-permeable membrane has a membrane liquid break-through pressure defined as the pressure required for liquid to flow through the membrane, a ratio of the membrane liquid break-through pressure divided by (rho*g*H), wherein rho is the density of the liquid, g is gravity and H is a height of the membrane, is greater than 20.

7. The energy exchanger of claim 1, wherein:
the at least one semi-permeable membrane has an edge seal liquid break-through pressure defined as the pressure required for liquid to flow through an edge seal of the membrane, a ratio of the edge seal liquid break-through pressure divided by (rho*g*H), wherein rho is the density of the liquid g is gravity and H is a height of the membrane, is greater than 20.

8. The energy exchanger of claim 1, wherein:
the at least one semi-permeable membrane includes a screen having wires, the wires having a spacing ($s_{ws}$), the liquid having an operating pressure ($pi_{op}$), and the membrane having a tensile yield limit ($T_{m,y}i$), a ratio of $T_{m,y}i/(Pt,o\rho*s_{ws})$ is less than 1.5.

9. The energy exchanger of claim 1, wherein:
the liquid inlet is offset from the liquid outlet along the direction of the air stream.

10. The energy exchanger of claim 1, wherein:
the liquid flows through the liquid channels along a non-linear flow path between the inlet and outlet.

11. The energy exchanger of claim 1, wherein:
the liquid outlet extends no more than one fourth of a length of the energy exchanger; and
the liquid inlet extends no more than one fourth of a length of the energy exchanger.

12. The energy exchanger of claim 1, wherein:
a width of the air channels is selected based on a width of the liquid channels.

13. The energy exchanger of claim 1, wherein:
a characteristic Reynolds number for the air stream through the air channels is greater than a critical Reynolds number for turbulent flow in the air channels.

14. The energy exchanger of claim 1, wherein:
a characteristic Rayleigh number for liquid flow in the liquid channels is less than a critical Rayleigh number for thermally induced liquid density instability causing non-uniform mal-distributed flow at a Reynolds number for liquid flow.

15. The energy exchanger of claim 1, wherein:
the predetermined air flow of the air stream in the air channels is selected to provide $h/h_{1am}>1.1$ and $f/f_{1am}<h/h_{1am}$;
h is a convective heat transfer coefficient of turbulent air flow;
$h_{1am}$ is a convective heat transfer coefficient of laminar air flow;
h and $h_{1am}$ are at the same air channel Reynolds number;
f is a channel average friction flow coefficient for turbulent air flow; and
$f_{1am}$ is a channel average friction flow coefficient for laminar flow.

16. A method of exchanging energy between a liquid and an air stream in an energy exchanger, the method comprising:
extending a plurality of panels through a housing of the energy exchanger to form liquid channels and air channels, each of the air channels defining an area, $A_c$, and a volume, $V_c$;
providing a semi-permeable membrane for each of the panels;
directing an air stream at a predetermined air flow through the air channels; and
channeling liquid through the liquid channels in a counter-flow direction with respect to the direction of the air stream to facilitate heat and water vapor transfer between the liquid in the liquid channels and the air stream in the air channels through the semi-permeable membranes, wherein:
an air flow pressure drop ratio of the exchanger is between $10^3$ and $10^4$; and
the air flow pressure drop ratio is defined as ($p\ A_c/V_c$);
p is a pressure drop of the air stream across the energy exchanger;
$A_c$ is the area of each of the air channels; and
$V_c$ is the volume of each of the air channels.

* * * * *